(12) United States Patent
Olmstead

(10) Patent No.: US 8,678,287 B2
(45) Date of Patent: Mar. 25, 2014

(54) TWO-PLANE OPTICAL CODE READER FOR ACQUISITION OF MULTIPLE VIEWS OF AN OBJECT

(75) Inventor: Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 670 days.

(21) Appl. No.: 12/646,829

(22) Filed: Dec. 23, 2009

(65) Prior Publication Data
US 2010/0163628 A1    Jul. 1, 2010

Related U.S. Application Data

(63) Continuation-in-part of application No. 12/370,497, filed on Feb. 12, 2009, now Pat. No. 8,353,457.

(60) Provisional application No. 61/028,164, filed on Feb. 12, 2008, provisional application No. 61/140,930, filed on Dec. 26, 2008.

(51) Int. Cl.
*G06K 7/10* (2006.01)
*G06K 15/12* (2006.01)

(52) U.S. Cl.
USPC .................................................... 235/462.41

(58) Field of Classification Search
USPC ....................................... 235/462.41, 462.46
See application file for complete search history.

(56) References Cited

U.S. PATENT DOCUMENTS

| | | | |
|---|---|---|---|
| 3,826,562 A | 7/1974 | Baumgardner et al. | |
| 4,521,876 A | 6/1985 | Ueno | |
| 4,575,722 A | 3/1986 | Anderson | |
| 5,019,714 A | 5/1991 | Knowles | |
| 5,073,702 A | 12/1991 | Schuhmacher | |
| 5,308,966 A * | 5/1994 | Danielson et al. | 235/462.23 |
| 5,446,271 A | 8/1995 | Cherry et al. | |

(Continued)

FOREIGN PATENT DOCUMENTS

| | | |
|---|---|---|
| CA | 2 457 022 A1 | 10/2003 |
| CN | 1511298 A | 7/2004 |

(Continued)

OTHER PUBLICATIONS

Website—http://www.e2v.com/news/e2v-introduces-new-high-spec-1-3mp-cmos-image-sensor--with-embedded-features--for-industrial-imaging-/ (Sep. 14, 2009).

(Continued)

*Primary Examiner* — Thien M Le
*Assistant Examiner* — Toan Ly
(74) *Attorney, Agent, or Firm* — Stoel Rives LLP

(57) ABSTRACT

An optical code reader forms images of an optical code on an object. The reader comprises first and second viewing surfaces generally transverse to one another. The surfaces bound a viewing volume in which the object may be imaged. The reader also comprises a set of one or more imagers positioned on an opposite side of one or more of the first and second viewing surfaces relative to the viewing volume, and oriented and configured to capture images of the object from at least three different views. Each of the views passes through one of said first and second viewing surfaces. At least one of said views passes through the first viewing surface, and at least one of said views passes through the second viewing surface. The reader also comprises at least one mirror, off which is reflected at least one of the views.

63 Claims, 52 Drawing Sheets

(56) References Cited

U.S. PATENT DOCUMENTS

| | | | |
|---|---|---|---|
| 5,469,294 A | 11/1995 | Wilt et al. | |
| 5,493,108 A | 2/1996 | Cherry et al. | |
| 5,495,097 A | 2/1996 | Katz et al. | |
| 5,572,008 A | 11/1996 | Sakai et al. | |
| 5,621,424 A | 4/1997 | Shimada et al. | |
| 5,627,366 A | 5/1997 | Katz | |
| 5,646,390 A | 7/1997 | Wang et al. | |
| 5,677,522 A | 10/1997 | Rice et al. | |
| 5,682,030 A | 10/1997 | Kubon | |
| 5,717,195 A | 2/1998 | Feng et al. | |
| 5,723,852 A | 3/1998 | Rando et al. | |
| 5,737,122 A | 4/1998 | Wilt et al. | |
| 5,801,370 A | 9/1998 | Katoh et al. | |
| 5,804,805 A | 9/1998 | Koenck et al. | |
| 5,814,803 A | 9/1998 | Olmstead et al. | |
| 5,886,336 A | 3/1999 | Tang et al. | |
| 5,894,530 A | 4/1999 | Wilt | |
| 5,900,997 A | 5/1999 | Shapiro | |
| 5,909,276 A | 6/1999 | Kinney et al. | |
| 5,936,218 A | 8/1999 | Ohkawa et al. | |
| 5,984,186 A | 11/1999 | Tafoya | |
| 6,000,619 A | 12/1999 | Reddersen et al. | |
| 6,019,286 A | 2/2000 | Li et al. | |
| 6,053,408 A | 4/2000 | Stoner | |
| 6,061,091 A | 5/2000 | Van de Poel et al. | |
| 6,076,735 A | 6/2000 | Saegusa | |
| 6,142,376 A | 11/2000 | Cherry et al. | |
| 6,257,490 B1 | 7/2001 | Tafoya | |
| 6,273,336 B1 | 8/2001 | Rudeen et al. | |
| 6,295,077 B1 | 9/2001 | Suzuki | |
| 6,296,187 B1 | 10/2001 | Shearer | |
| 6,318,635 B1 | 11/2001 | Stoner | |
| 6,318,637 B1 | 11/2001 | Stoner | |
| 6,336,587 B1 | 1/2002 | He et al. | |
| 6,365,907 B1 | 4/2002 | Staub et al. | |
| 6,404,556 B1 | 6/2002 | Kobayashi | |
| 6,518,997 B1 | 2/2003 | Chow et al. | |
| 6,559,448 B1 | 5/2003 | Muller et al. | |
| 6,572,017 B1 | 6/2003 | Stoner | |
| 6,609,660 B1 | 8/2003 | Stoner | |
| 6,678,097 B2 * | 1/2004 | McKenney | 359/742 |
| 6,705,528 B2 | 3/2004 | Good et al. | |
| 6,899,272 B2 | 5/2005 | Krichever et al. | |
| 6,963,074 B2 | 11/2005 | McQueen | |
| 6,971,580 B2 | 12/2005 | Zhu et al. | |
| 6,991,169 B2 | 1/2006 | Bobba et al. | |
| 7,014,113 B1 | 3/2006 | Powell et al. | |
| 7,128,266 B2 | 10/2006 | Zhu et al. | |
| 7,188,770 B2 | 3/2007 | Zhu et al. | |
| 7,198,195 B2 | 4/2007 | Bobba et al. | |
| 7,201,322 B2 | 4/2007 | Olmstead et al. | |
| 7,204,420 B2 | 4/2007 | Barkan et al. | |
| 7,213,762 B2 | 5/2007 | Zhu et al. | |
| 7,234,641 B2 | 6/2007 | Olmstead | |
| 7,273,180 B2 | 9/2007 | Zhu et al. | |
| 7,296,744 B2 | 11/2007 | He et al. | |
| 7,317,813 B2 | 1/2008 | Yanagawa et al. | |
| 7,398,927 B2 | 7/2008 | Olmstead et al. | |
| 7,490,770 B2 | 2/2009 | Shearin | |
| 7,533,819 B2 | 5/2009 | Barken et al. | |
| 7,757,955 B2 | 7/2010 | Barkan | |
| 7,780,086 B2 | 8/2010 | Barkan et al. | |
| 8,248,592 B2 | 8/2012 | Taniguchi et al. | |
| 2001/0009508 A1 | 7/2001 | Umemoto et al. | |
| 2001/0032884 A1 | 10/2001 | Ring et al. | |
| 2001/0042789 A1 | 11/2001 | Krichever et al. | |
| 2002/0043561 A1 | 4/2002 | Tsikos et al. | |
| 2002/0088859 A1 | 7/2002 | Bengala | |
| 2004/0031851 A1 | 2/2004 | Bianculli et al. | |
| 2004/0051062 A1 | 3/2004 | Gehring et al. | |
| 2004/0175038 A1 | 9/2004 | Bonner et al. | |
| 2004/0223202 A1 | 11/2004 | Lippert et al. | |
| 2005/0103857 A1 | 5/2005 | Zhu et al. | |
| 2006/0002205 A1 | 1/2006 | Mimoto et al. | |
| 2006/0022051 A1 | 2/2006 | Patel et al. | |
| 2006/0032919 A1 * | 2/2006 | Shearin | 235/454 |
| 2006/0043194 A1 * | 3/2006 | Barkan et al. | 235/462.45 |
| 2006/0081712 A1 * | 4/2006 | Rudeen et al. | 235/462.08 |
| 2006/0151604 A1 | 7/2006 | Zhu et al. | |
| 2006/0163355 A1 | 7/2006 | Olmstead et al. | |
| 2006/0202036 A1 | 9/2006 | Wang et al. | |
| 2006/0278708 A1 | 12/2006 | Olmstead | |
| 2007/0175996 A1 | 8/2007 | Barkan et al. | |
| 2007/0201009 A1 | 8/2007 | Suzuki et al. | |
| 2007/0278309 A1 | 12/2007 | Knowles et al. | |
| 2007/0297021 A1 | 12/2007 | Smith | |
| 2008/0017715 A1 | 1/2008 | Knowles et al. | |
| 2008/0017716 A1 | 1/2008 | Knowles et al. | |
| 2008/0023558 A1 | 1/2008 | Knowles et al. | |
| 2008/0029605 A1 | 2/2008 | Knowles et al. | |
| 2008/0041954 A1 | 2/2008 | Gannon et al. | |
| 2008/0110992 A1 | 5/2008 | Knowles et al. | |
| 2008/0110994 A1 | 5/2008 | Knowles et al. | |
| 2008/0128509 A1 | 6/2008 | Knowles et al. | |
| 2008/0135619 A1 | 6/2008 | Kwan | |
| 2008/0142596 A1 | 6/2008 | Knowles et al. | |
| 2008/0217201 A1 | 9/2008 | Keller et al. | |
| 2009/0001166 A1 | 1/2009 | Barken et al. | |
| 2009/0020612 A1 | 1/2009 | Drzymala et al. | |
| 2009/0084847 A1 | 4/2009 | He et al. | |
| 2009/0084854 A1 | 4/2009 | Carlson et al. | |
| 2009/0206161 A1 | 8/2009 | Olmstead | |
| 2010/0001075 A1 | 1/2010 | Barkan | |
| 2010/0051695 A1 | 3/2010 | Yepez et al. | |
| 2010/0147953 A1 | 6/2010 | Barkan | |
| 2010/0163622 A1 | 7/2010 | Olmstead | |
| 2010/0163626 A1 | 7/2010 | Olmstead | |
| 2010/0163627 A1 | 7/2010 | Olmstead | |
| 2010/0163628 A1 | 7/2010 | Olmstead | |
| 2010/0165160 A1 | 7/2010 | Olmstead et al. | |
| 2010/0219249 A1 | 9/2010 | Barkan et al. | |
| 2010/0252633 A1 | 10/2010 | Barkan et al. | |
| 2011/0127333 A1 | 6/2011 | Veksland et al. | |
| 2013/0200157 A1 | 8/2013 | Nunnink et al. | |

FOREIGN PATENT DOCUMENTS

| | | |
|---|---|---|
| EP | 1020810 | 7/2000 |
| EP | 1178343 A2 * | 2/2002 |
| EP | 1380983 | 1/2004 |
| EP | 1933254 | 6/2008 |
| JP | 4251992 A | 9/1992 |
| JP | 07-168905 | 7/1995 |
| JP | 2005521164 | 7/2005 |
| JP | 2007-521575 A | 8/2007 |
| KR | 10-2001/0005875 A | 1/2001 |
| WO | WO 98/44330 | 10/1998 |
| WO | WO 03/081521 A1 | 10/2003 |
| WO | WO 2007/149876 | 12/2007 |

OTHER PUBLICATIONS

"Enhanced Laser Shutter Using a Hard Disk Drive Rotary Voice-Coil Actuator," http://rsi.aip.org/resources/1/rsinak/v78/i2/p026101_s1?isAuthorized=no See also http://scitation.aip.org/getabs/servlet/GetabsServlet?prog=normal&id=RSINAK00 . . . , published Feb. 9, 2007.

International Search Report and Written Opinion, PCT/US2009/068680, Aug. 17, 2010.

Putting the "world" in Wincor World, http://www.retailcustomerexperience.com/article/4371/Putting-the-world-in-Wincor-World, visited Sep. 15, 2011, 3 pages.

Wincor World: 360-degree scanning will speed check-out, http://www.retailcustomerexperience.com/article/4374/WINCOR-WORLD-360-degree-scanning-will-speed-check-out, visited Aug. 24, 2011, 1 page.

Wincor World focuses on service, automated checkout, http://www.retailcustomerexperience.com/article/3626/Wincor-World-focuses-on-service-automated-checkout?rc_id=16, visited Sep. 15, 2011, 3 pages.

Why Retailers Invest in Self-Service in 2009, http://www.kioskeurope.com/print/1726, visited Sep. 15, 2011, 3 pages.

(56) References Cited

OTHER PUBLICATIONS

May 25, 2012 Extended European Search Report concerning European Pat. Appl. No. 09835885.6, which corresponds to the subject U.S. application.

May 25, 2012 Extended European Search Report concerning European Pat, Appl. No. 09835886.4, which corresponds to the related U.S. Appl. No. 12/370,497.

Office Action of May 21, 2012 in co-pending U.S. Appl. No. 12/370,497.

May 14, 2012 Notice of Allowance concerning co-pending U.S. Appl. No. 12/645,984.

Aug. 2, 2012 Notice of Allowance concerning co-pending U.S. Appl. No. 12/646,755.

International Search Report for PCT Patent Application No. PCT/US2007/071590, published Feb. 21, 2010.

European Search Report dated Feb. 15, 2010 for European Application No. 07798775.8.

Srinivasan, "A New Class of Mirrors for Wide-Angle Imaging," Centre for Visual Sciences, Research School of Biological Sciences, Australian National University, (date unknown, but circa 2000).

International Search Report and Written Opinion for PCT Patent Application No. PCT/US2009/033237, issued Jul. 31, 2009.

International Search Report and Written Opinion for PCT Patent Application No. PCT/US2009/069536, issued Jul. 30, 2010.

International Search Report and Written Opinion for PCT Patent Application No. PCT/US2009/069537, issued Jul. 30, 2010.

International Search Report and Written Opinion for PCT Patent Application No. PCT/US2009/069530, issued Aug. 16, 2010.

Website—http://www.e2v.com/news/e2v-introduces-new-high-spec-1-3mp-cmo . . . Sep. 14, 2009.

Sep. 18, 2013 Office action concerning corresponding Chinese Pat. Appl. No. 200980157547.X.

\* cited by examiner

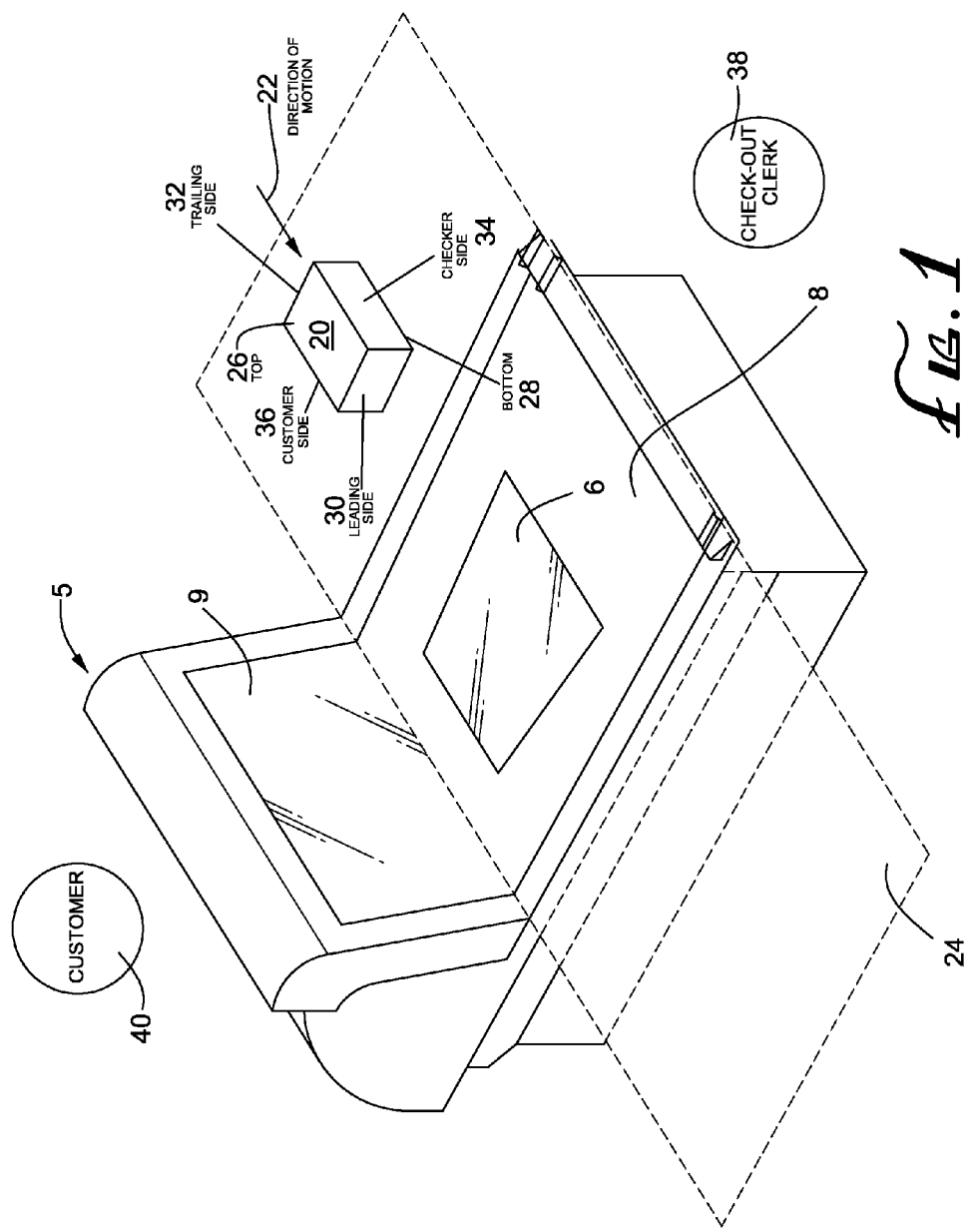

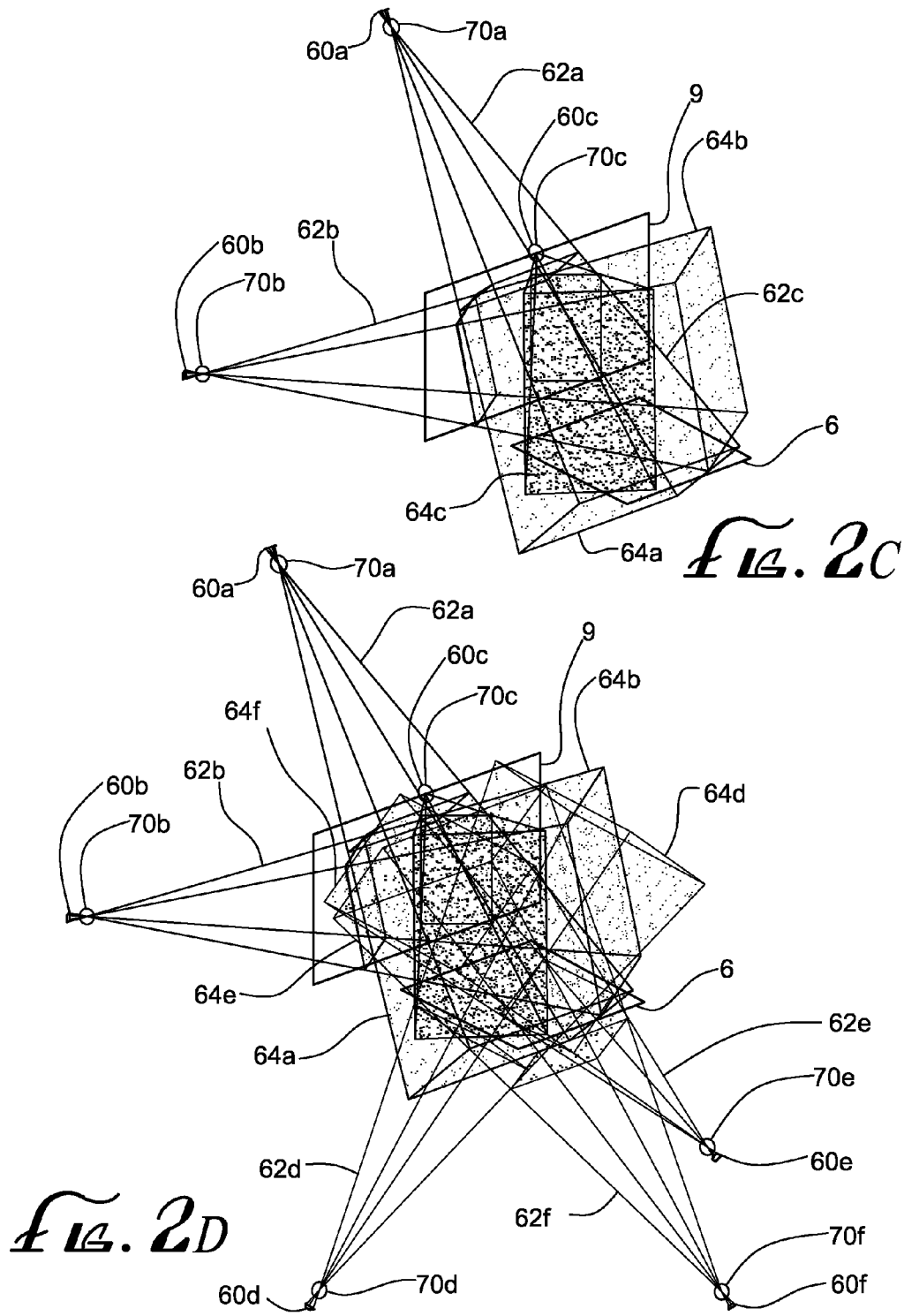

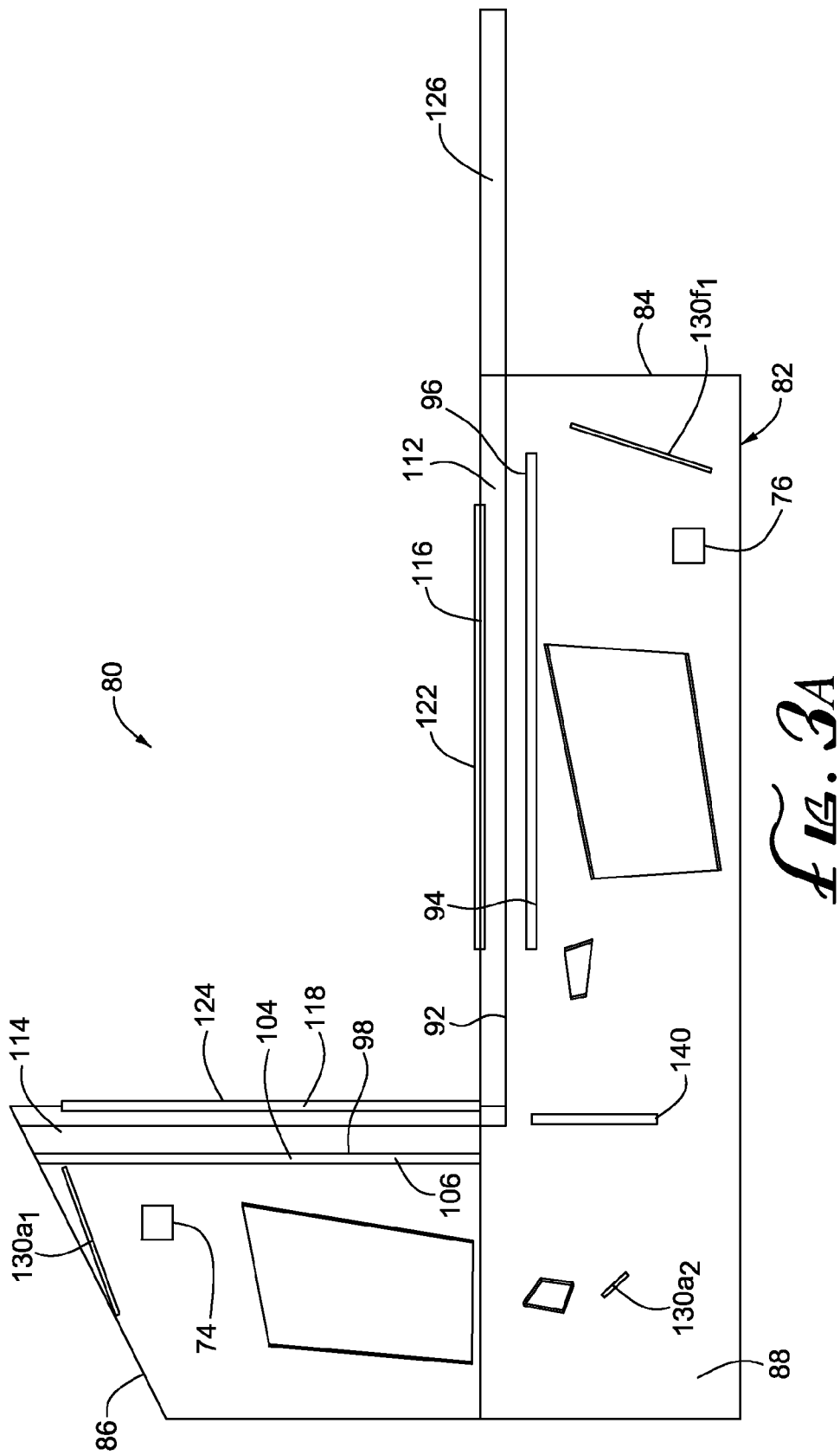

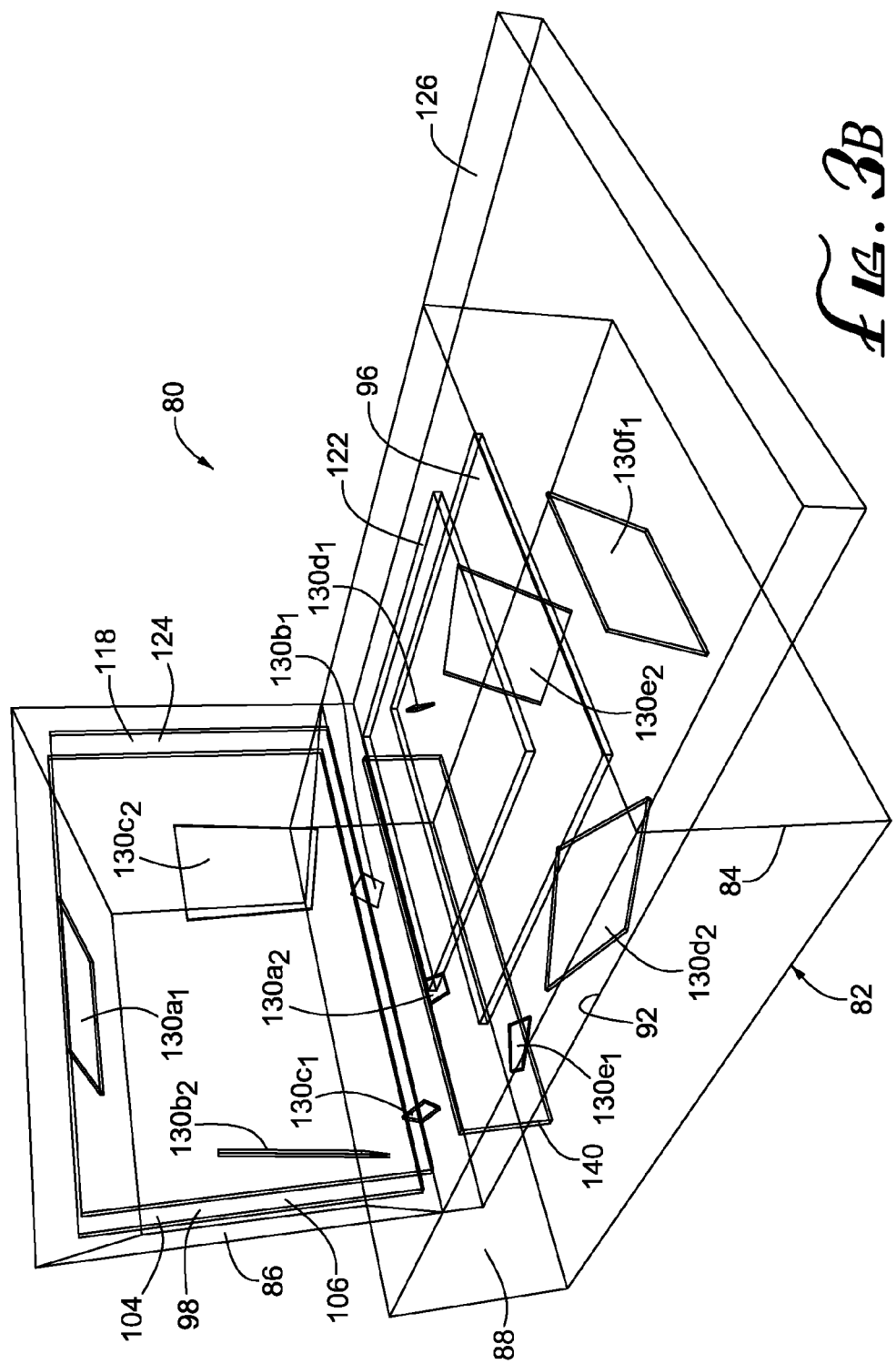

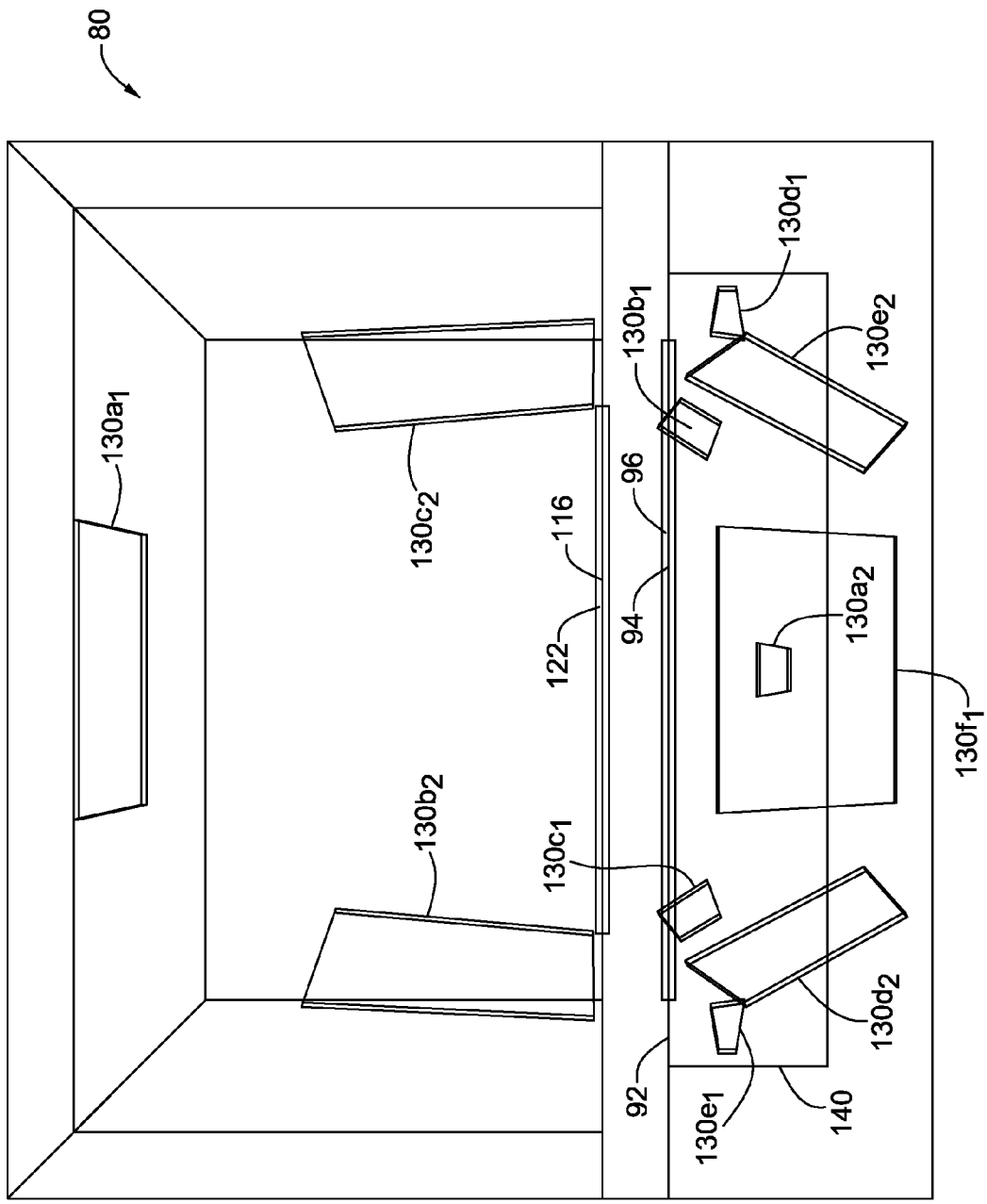

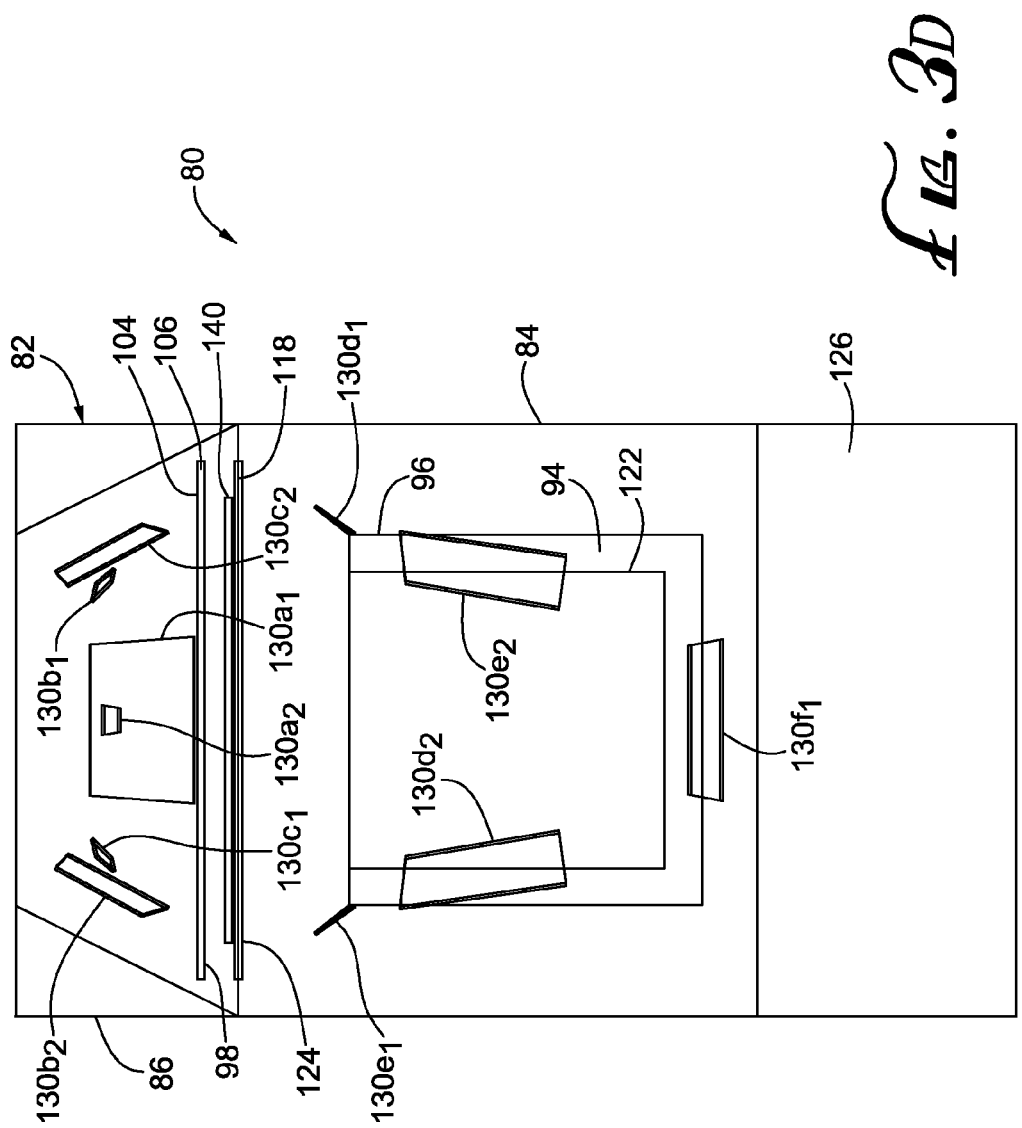

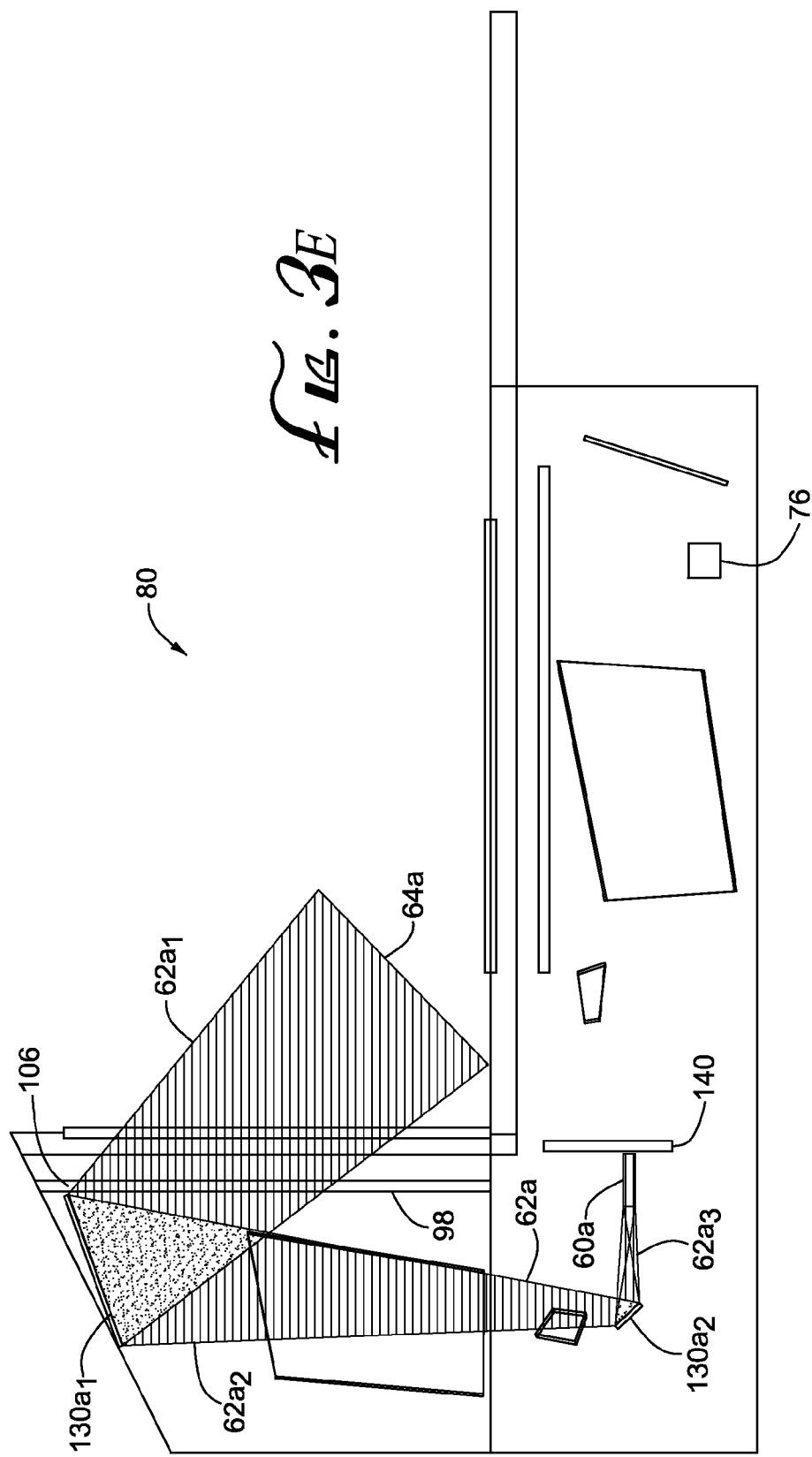

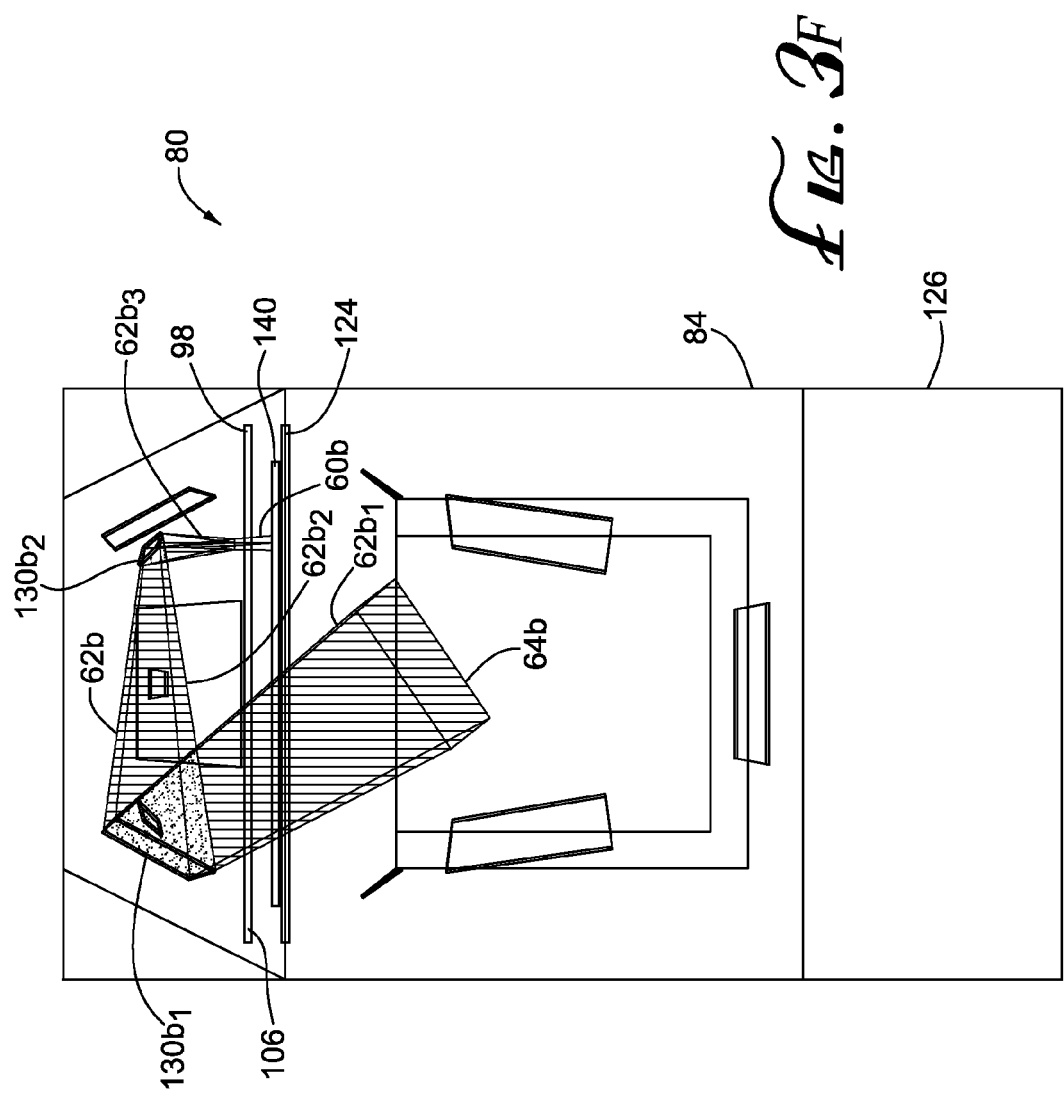

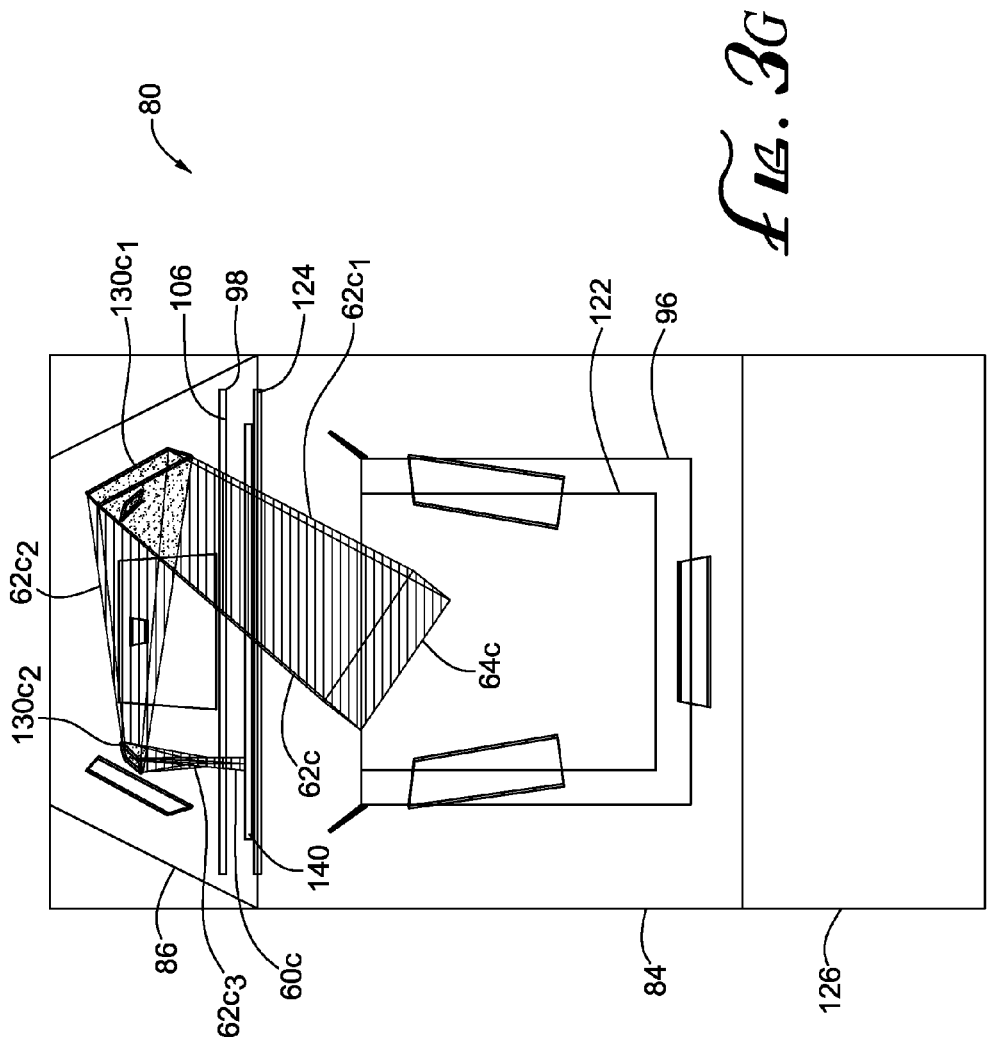

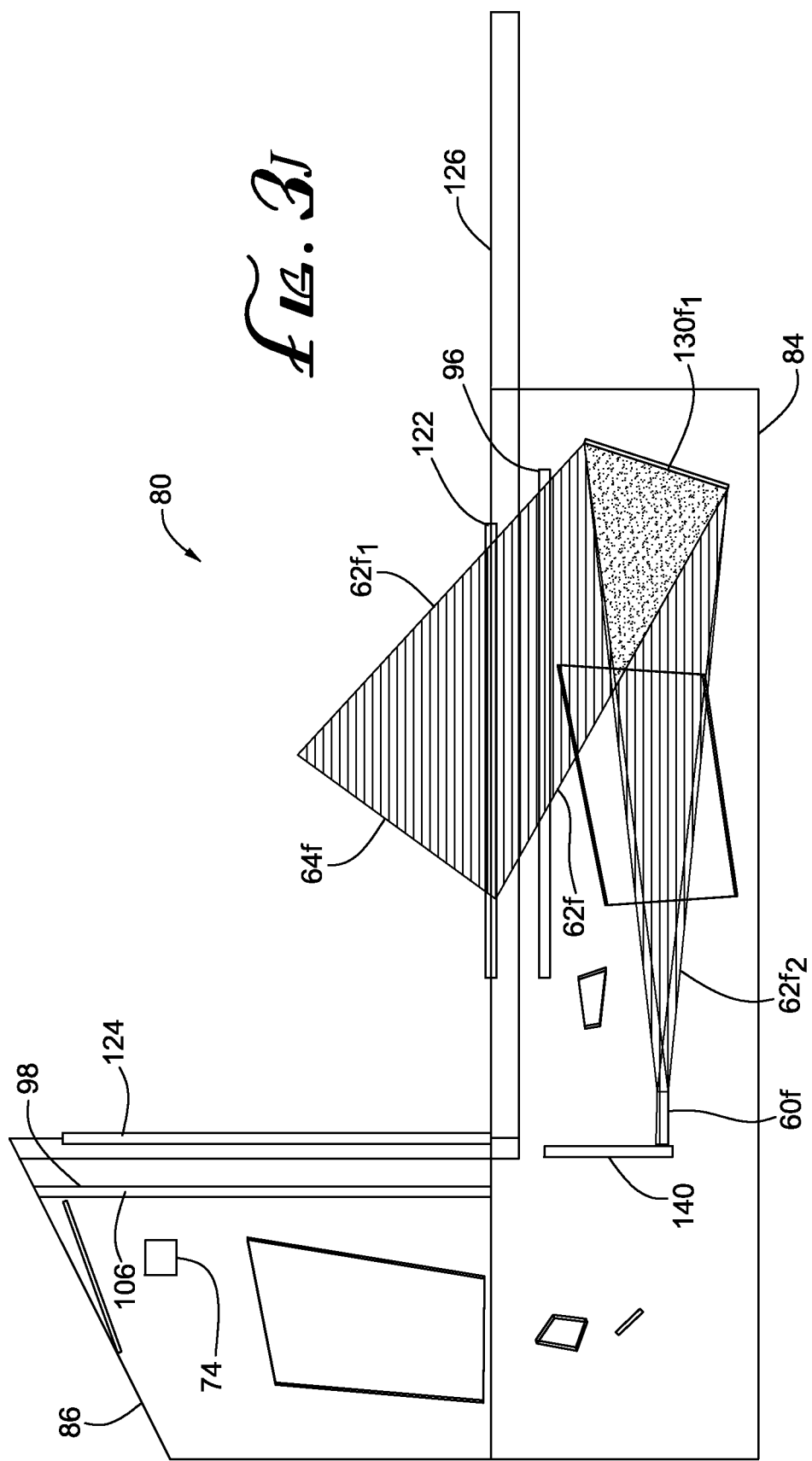

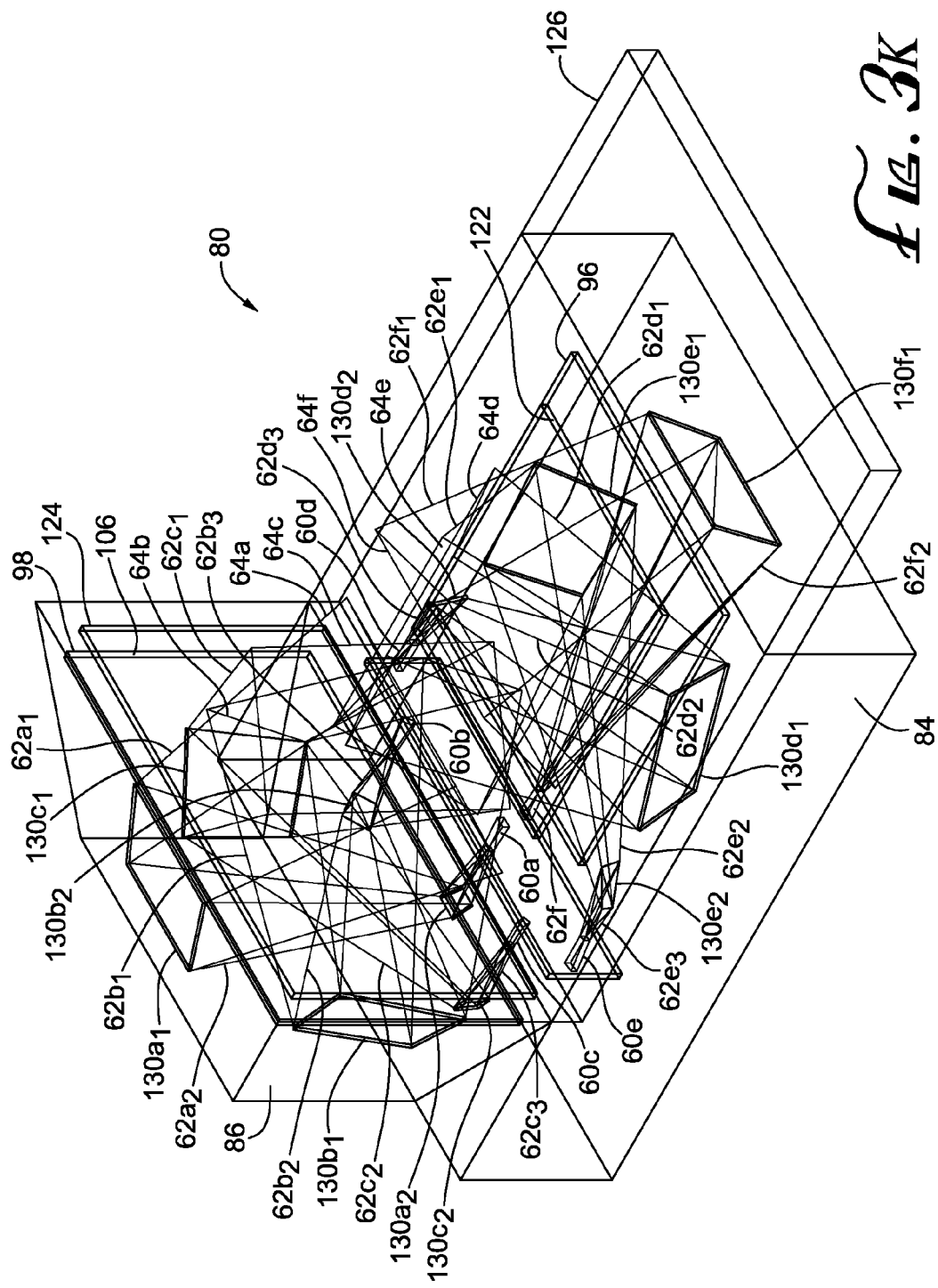

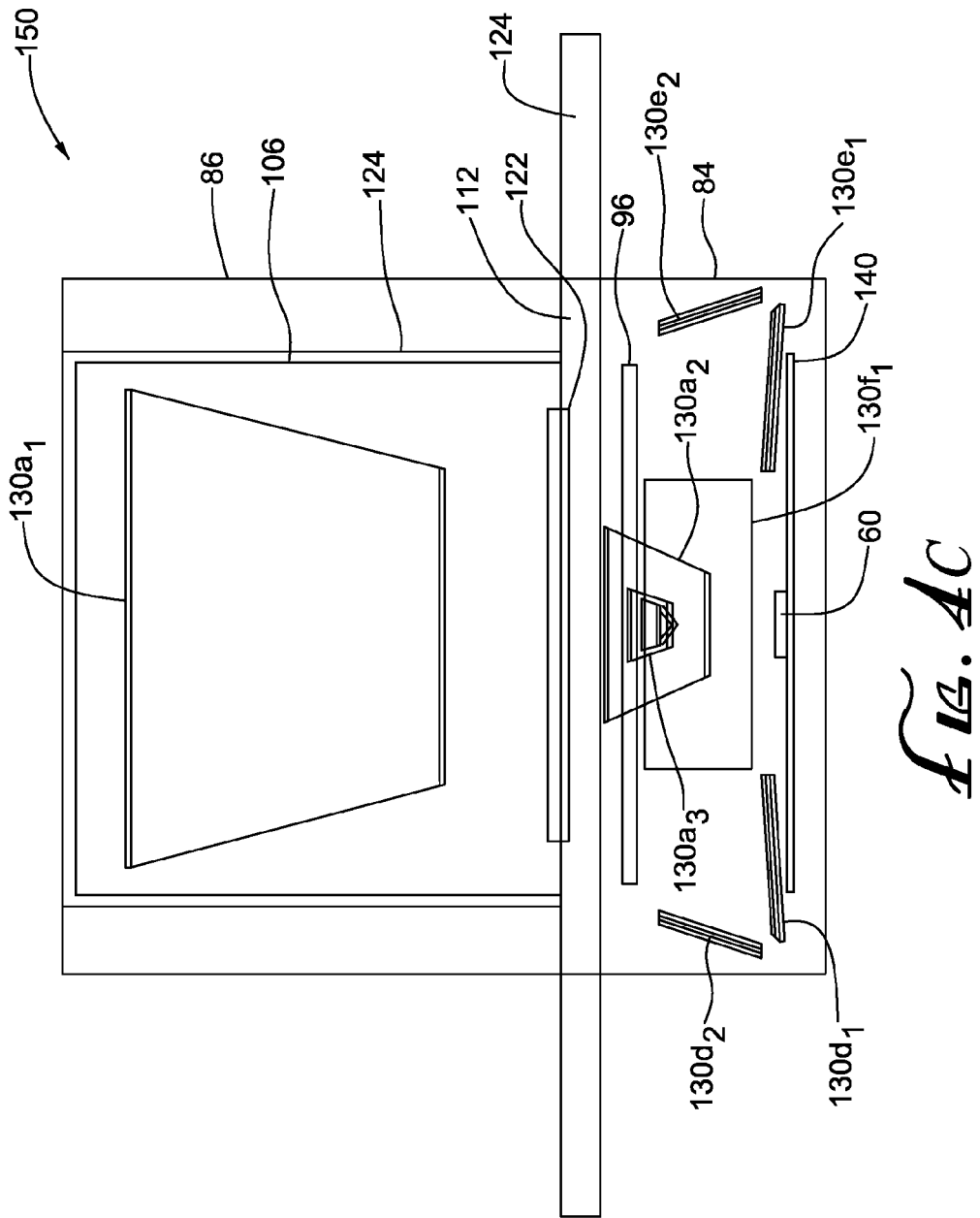

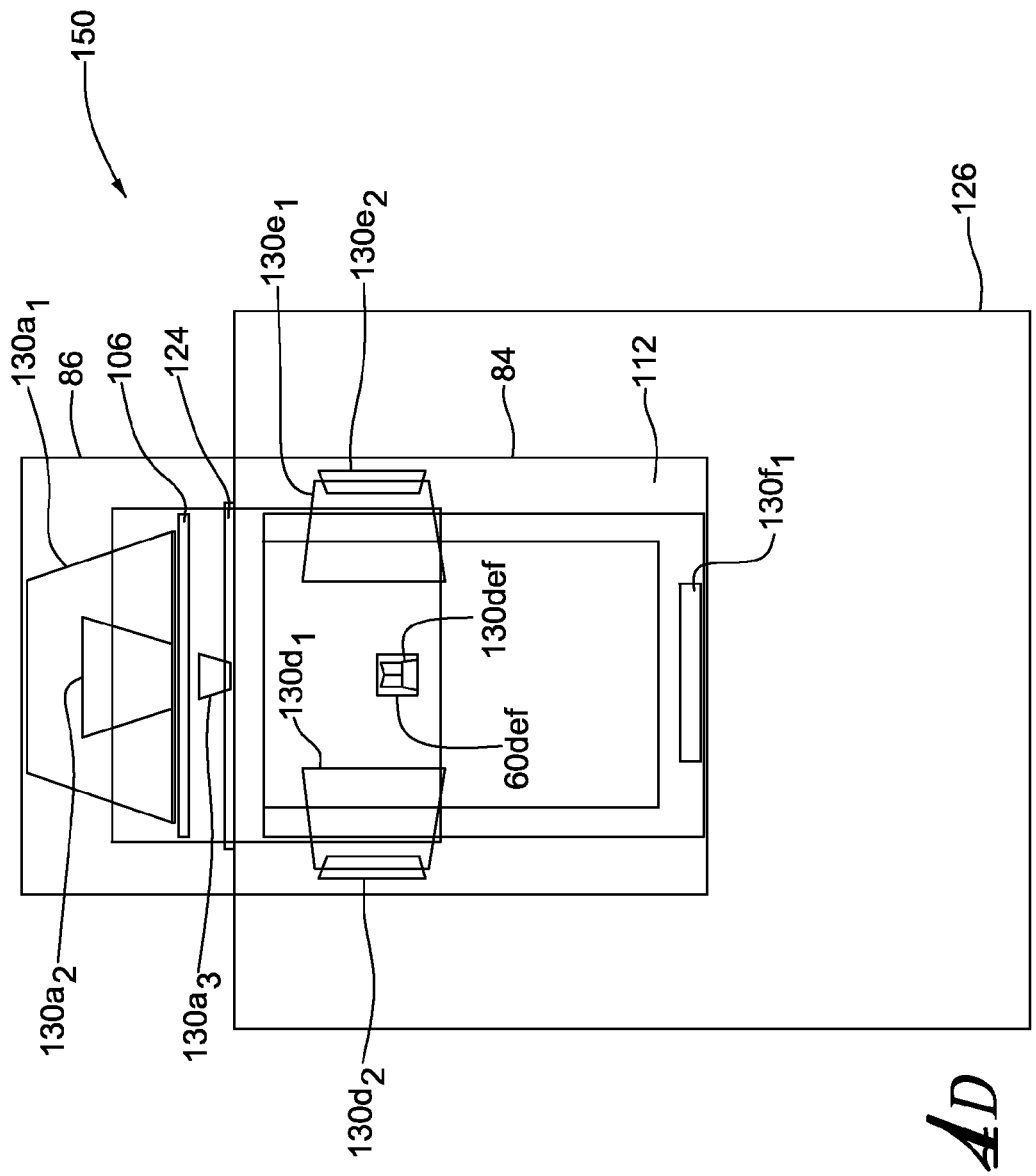

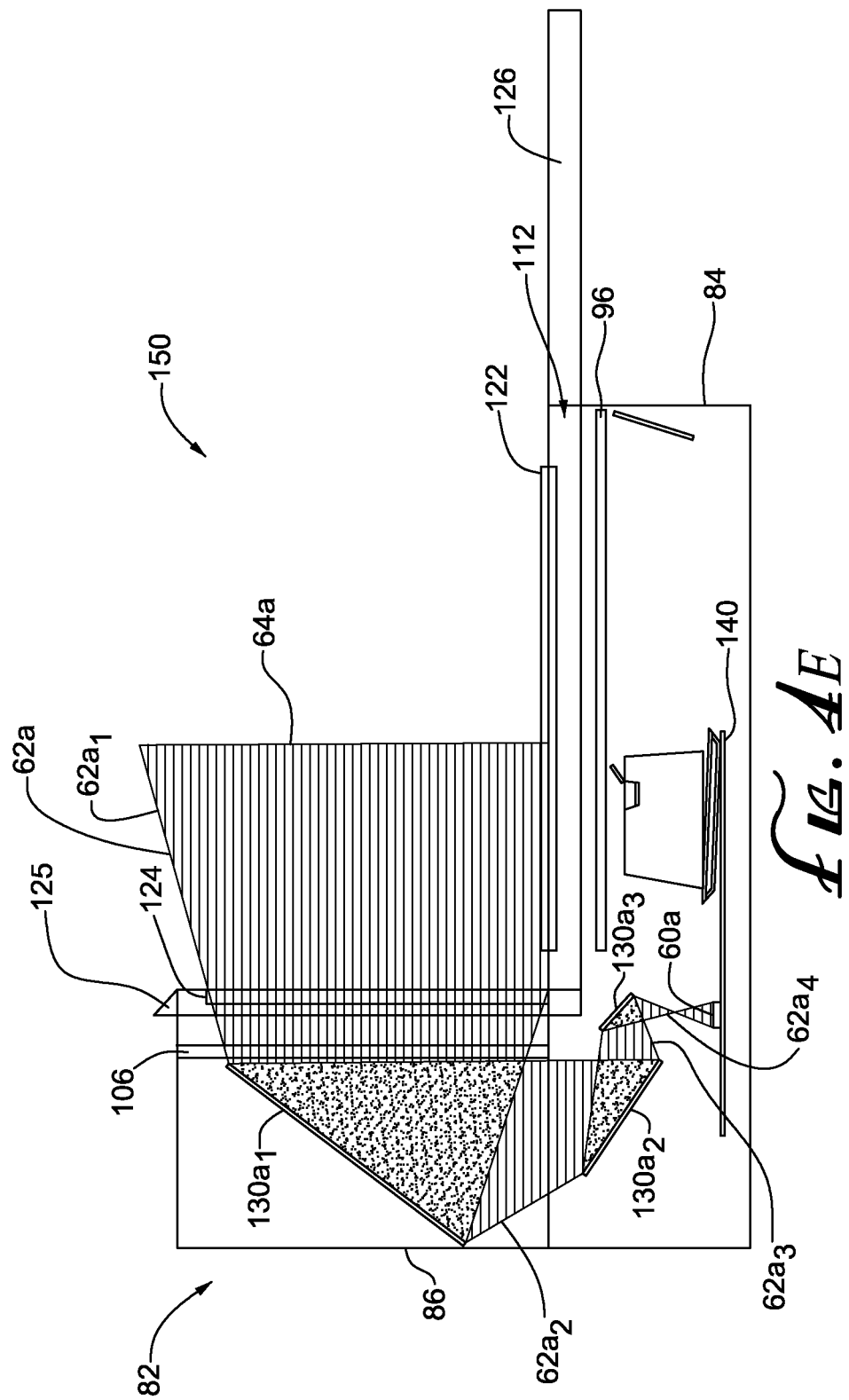

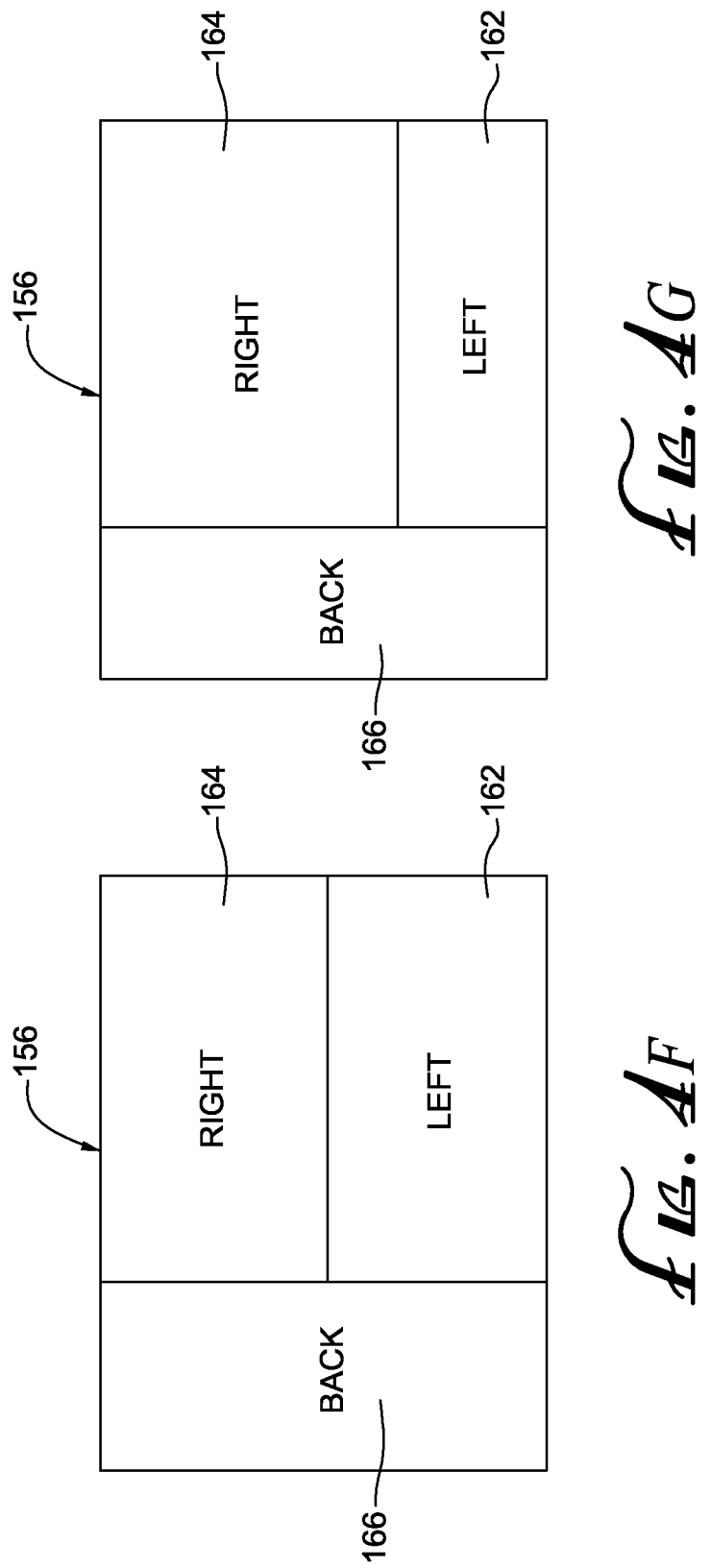

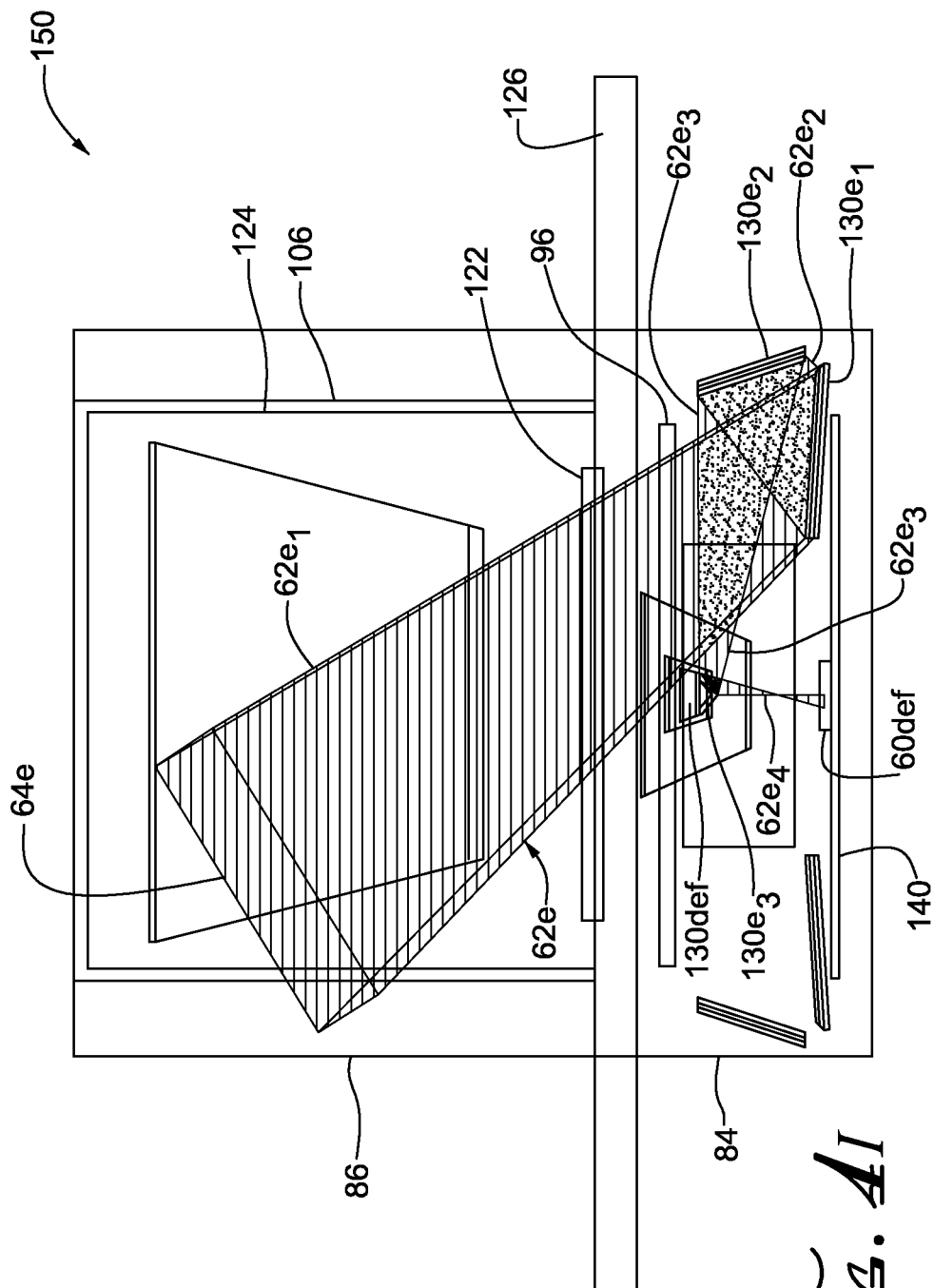

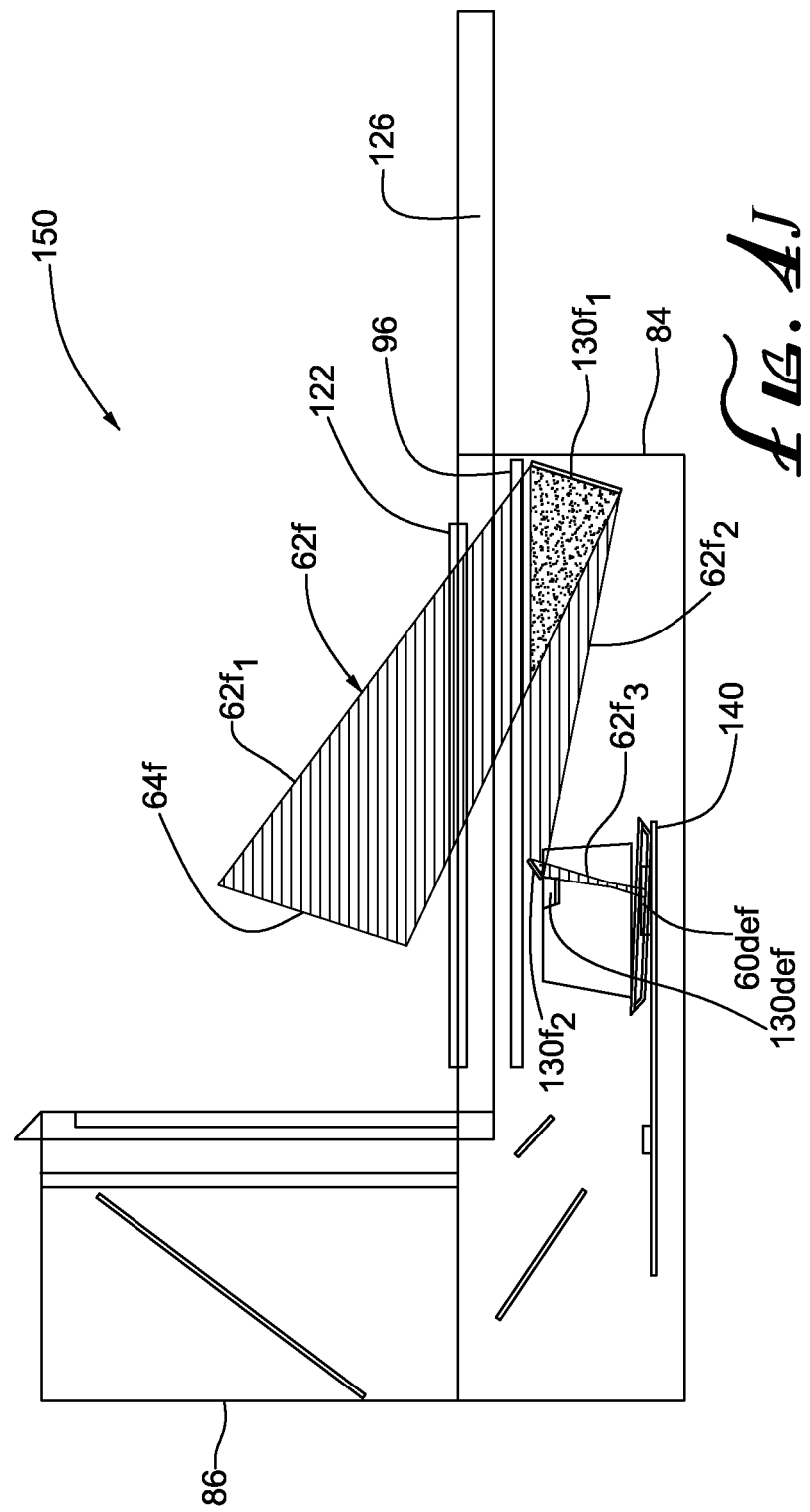

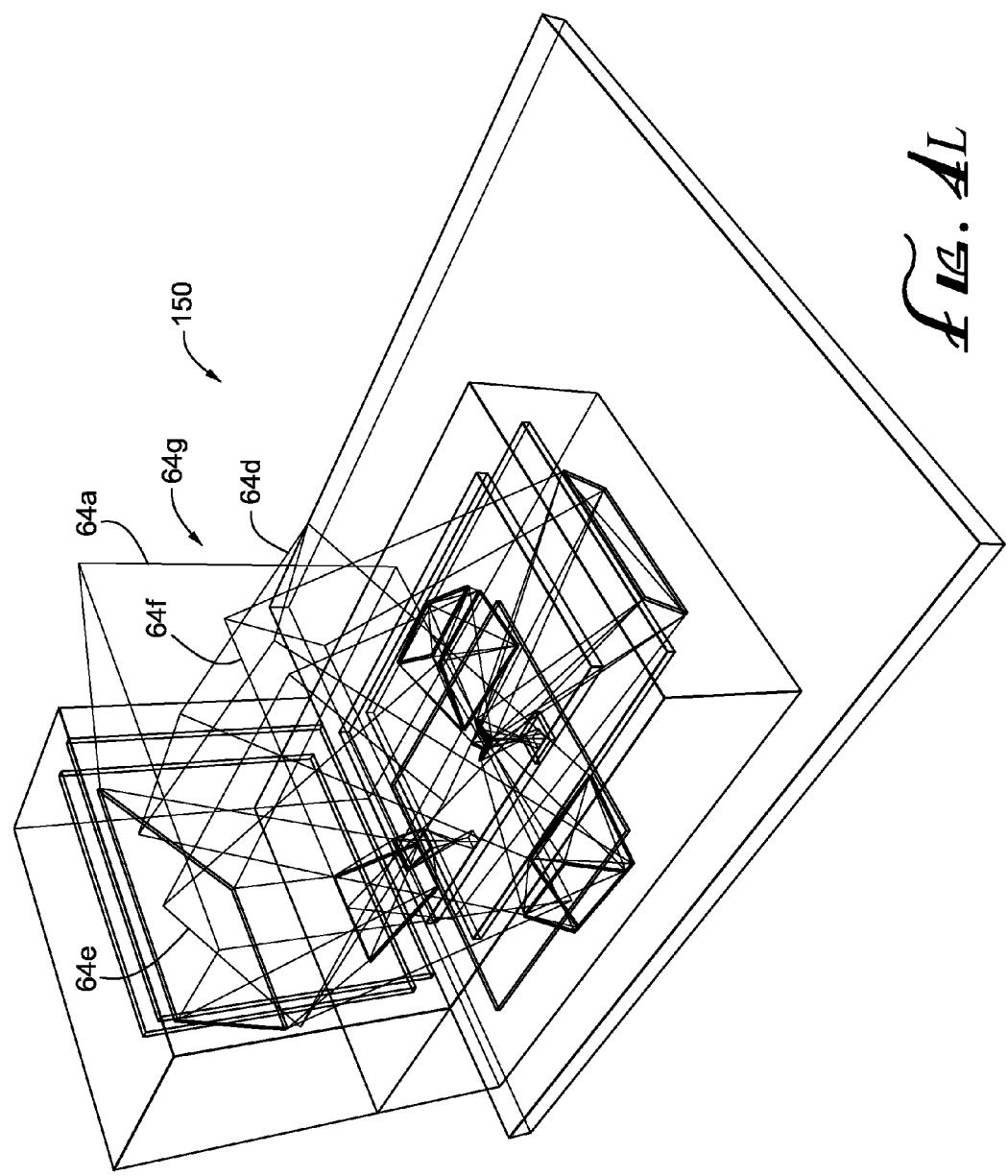

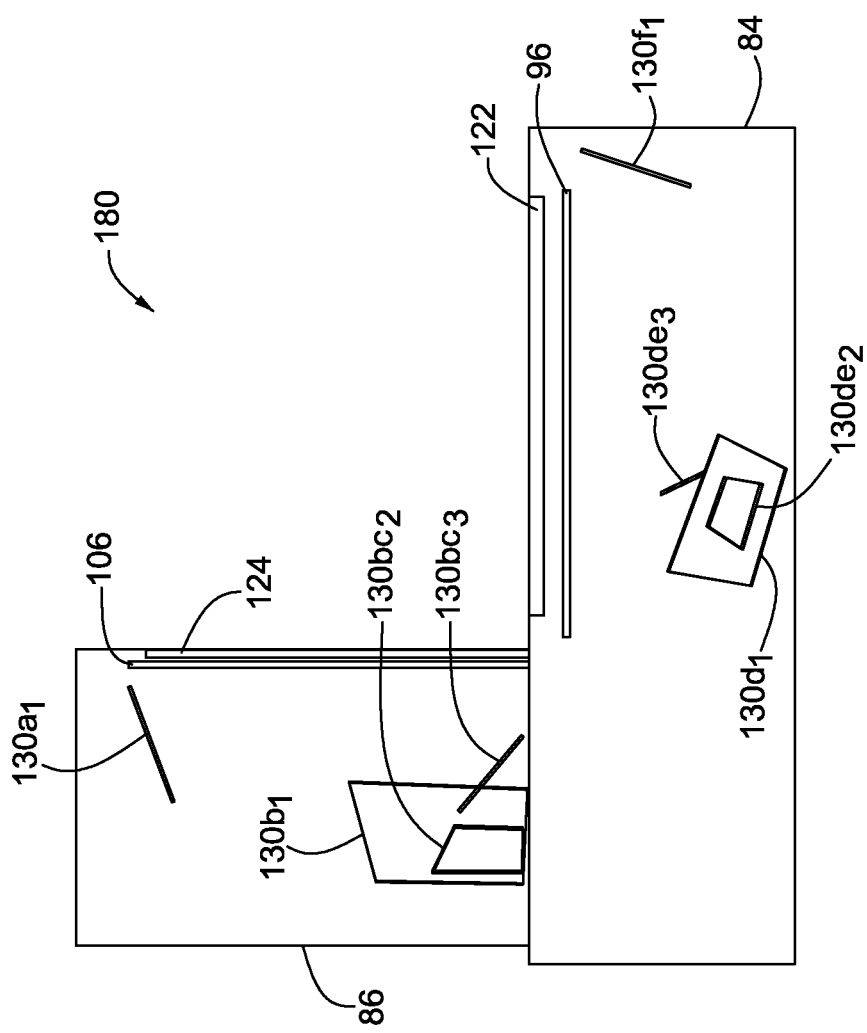

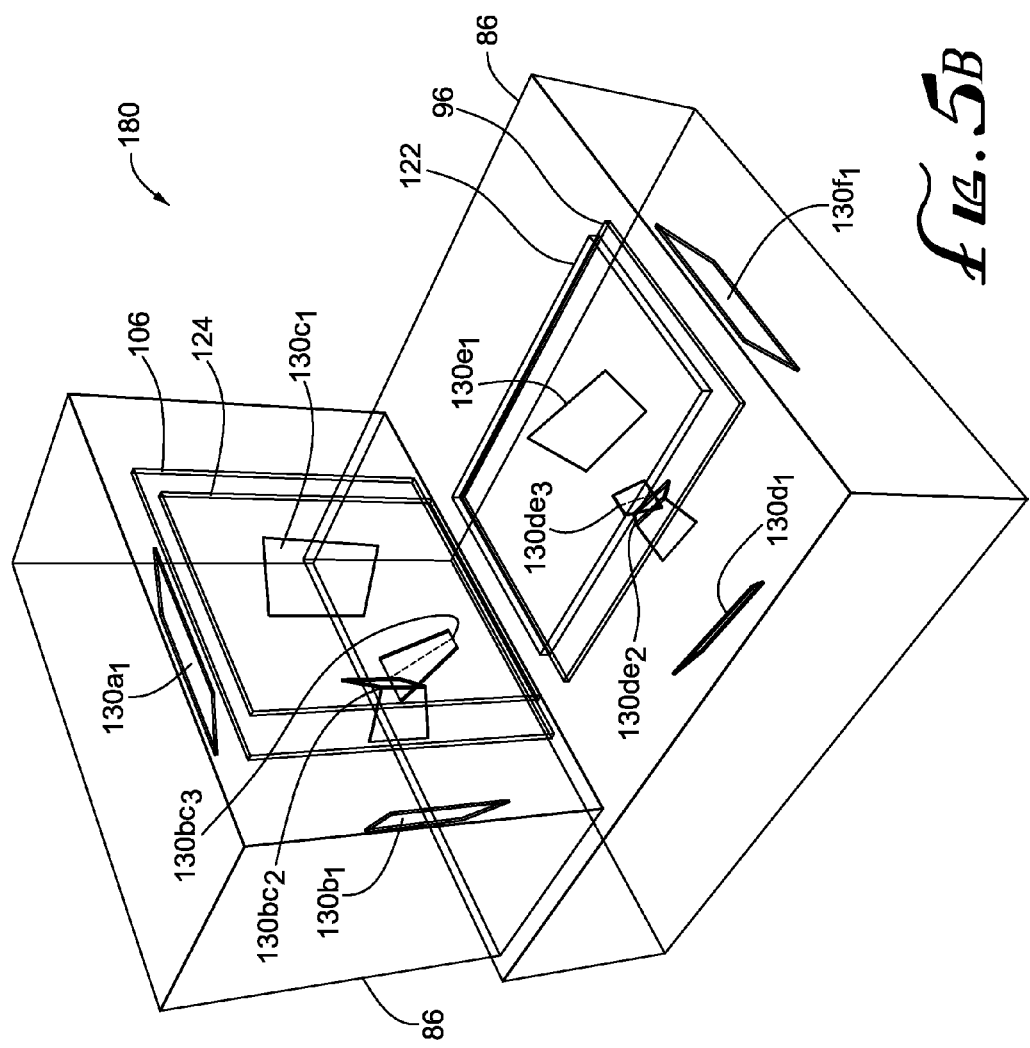

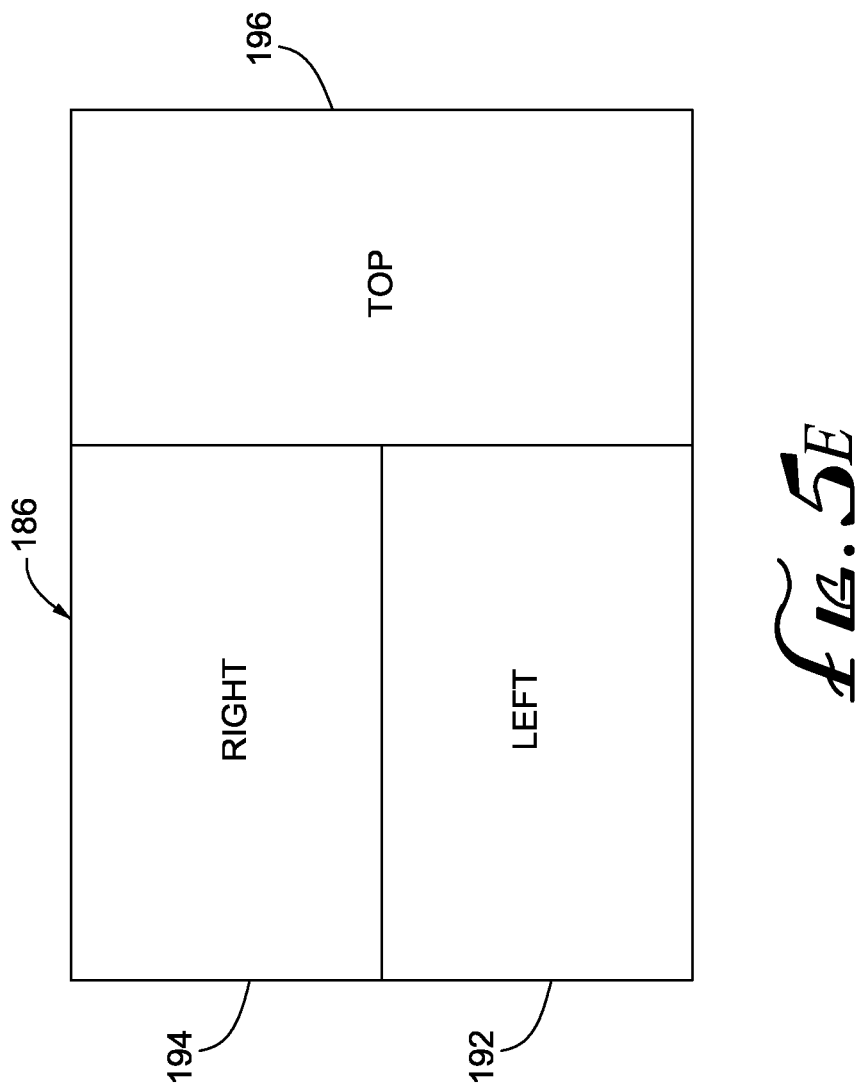

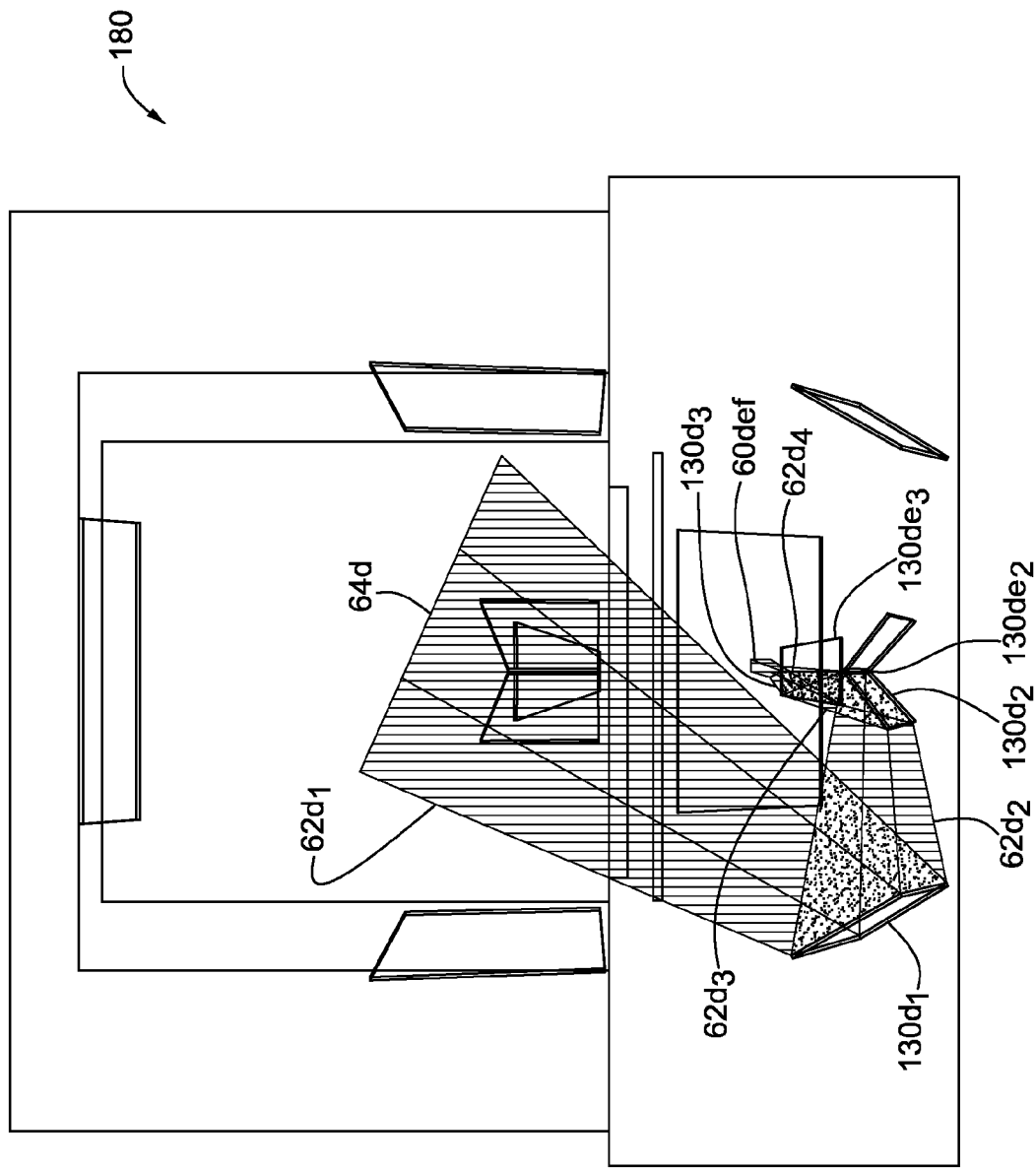

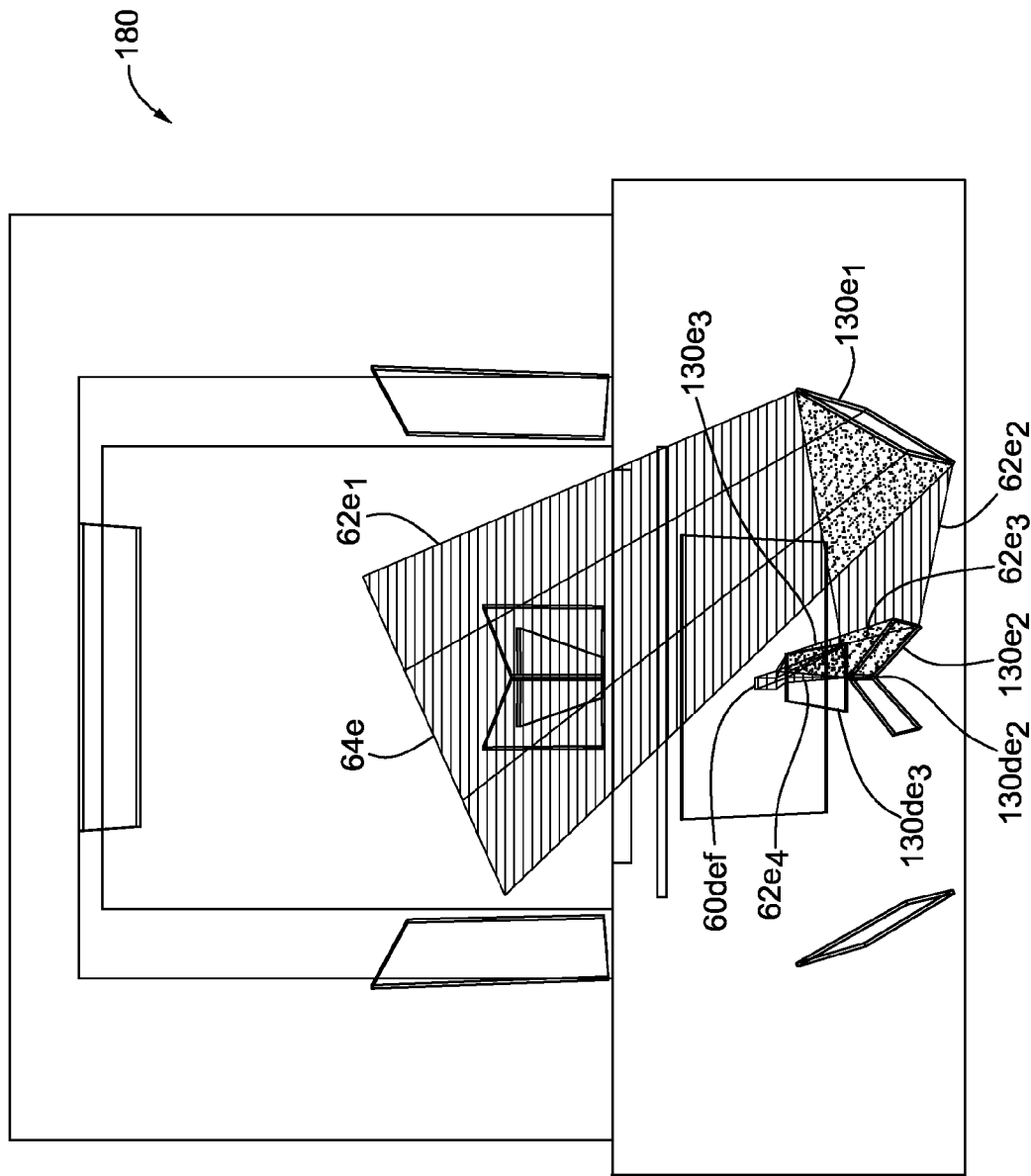

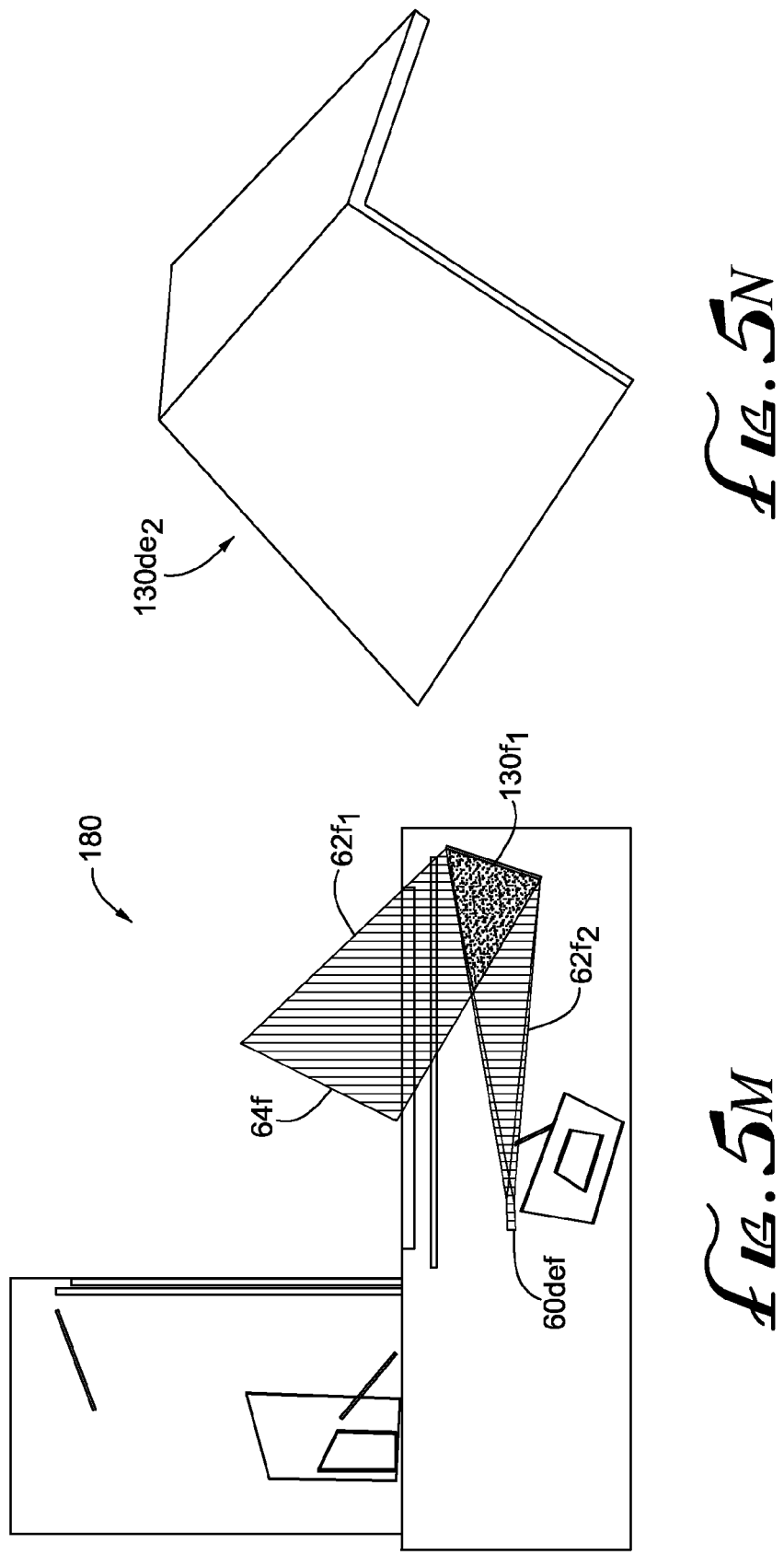

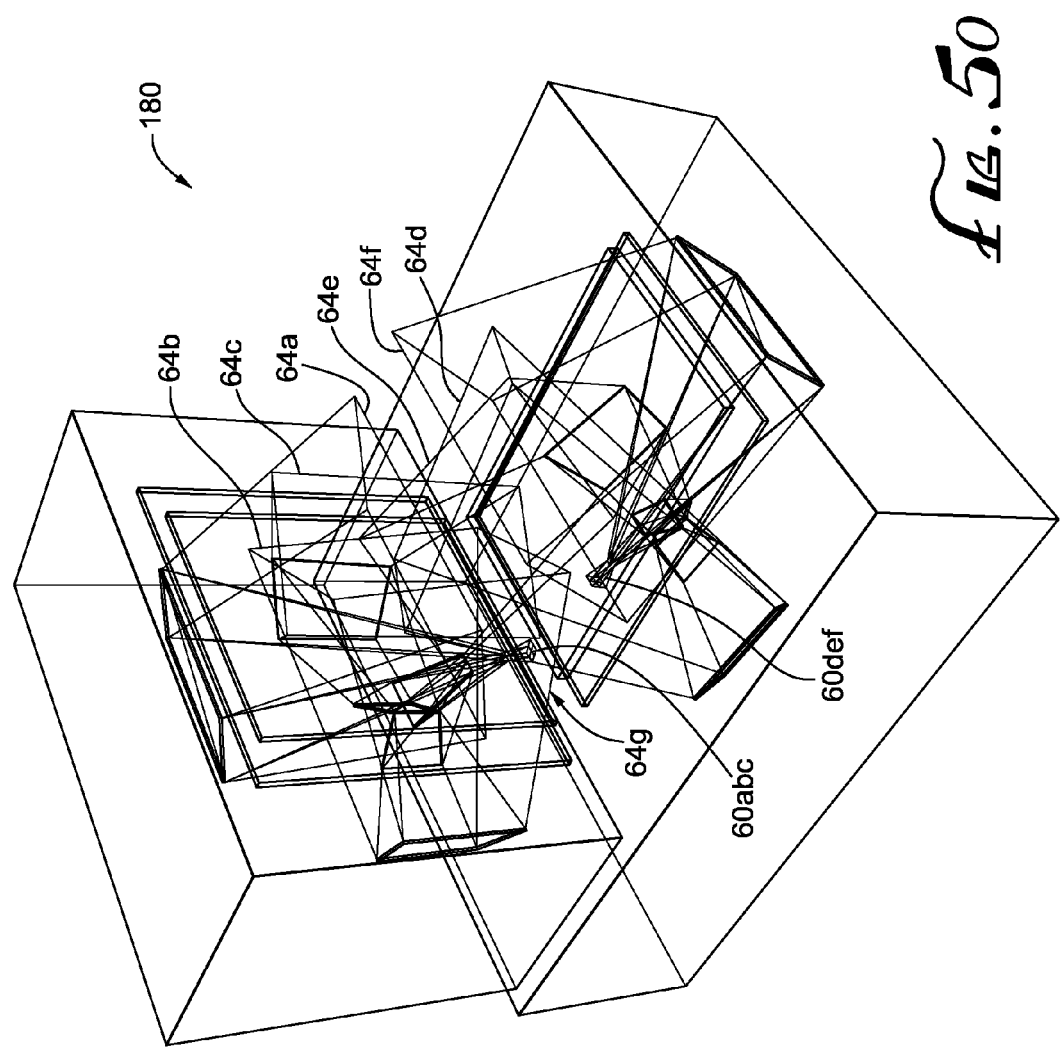

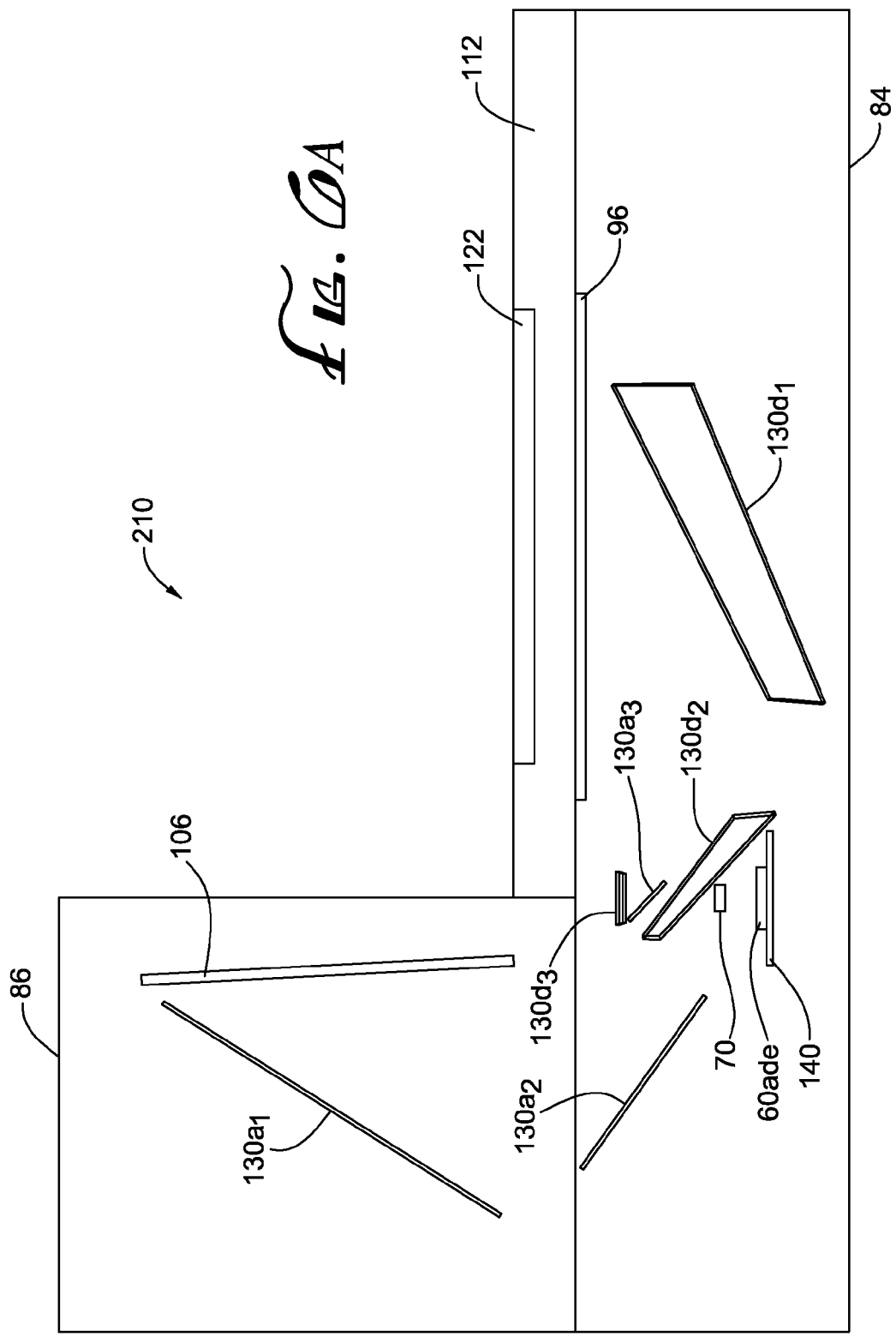

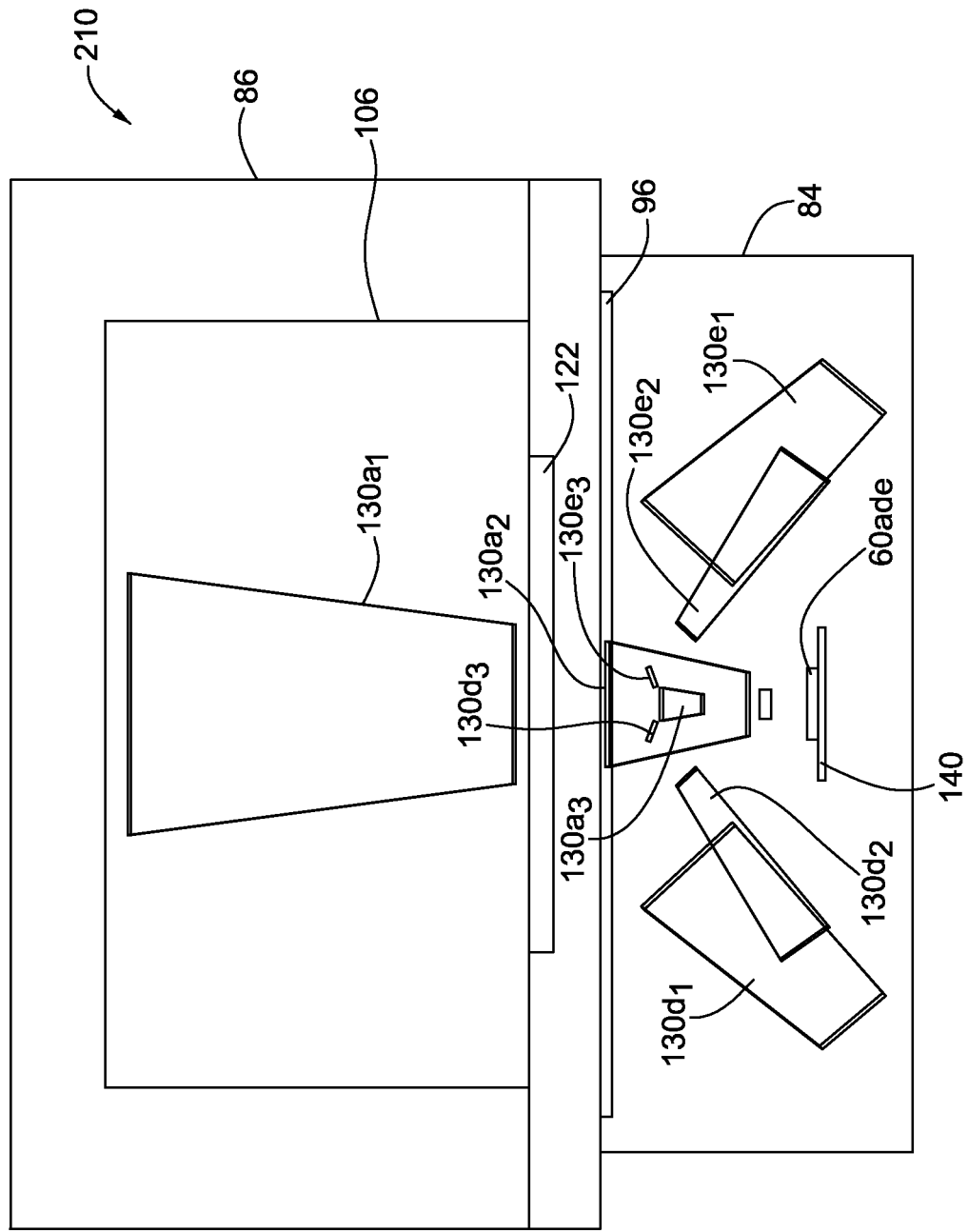

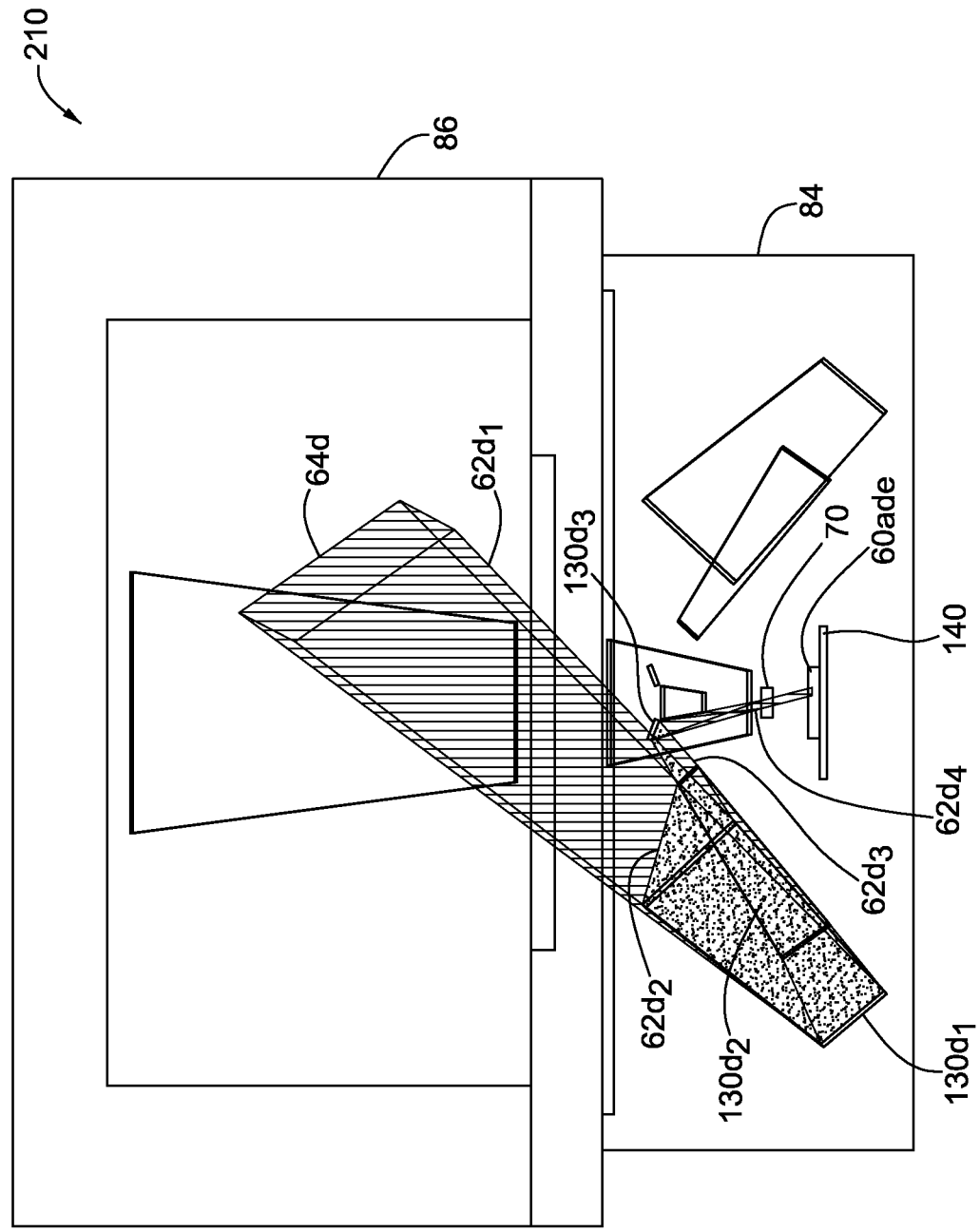

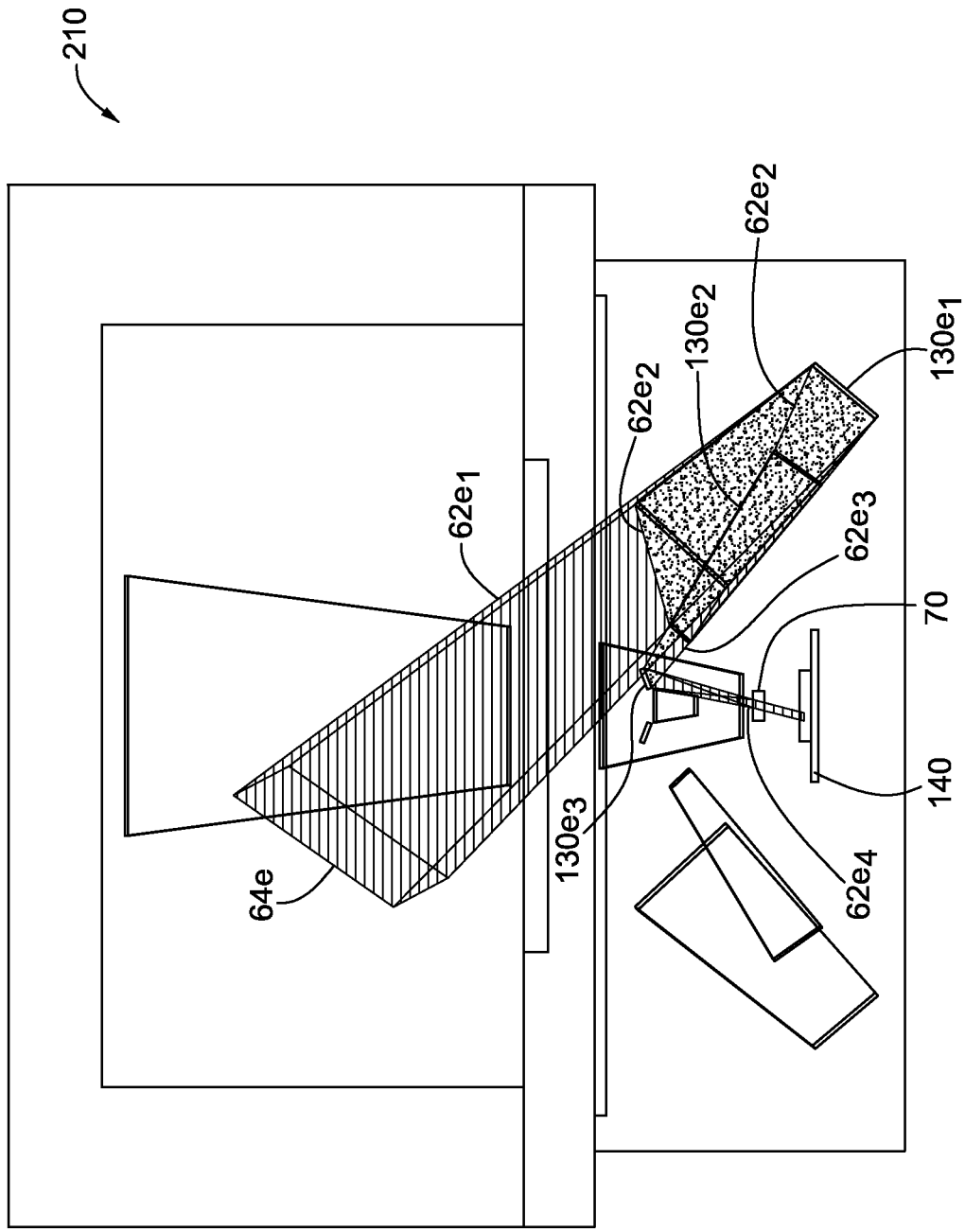

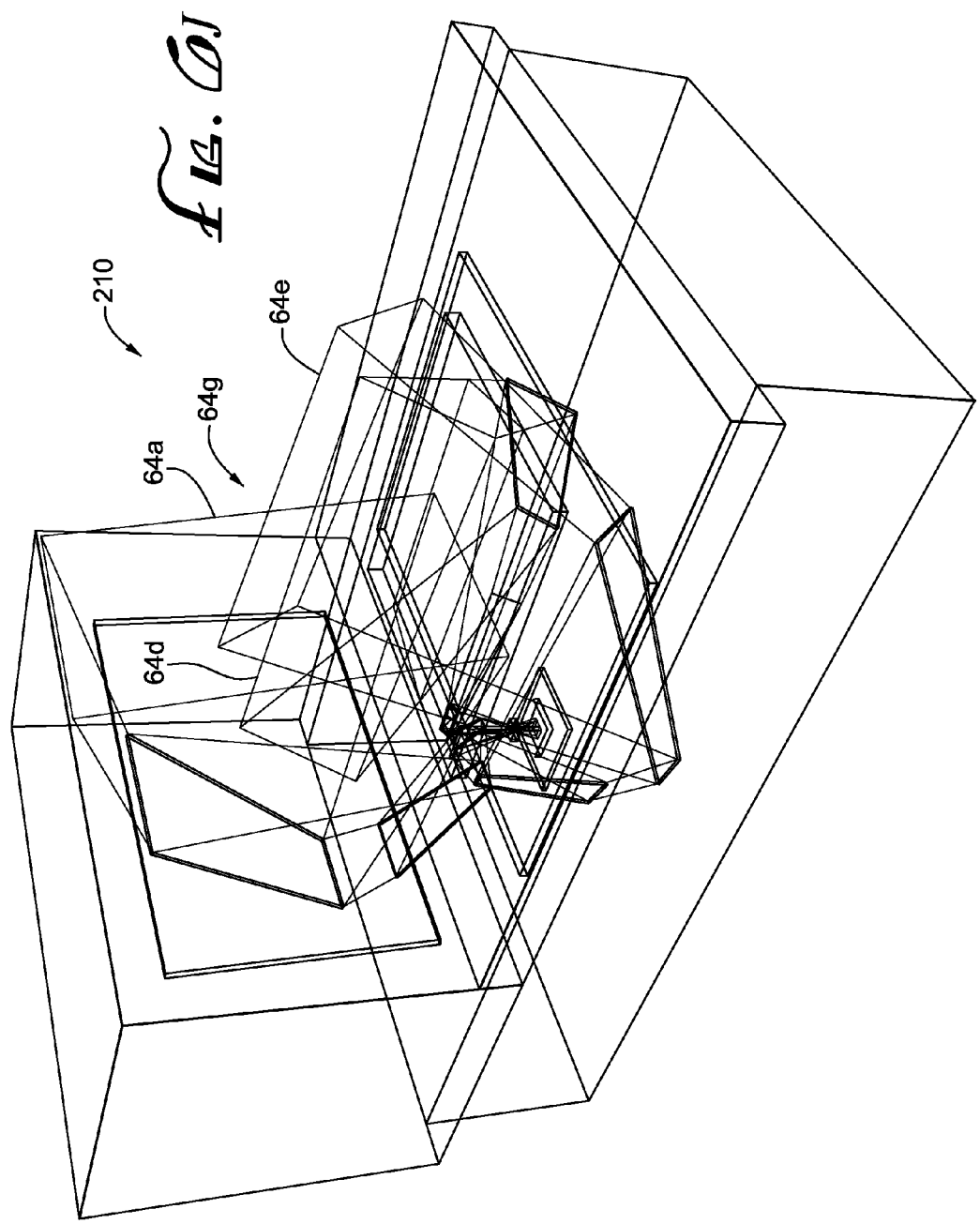

TWO-PLANE OPTICAL CODE READER FOR ACQUISITION OF MULTIPLE VIEWS OF AN OBJECT

RELATED APPLICATIONS

This application claims benefit under 35 U.S.C. §119(e) of U.S. provisional patent application No. 61/140,930, entitled "Optical Code Reader Having Compact Arrangement for Acquisition of Multiple Views of an Object," filed Dec. 26, 2008. This application is also a continuation-in-part of U.S. application Ser. No. 12/370,497, filed Feb. 12, 2009, entitled "Systems and Methods for Forming a Composite Image of Multiple Portions of an Object From Multiple Perspectives," which claims priority under 35 U.S.C. §119 to (1) U.S. provisional application No. 61/028,164, filed Feb. 12, 2008, with the same title and (2) U.S. provisional application No. 61/140,930. The disclosures of the foregoing applications are incorporated herein by reference in their entireties.

The entire disclosures of the assignee's U.S. patent application Ser. No. 12/645,984, filed on the same date as this application, entitled "Data Reader Having Compact Arrangement For Acquisition of Multiple Views of an Object," and U.S. patent application Ser. No. 12/646,794, filed on the same date as this application, entitled "Monolithic Mirror Structure for Use in a Multi-Perspective Optical Code Reader," are also incorporated by reference herein.

TECHNICAL FIELD

The field of this disclosure relates generally to imaging, and more particularly but not exclusively to reading of optical codes (e.g., bar codes).

BACKGROUND INFORMATION

Optical codes encode useful, optically-readable information about the items to which they are attached or otherwise associated. Perhaps the best known example of an optical code is the bar code. Bar codes are ubiquitously found on or associated with objects of various types, such as the packaging of retail, wholesale, and inventory goods; retail product presentation fixtures (e.g., shelves); goods undergoing manufacturing; personal or company assets; and documents. By encoding information, a bar code typically serves as an identifier of an object, whether the identification be to a class of objects (e.g., containers of milk) or a unique item (e.g., U.S. Pat. No. 7,201,322).

Bar codes include alternating bars (i.e., relatively dark areas) and spaces (i.e., relatively light areas). The pattern of alternating bars and spaces and the widths of those bars and spaces represent a string of binary ones and zeros, wherein the width of any particular bar or space is an integer multiple of a specified minimum width, which is called a "module" or "unit." Thus, to decode the information, a bar code reader must be able to reliably discern the pattern of bars and spaces, such as by determining the locations of edges demarking adjacent bars and spaces from one another, across the entire length of the bar code.

Bar codes are just one example of the many types of optical codes in use today. Bar codes are an example of a one-dimensional or linear optical code, as the information is encoded in one direction—the direction perpendicular to the bars and spaces. Higher-dimensional optical codes, such as, two-dimensional matrix codes (e.g., MaxiCode) or stacked codes (e.g., PDF 417), which are also sometimes referred to as "bar codes," are also used for various purposes.

An imager-based reader utilizes a camera or imager to generate electronic image data (typically in digital form) of an optical code. The image data is then processed to find and decode the optical code. For example, virtual scan line techniques are known techniques for digitally processing an image containing an optical code by looking across an image along a plurality of lines, typically spaced apart and at various angles, somewhat like a laser beam's scan pattern in a laser-based scanner.

Imager-based readers often can only form images from one perspective—usually that of a normal vector out of the face of the imager. Such imager-based readers therefore provide only a single point of view, which may limit the ability of the reader to recognize an optical code in certain circumstances. For example, because the viewing volume of an imager-based reader is typically conical in shape, attempting to read a bar code or other image in close proximity to the scanning window (reading "on the window") may be less effective than with a basket-type laser scanner. Also, when labels are oriented such that the illumination source is reflected directly into the imager, the imager may fail to read properly due to uniform reflection washing out the desired image entirely, or the imager may fail to read properly due to reflection from a textured specular surface washing out one or more elements. This effect may cause reading of shiny labels to be problematic at particular reflective angles. In addition, labels oriented at extreme acute angles relative to the imager may not be readable. Lastly, the optical code may be oriented on the opposite side of the package, being hidden from view of the imager by the package itself.

Thus, better performance could result from taking images from multiple perspectives. A few imager-based readers that generate multiple perspectives are known. One such reader is disclosed in the present assignee's U.S. Pat. No. 7,398,927, in the names of inventors Olmstead et al., which discloses an embodiment having two cameras to collect two images from two different perspectives for the purpose of mitigating specular reflection. U.S. Pat. No. 6,899,272, issued on May 31, 2005, discloses one embodiment that utilizes two independent sensor arrays pointed in different orthogonal directions to collect image data from different sides of a package. Unfortunately, multiple-camera imager-based readers that employ spatially separated cameras require multiple circuit boards and/or mounting hardware and space for associated optical components which can increase the expense of the reader, complicate the physical design, and increase the size of the reader. Another embodiment according to the '272 patent utilizes a single camera pointed at a moveable mirror that can switch between two positions to select one of two different imaging directions. Additionally, the present assignee's U.S. Pat. No. 5,814,803, issued to Olmstead et al. on Sep. 29, 1998, depicts in its FIG. 62 a kaleidoscope tunnel formed from two mirrored surfaces, resulting in eight different, rotated versions of the same barcode from an object on a single imager.

BRIEF DESCRIPTION OF THE DRAWINGS

FIG. 1 is an illustration of an exemplary six-sided box-shaped object that may be passed through a viewing volume of an optical code reader.

FIGS. 2A-2D are illustrations of cameras positioned to capture direct perspectives looking into a viewing volume.

FIGS. 3A-3D are respective side, isometric, front, and top views of an optical code reader capable of capturing multiple views from different perspectives, according to one embodiment.

FIG. 3E is a side view of mirrors reflecting a top upper perspective of a view volume along an image path to an imager of the optical code reader of FIGS. 3A-3D, showing the image path and view volume with shading lines.

FIG. 3F is a top view of mirrors reflecting a left upper perspective of a view volume along an image path to an imager of the optical code reader of FIGS. 3A-3D, showing the image path and view volume with shading lines.

FIG. 3G is a top view of mirrors reflecting a right upper perspective of a view volume along an image path to an imager of the optical code reader of FIGS. 3A-3D, showing the image path and view volume with shading lines.

FIG. 3J is a side view of mirrors reflecting a back lower perspective of a view volume along an image path to an imager of the optical code reader of FIGS. 3A-3D, showing the image path and view volume with shading lines.

FIG. 3K is an isometric view of multiple image paths and respective multiple perspective view volumes that form a cumulative view volume of the optical code reader of FIGS. 3A-3D.

FIGS. 4A-4D are respective side, isometric, front, and top views of an optical code reader capable of capturing multiple views from different perspectives, according to another embodiment.

FIG. 4E is a side view of mirrors reflecting an upper perspective of a view volume along an image path to an imager of the optical code reader of FIGS. 4A-4D, showing the image path and view volume with shading lines.

FIG. 4F is a diagram of an image field of the horizontal imager in the optical code reader of FIGS. 4A-4D, divided into three regions to capture separate views.

FIG. 4G is a diagram of another image field of the horizontal imager in the optical code reader of FIGS. 4A-4D, divided into three alternative regions to capture separate views.

FIG. 4I is a front view of mirrors reflecting a right lower perspective of a view volume along an image path to an image of an the optical code reader of FIGS. 4A-4D, showing the image path and view volume with shading lines.

FIG. 4J is a side view of mirrors reflecting a back lower perspective of a view volume along an image path to an imager of the optical code reader of FIGS. 4A-4D, showing the image path and view volume with shading lines.

FIG. 4L is an isometric view of multiple image paths and respective multiple perspective view volumes that form a cumulative view volume of the optical code reader of FIGS. 4A-4D.

FIGS. 5A-5D are respective side, isometric, front, and top views of an optical code reader capable of capturing multiple views from different perspectives, according to another embodiment.

FIG. 5E is a map of an image field of the vertical imager in the optical code reader of FIGS. 5A-5D, divided into three regions to capture separate views.

FIG. 5K is a front view of mirrors reflecting a left lower perspective of a view volume along an image path to an imager of the optical code reader of FIGS. 5A-5D, showing the image path and view volume with shading lines.

FIG. 5L is a front view of mirrors reflecting a right lower perspective of a view volume along an image path to an image of the optical code reader of FIGS. 5A-5D, showing the image path and view volume with shading lines.

FIG. 5M is a side view of mirrors reflecting a back lower perspective of a view volume along an image path to an imager of the optical code reader of FIGS. 5A-5D, showing the image path and view volume with shading lines.

FIG. 5N is an isometric view of a compound mirror structure used with the horizontal imager in the optical code reader of FIGS. 5A-5D.

FIG. 5O is an isometric view of multiple image paths and respective multiple perspective view volumes that form a cumulative view volume of the optical code reader of FIGS. 5A-5D.

FIGS. 6A-6D are respective side, isometric, front, and top views of an optical code reader capable of capturing multiple views from different perspectives, according to another embodiment.

FIG. 6G is a front view of mirrors reflecting a left lower perspective of a view volume along an image path to an imager of the optical code reader of FIGS. 6A-6D, showing the image path and view volume with shading lines.

FIG. 6H is a front view of mirrors reflecting a right lower perspective of a view volume along an image path to an imager of the optical code reader of FIGS. 6A-6D, showing the image path and view volume with shading lines.

FIG. 6I is an isometric view of a compound mirror structure used in the optical code reader of FIGS. 6A-6D.

FIG. 6J is an isometric view of multiple image paths and respective multiple perspective view volumes that form a cumulative view volume of the optical code reader of FIGS. 6A-6D.

FIG. 6M is a side view of mirrors reflecting a back perspective of a view volume along an image path to an imager of the optical code reader of FIG. 6K, showing the image path and view volume with shading lines.

DETAILED DESCRIPTION OF EMBODIMENTS

Figure 2A:
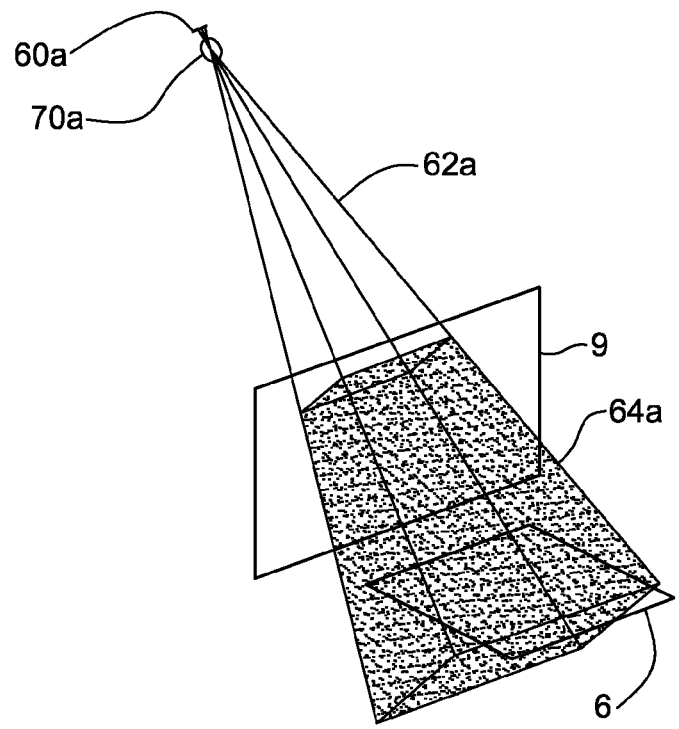

With reference to the above-listed drawings, this section describes particular embodiments and their detailed construction and operation. The embodiments described herein are set forth by way of illustration only and not limitation. Those skilled in the art will recognize in light of the teachings herein that, for example, other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

I. INTRODUCTION & OVERVIEW

Various imager-based optical code readers and associated methods are described herein. Some embodiments of these optical code readers and systems improve the performance of optical code readers by providing multiple image fields to capture multiple views.

In some embodiments, an image field of an imager may be partitioned into two or more regions, each of which may be used to capture a separate view of the view volume. In addition to providing more views than imagers, such embodiments may enhance the effective view volume beyond the view volume available to a single imager having a single point of view.

FIG. 1 is an illustration of an exemplary object 20 that may be passed through a viewing volume of an example optical code reader 5. The optical code reader 5 is illustrated as a two-plane or bioptic reader having a generally horizontal window 6 and a generally vertical window 9. The upper window 9 and lower window 6 are preferably portions of a two-plane weigh scale platter 8 such as the All-Weighs® platter available from Datalogic Scanning, Inc. of Eugene, Oreg. The viewing volume may be a function of the enclosure and style of the optical code reader 5 and the perspectives of the views in which images of the objects are captured. A perspective may encompass a location, direction, angle, or the like—or any combination of the foregoing—that characterize a vantage or point of view for seeing, imaging, visualizing via machine vision, or illuminating the object 20 or a part of an object 20. Different perspectives are generally generated from the horizontal window 6 and the vertical window 9. A single or multiple views—each from the same or different perspectives—may be obtained through each window, depending on the design of the reader 5. The collection of all views together constitute a cumulative view, which defines the viewing volume or scan volume of the reader 5. Different views may enable reading of an optical code on different sides of the object 20.

For general purposes of discussion, the object 20 is represented by a rectangular-shaped six-sided polyhedron, such as a cereal box (hereinafter referred to as a box-shaped item or object) that may be passed through a checkout stand at a supermarket. The object 20 may have any three-dimensional form and that a checkout stand 24 is an exemplary use for the optical code readers discussed herein and should not be considered as limiting.

For convenience, this box-shaped object 20 may be described with respect to an arbitrary direction of travel 22 across the reader 5. For the purposes of description relative to the ability of an optical code reader to read certain of the sides of the box-shaped object 20 being passed through the scan volume in the orientation as illustrated, the box-shaped object may be described as having a top side 26, a bottom side 28, and four lateral sides 30, 32, 34, and 36. The lateral sides may be referred to as the left or leading side 30, the right or trailing side 32, the checker side 34 (because it may be in proximity to a checkout clerk 38), and the customer side 36 (because it may be in proximity to a customer 40). A housing or housing portion of an optical code reader 5 may separate the customer 40 from the object 20 if the optical code reader 5 is a vertical optical code reader or a bi-optic optical code reader, as shown. The customer side 36 may alternatively be described as a wall side 36 or an opposite side 36. In some settings, the checker side 34 may be called the back side. The terminology indicated in FIG. 1 and described in the paragraph is introduced to facilitate discussion of the concepts described in this document; in other contexts, different terminology may be used to describe the sides of the object 20.

FIGS. 2A-2D are illustrations of imagers 60 (60a, 60b, 60c, 60d, 60e, and 60f), such as cameras, positioned to capture direct perspective views of all sides of the object 20 (not shown in FIGS. 2A-2D). The perspective views form respective view volumes 64a, 64b, 64c, 64d, 64e, and 64f, some or all of which may intersect in proximity to the object 20 and the union of which constitute a cumulative view volume 64. Images of the object 20 propagate along corresponding image paths 62 (62a, 62b, 62c, 62d, 62e, 620 that correspond to the perspective views and are captured by corresponding imagers 60a, 60b, 60c, 60d, 60e, and 60f.

Respective lenses 70 (70a, 70b, 70c, 70d, 70e, and 700 direct light within the view volumes 64 to the imagers 60 along the associated image paths 62. Each imager 60 and lens 70 form an electronic camera, which is a standard configuration in the art of electronic imaging. For ease of understanding, the imagers 60 are depicted capturing the direct perspectives through at least two viewing windows positioned in transverse planes, typically a lower viewing window 66 and an upper viewing window 68. In some preferred embodiments, the lower viewing window 66 and the upper viewing window 68 are positioned in orthogonal planes. In some embodiments, the lower viewing window 66 and the upper viewing window 68 may be transparent plates that may be separated or adjoining.

FIG. 2A shows a top imager 60a capturing a top perspective of the viewing volume 64a along a top image path 62a through the upper viewing window 9. The top perspective may facilitate capture of images of the customer side 36 as well as the top side 26 of the object 20. The top perspective may also facilitate the capture of images of either the leading side 30 or the trailing side 32 depending on the location of the imager 60a and the orientation of the plane of its imaging field.

Figure 2B:
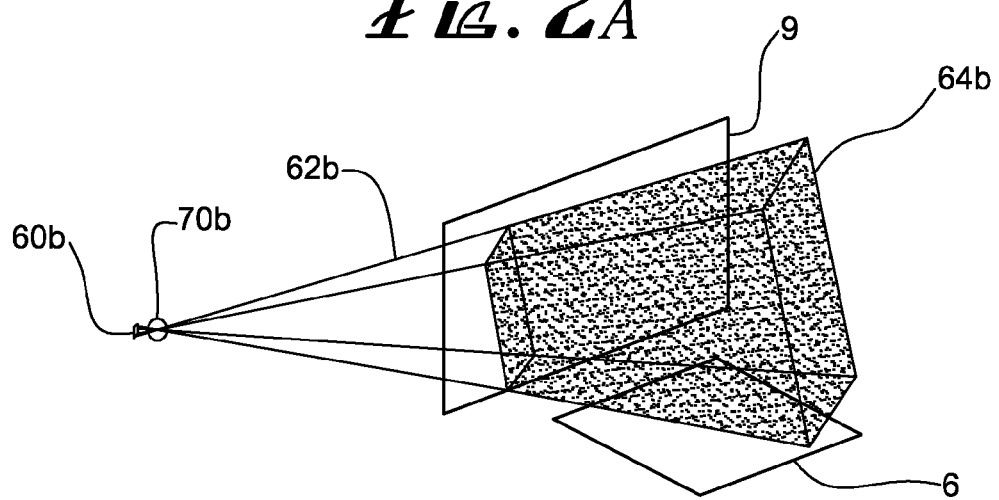

FIG. 2B shows a left vertical imager 60b capturing a left vertical perspective of the viewing volume 64b along a left vertical image path 62b through the upper viewing window 9. The left vertical perspective may facilitate capture of images of the leading side 30 as well as the customer side 36. The left vertical perspective may also facilitate capture of images of the top side 26 of the object 20 depending on the height of the imager 60b and the orientation of the plane of its imaging field.

FIG. 2C shows the top imager 60a of FIG. 2A, the left vertical imager 60b of FIG. 2B, and a right vertical imager 60c capturing a right vertical perspective of the viewing volume 64c along a right vertical image path 62c through the upper viewing window 68. The right vertical perspective may facilitate capture of images of the trailing side 32 as well as the customer side 36. The right vertical perspective may also facilitate capture of images of the top side 26 of the object 20 depending on the height of the imager 60c and the orientation of the plane of its imaging field.

FIG. 2D shows the imagers 60 of FIG. 2C and also shows a left horizontal imager 60d, a right horizontal imager 60e, and a back imager 60f capturing respectively a left horizontal perspective, a right horizontal perspective, and a back perspective of the respective viewing volumes 64d, 64e, and 64f along respective image paths 62d, 62e, and 62f through the lower viewing window 6. The left horizontal perspective may facilitate capture of images of the leading side 30 as well as the bottom side 28. The left horizontal perspective may also facilitate capture of images of either the checker side 34 or the customer side 36, depending on the location of the imager 60d and the orientation of the plane of its imaging field. The right horizontal perspective may facilitate capture of images of the trailing side 32 as well as the bottom side 28. The right horizontal perspective may also facilitate capture of images of either the customer side 36 or the checker side 34, depending on the location of the imager 60e and the orientation of the plane of its imaging field. The back perspective may facilitate capture of images of the checker side 34 as well as the bottom side 28. The back perspective may also facilitate capture of images of the leading side 30 or the trailing side 32, depending on the location of the imager 62f.

With reference again to FIGS. 2A-2D, an optical code reader employing a plurality of imagers 60, each for capturing a different direct perspective view of the viewing volume 64, could provide excellent performance in terms of a first pass read rate (FPRR) regardless of the placement or orientation of the object 20 relative to such an optical code reader housing the imagers 60. Unfortunately, the direct perspective imagers 60 are relatively far away from the object 20 and the viewing windows through which they see the object 20, thus requiring such an optical code reader to have a large optical reader housing, which may be impractical. Furthermore, the direct perspective imagers 60 are dispersed from each other and not readily positionable in or near common planes so as to permit use of common circuit boards to host multiple imagers.

Accordingly, some of the following embodiments employ one or more imagers 60 and sets of fold mirrors. The fold mirrors permit the imager(s) 60 to be closer to each other and permit an optical reader housing to confine them to a smaller housing volume or capacity. In some of such embodiments, the imager(s) 60, may capture perspectives through a common viewing window and may be arranged in a portion of an optical code reader housing that is adjacent to the common viewing window. Some of such embodiments may include a single viewing window or may have at least two transverse oriented viewing windows. In other embodiments, the imager(s) 60, may be arranged in a portion of an optical code reader housing that is distant from, and/or generally transverse to, a common viewing window. In some embodiments including transversely oriented viewing windows, multiple imagers 60, regardless of which of the viewing windows they use to capture perspectives, may be arranged in a common portion of an optical code reader housing. In some of such embodiments, multiple imagers 60 may be in close proximity, may be supported along a common plane, or may be supported by a common circuit board.

In other embodiments, a plurality of sets of fold mirrors can be employed to convey at least a portion of at least two different perspectives of the viewing volume to different regions of an image field of a common imager. In some of such embodiments, the sets of fold mirrors convey perspectives from a common viewing window onto different regions of an image field of a common imager. In some such embodiments, the imager may be located in a portion of an optical code reader housing that is adjacent to the common viewing window or located in a portion of an optical code reader housing that is distant from and/or generally transverse to the common viewing window, e.g., through orthogonal windows of an "L"-shaped bioptic optical code reader. In some embodiments including transversely oriented viewing windows, different regions of an image field of a common imager may capture at least one perspective through each of the viewing windows.

According to one embodiment, for example, a method reads an optical code on an object in a viewing volume bounded on two generally transverse sides by respective first and second viewing surfaces, by use of a number of imagers. The method directs a plurality of views from the viewing volume onto different imager portions of the set of imagers. Each of the plurality of views passes through one of said first and second viewing surfaces. At least one of said views passes through the first viewing surface, and at least one of said views passes through the second viewing surface. The number of views is at least three. At least one of the views is reflected off at least one mirror. The number of views is greater than the number of imagers. The method forms at least one image with said number of imagers. The method processes the optical code based on said at least one image.

According to another embodiment, for example, a method reads an optical code on an object in a viewing volume bounded on two generally transverse sides by respective first and second viewing surfaces, by use of a plurality of imagers. The method directs a plurality of views from the viewing volume onto different imager portions of the set of imagers. Each of the plurality of views passes through one of said first and second viewing surfaces. At least one of said views passes through the first viewing surface, and at least one of said views passes through the second viewing surface. The number of views is at least three. At least one of the views is reflected off at least one mirror. The method forms at least one image with said plurality of imagers, wherein at least a first and second of said plurality of imagers are mounted on opposing surfaces of a common circuit board. The method processes the optical code based on said at least one image.

According to another embodiment, for example, an optical code reader forms images of an optical code on an object. The optical code reader comprises a first viewing surface, a second viewing, a set of one or more imagers, and at least one mirror. The second viewing surface is generally transverse to the first viewing surface. The first and second surfaces bound a viewing volume in which the object may be imaged. The set of one or more imagers are positioned on an opposite side of one or more of the first and second viewing surfaces relative to the viewing volume, and oriented and configured to capture images of the object, when the object is in the viewing volume, from at least three different views. Each of the views passes through one of said first and second viewing surfaces. At least one of said views passes through the first viewing surface. At least one of said views passes through the second viewing surface. The number of views is greater than the number of imagers. The at least one mirror is positioned on an opposite side of one or more of the first and second viewing surfaces relative to the viewing volume. At least one of the views is reflected off one or more of said at least one mirror.

According to yet another embodiment, for example, an optical code reader forms images of an optical code on an object. The optical code reader comprising a first viewing surface, a second viewing surface, a set of two or more imagers, a common circuit board, and at least one mirror. The second viewing surface is generally transverse to the first viewing surface. The first and second surfaces bounding a viewing volume in which the object may be imaged. The set of two or more imagers are positioned on an opposite side of one or more of the first and second viewing surfaces relative to the viewing volume and oriented and configured to capture images of the object, when the object is in the viewing volume, from at least three different views. Each of the views passes through one of said first and second viewing surfaces. At least one of said views passes through the first viewing surface, and at least one of said views passes through the second viewing surface. The common circuit board has opposing first and second sides. At least some of said imagers are mounted on the first side of the common circuit board, and at least some of said imagers are mounted on the second side of the common circuit board. The at least one mirror is positioned on an opposite side of one or more of the first and second viewing surfaces relative to the viewing volume, wherein at least one of the views is reflected off one or more of said at least one mirror.

Certain embodiments may be capable of achieving certain advantages, including some or all of the following: (1) perspective diversity, including the ability to robustly capture codes at a variety of locations and angular orientations (pitch, roll, and yaw) in the viewing volume, with concomitant advantages in terms of (a) improved usability, (b) improved FPRR, and (c) throughput for repeat-use applications such as retail checkout; (2) use of a single circuit board to mount multiple cameras; (3) improved utilization of space, resulting in a smaller reader. These and other advantages of various embodiments will be apparent upon reading this document.

Additional details concerning the construction and operation of particular embodiments are set forth in the following subsections with reference to the above-listed drawings.

II. MULTI-IMAGER BI-OPTIC READER INCLUDING MULTIPLE FOLD MIRRORS

A. Multiple Single-Perspective Imagers

This subsection describes, by way of example, details of one type of embodiment of an imager-based optical code reader 80. FIGS. 3A-3D are respective side, isometric, front, and top views of an optical code reader 80 capable of capturing multiple views of an object 20 (not shown) from different perspectives. With reference to FIGS. 3A-3D, an embodiment of the optical code reader 80 includes a housing 82 having a lower, horizontal, or bottom housing portion 84 that transversely intersects or adjoins an upper, vertical, or side housing portion 86. The lower and upper housing portions 84 and 86 are preferably generally orthogonal, but need not be; and the housing 82 is preferably generally oriented so that the lower housing portion 84 is generally horizontal and the upper housing portion 86 is generally vertical, but they need not be so oriented.

The lower and upper housing portions 84 and 86 may be integrated as a single housing unit or may take the form of separate units that are easily attached wherein the upper housing portion 86 may be supported by the lower housing portion 84 or wherein the upper housing portion 86 is supported next to the lower housing portion 84 and generally includes the cross-sectional dimensions of the lower housing portion 84. The cross-sectional dimensions of the housing portions 84 and 86 may be generally the same or different. The overlap of the cross-sectional dimensions of the lower housing portion 84 and the upper housing portion 86 may generally define an intersecting housing volume 88.

The lower portion 84 of the housing 82 has in its top surface 92 a lower viewing window 94, which may secure or be covered by a lower transparent plate 96 through which "lower" perspectives of the object 20 (not shown in FIG. 3) can be captured. The upper portion 86 has in its front surface 98 an upper viewing window 104 that may secure or be covered by an upper transparent plate 106 through which "upper" perspectives of the object 20 can be captured. Optional lower and upper overlay platters 112 and 114 having their own respective lower and upper overlay viewing windows 116 and 118 and lower and upper overlay transparent plates 122 and 124 may be positioned to cover the top surface 92 and the front surface 98, respectively. The upper transparent plate 124 may be integrated with the upper portion 86 of the housing 82 and may be used absent a platter 114. One or both of the platters 112 and 114 may be integrated with the lower and upper portions 84 and 86 of the housing 82. The viewing windows 94, 104, 116, and 118 or corresponding transparent plates 96, 106, 122, and 124 may be the same different sizes and thus may be generally parallel or may be oriented in transverse planes. In some embodiments, one or both of the overlay viewing windows 116 and 118 are smaller than the respective housing viewing windows 94 and 104; and in other embodiments, one or both of the overlay viewing windows 116 and 118 are larger than the respective housing viewing windows 94 and 104. The lower platter 112 may include or be integrated with a scale and may have an overhanging platform 126 to accommodate large objects 20. The upper and lower platters 112 and 114 are preferably portions of a two-plane weigh scale platter such as the All-Weighs® platter available from Datalogic Scanning, Inc. of Eugene, Oreg., or the two-plane platter described in U.S. Pat. No. RE 40,071.

FIG. 3E is a side view of a first set of mirrors 130a (mirrors $130a_1$ and $130a_2$) reflecting a top upper perspective of a view volume 64a along an image path 62a to an imager 60a of the optical code reader 80. With reference to FIG. 3E, an image of the object 20 in the view volume 64a, captured from the upper top upper perspective and propagated generally upward and horizontally through the upper transparent plate 106 along an image path segment $62a_1$, is reflected downward by a primary mirror $130a_1$ along an image path segment $62a_2$ to secondary minor $130a_2$ which reflects the image horizontally toward the checker side along an image path segment $62a_3$ to the imager 60a, which may be supported on a printed circuit board (PCB) 140 located in the lower housing portion 84 of the housing 82.

FIG. 3F is a top view of a second set of mirrors 130b (mirrors $130b_1$ and $130b_2$) reflecting a left upper perspective of a view volume 64b along an image path 62b to an imager

60*b* of the optical code reader 80. With reference to FIG. 3F, an image of the object 20 (not shown) in the view volume 64*b*, captured from the left upper perspective and propagated through the upper transparent plate 106 along an image path segment 62*b*$_1$, is reflected rightward and downward by a primary mirror 130*b*$_1$ along an image path segment 62*b*$_2$ to secondary mirror 130*b*$_2$ which reflects the image horizontally toward the checker side along an image path segment 62*b*$_3$ to the imager 60*b*, which may be supported on or integrated with the PCB 140.

FIG. 3G is a top view of a third set of mirrors 130*c* (mirrors 130*c*$_1$ and 130*c*$_2$) reflecting a right upper perspective of a view volume 64*c* along an image path 62*c* to an imager 60*c* of the optical code reader 80. With reference to FIG. 3G, an image of the object 20 (not shown) in the view volume 64*c*, captured from the right upper perspective and propagated through the upper transparent plate 106 along an image path segment 62*c*$_1$, is reflected leftward and downward by a primary mirror 130*c*$_1$ along an image path segment 62*c*$_2$ to secondary mirror 130*c*$_2$ which reflects the image horizontally toward the checker side along an image path segment 62*c*$_3$ to the imager 60*c*, which may be supported on or integrated with the PCB 140.

Figure 3H:
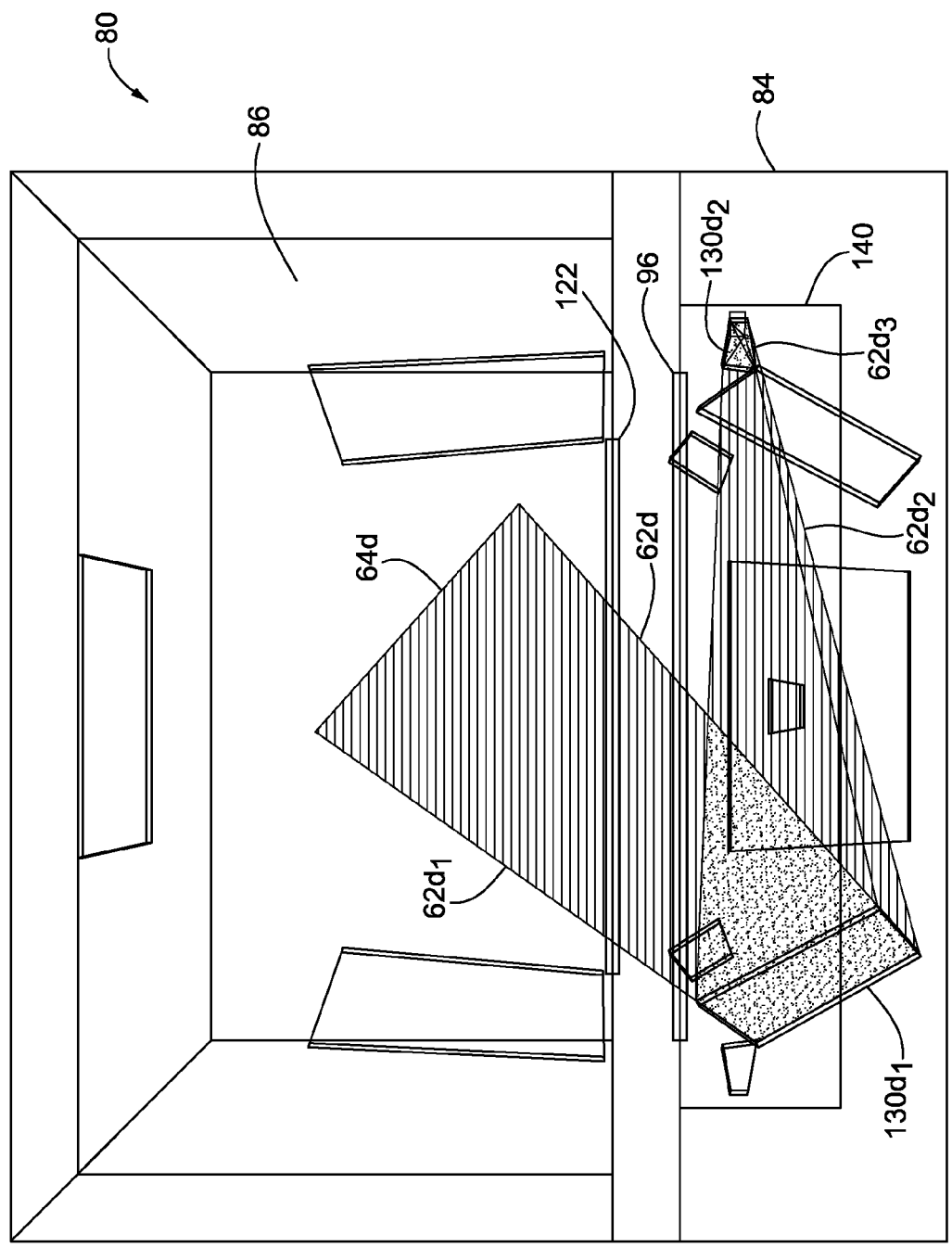
FIG. 3H is a front view of mirrors reflecting a left lower perspective of a view volume along an image path to an imager of the optical code reader of FIGS. 3A-3D, and showing the image path and view volume with shading lines.

FIG. 3H is a front view of a fourth set of mirrors 130*d* (mirrors 130*d*$_1$ and 130*d*$_2$) reflecting a left lower perspective of a view volume 64*d* along an image path 62*d* to an imager 60*d* of the optical code reader 80. With reference to FIG. 3H, an image of the object 20 (not shown) in the view volume 64*d*, captured from the left lower perspective and propagated through the lower transparent plate 96 generally downward and sideward along an image path segment 62*d*$_1$, is reflected sideward by a primary mirror 130*d*$_1$ along an image path segment 62*d*$_2$ to secondary mirror 130*d*$_2$ which reflects the image horizontally away from the checker side along an image path segment 62*d*$_3$ to the imager 60*d*, which may be supported on or integrated with the PCB 140.

Figure 3I:
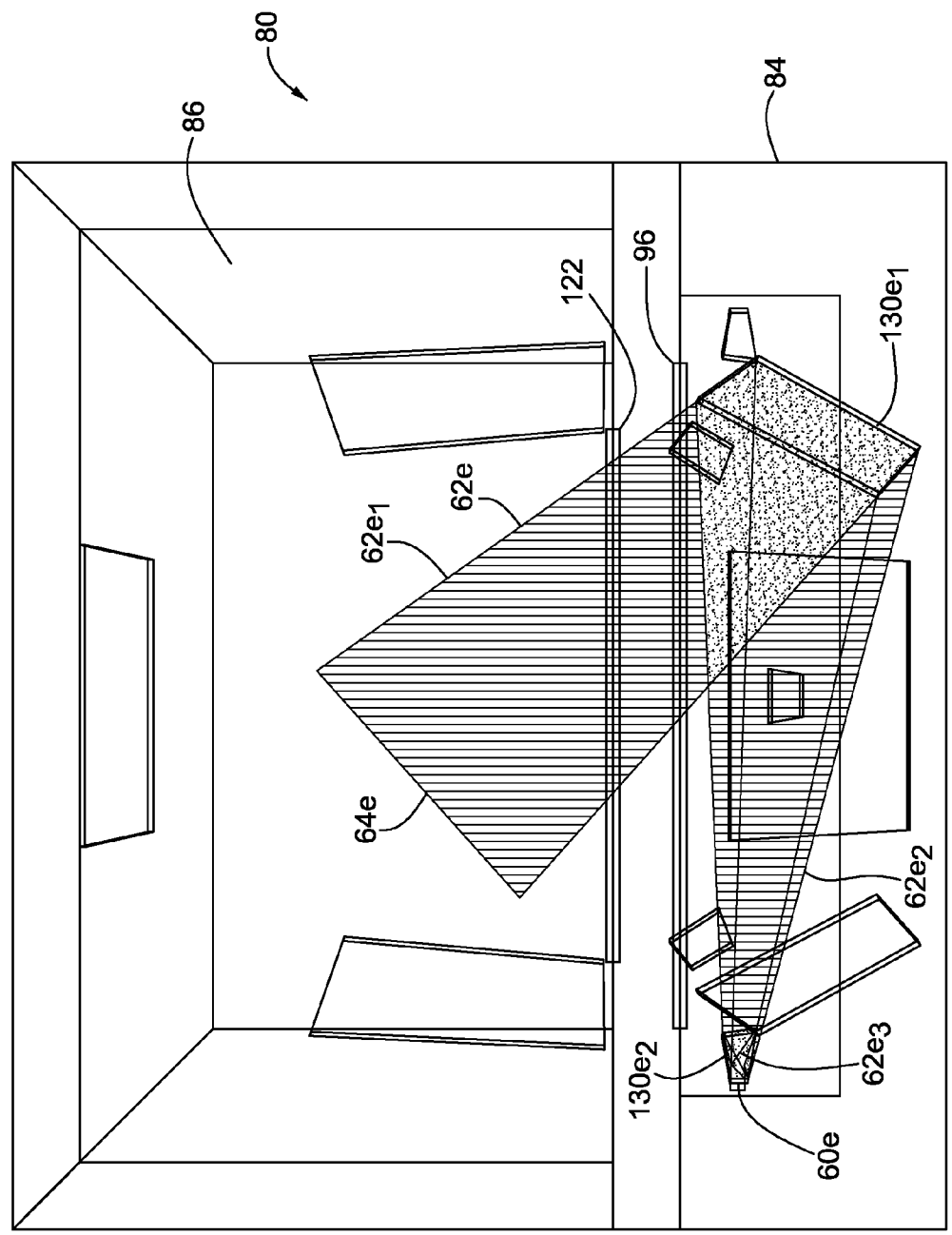
FIG. 3I is a front view of mirrors reflecting a right lower perspective of a view volume along an image path to an imager of the optical code reader of FIGS. 3A-3D, and showing the image path and view volume with shading lines.

FIG. 3I is a front view of a fifth set of mirrors 130*e* (mirrors 130*e*$_1$ and 130*e*$_2$) reflecting a right lower perspective of a view volume 64*e* along an image path 62*e* to an imager 60*e* of the optical code reader 80. With reference to FIG. 3I, an image of the object 20 (not shown) in the view volume 64*e*, captured from the right lower perspective and propagated through the lower transparent plate 96 generally downward and sideward along an image path segment 62*e*$_1$, is reflected sideward by a primary mirror 130*e*$_1$ along an image path segment 62*e*$_2$ to secondary mirror 130*e*$_2$ which reflects horizontally away from the checker side the image along an image path segment 62*e*$_3$ to the imager 60*e*, which may be supported on or integrated with the PCB 140.

FIG. 3J is a side view of a sixth set of mirrors 130*f* (mirror 130*f*$_1$) reflecting a back lower perspective of a view volume 64*f* along an image path 62*f* to an imager 60*f* of the optical code reader 80. With reference to FIG. 3J, an image of the object 20 (not shown) in the view volume 64*f*, captured from the back lower perspective and propagated through the lower transparent plate 96 generally downward and sideward along an image path segment 62*f*$_1$, is reflected by a primary mirror 130*f*$_1$ horizontally away from the checker side along an image path segment 62*f*$_2$ to the imager 60*f*, which may be supported on or integrated with the PCB 140.

The view volumes 64 illustrated in the preceding FIGS. 3E-3J and in subsequent figures for other embodiments are shown with a definite distal planar boundary for the sake of better illustrating the shapes, perspectives and relative positions of the view volumes 64. However, the view volumes 64 typically begin and end other than as shown, and what is illustrated as a definite distal planar boundary may, in fact, represent a focal plane. For example, in the preceding FIGS. 3E-3J, the mirrors 130 may be appropriately spaced or positioned to provide desired focal path lengths and the depth of field of their respective imagers 60. The depths of field expand outwardly from their respective focal planes located at the focal path lengths along their respective image paths. The focal planes are shown to be planar but may actually be curved, depending on the properties of the lens(es), mirrors 130 and possibly other optical components in the image paths. The depths of field may be generally optically centered around their respective focal planes. In some embodiments, the depths of field may be used to define the dimensions of the respective view volumes, which dimension may be approximately indicated by proximal range planes and distal range planes. In some embodiments, about one half of the depth of field is positioned between the focal plane and the proximal range plane, and about one half of the depth of field is positioned between the focal plane and the distal range plane. Other proximal and distal depth of field ratios are possible and may depend on the type of lens(es), the focal path length, and other optical factors. For example, it may be desirable in some circumstances that the focal plane of a view volume extending up from the lower viewing window 94 be at or near the window 94, to enable reading of an optical code on or near the lower viewing window 94, whereas it may be desirable in some circumstances that the focal plane of a view volume extending out from the upper viewing window 104 be at further away from the upper viewing window 104, where it is more likely that an optical code will be away from that window. The proximal and distal boundaries of a view volume may not be planes and typically are not sharp transitions from viewability to sudden unviewability. Typically, focus deteriorates gradually and continuously as the distance from the focal surface increases. In general, a view volume is a volume of space in which there is a high probability that an optical code can be successfully read.

Different imagers in the same reader may have different focal lengths and depths of field, and different image paths may have different lengths, different segment lengths, different numbers of mirrors, and different numbers of path segments. The use of common reference numbering patterns in the Figures should not be interpreted as implying that different elements with similarly numbers necessarily have the same or similar properties.

FIG. 3K is a isometric view of mirrors 130*a-f* and image paths 62*a-f* reflecting all of the aforementioned perspectives of a cumulative view volume 64*g* to the respective imager 60*a-f*. The various perspective views in FIG. 3K or any of the following figures are labeled similarly to the perspective views 62 appearing in FIGS. 2A-2D to enhance comprehension; however, skilled persons will appreciate that the various perspective views 62 of the different embodiments need not be the same.

As can be seen in FIG. 3K and later figures for other embodiments, the component view volumes generally overlap. However, in some embodiments, component view volumes adapted and/or positioned to avoid overlap. Dimension of overlapping view volume regions may be chosen to have dimensions, given the narrowest and/or widest optical code intended for viewing, so that stitching together portions of an optical code can be either avoided or facilitated.

With reference to FIGS. 3A-K (collectively FIG. 3), one or more lenses may be positioned within one or more of the image paths 62. The mirrors 130 preferably have planar reflecting surfaces. In some embodiments, however, one or more curved mirrors or focusing mirrors could be employed in one or more of the imaging paths 62 provided that appropriate lenses or image manipulating software is employed. In some embodiments, one or more of the mirrors 130 may be a dichroic mirror to provide for selective reflection of images under different illumination wavelengths as is later described in greater detail.

The mirrors 130 may have quadrilateral profiles, but may have profiles of other polygons. In some preferred embodiments, one or more of the mirrors 130 have trapezoidal profiles. In some alternative embodiments, one or more of the mirrors 130 may have a circular or oval profile. The mirrors 130 may have dimensions sufficient for their respective locations to propagate an image large enough to occupy an entire image field of an imager 60. The mirrors 130 are also positioned and have dimensions sufficiently small so that the mirrors do not occlude images being propagated along any of the other image paths 62.

The mirrors 130 may be appropriately spaced to account for the depth of field of the respective imagers 60. The imagers 60 may have different depths of field, and the image paths 62 may have different lengths, different segment lengths, and different numbers of mirrors 130. In some embodiments, the numbers of mirrors 130 in any image path 62 is selected to provide the fewest number of mirrors 130 in a housing of given dimensions. The image paths 62 may also or alternatively be modified to introduce additional mirrors 130 to select whether an actual image or whether a reverse image (enantiomorphic image) of the object will be received by any given imager 60. Moreover, the same enantiomorphic image of the object 20 from the different perspectives of the object 20 may reach the imagers 60, or different enantiomorphic images of the object 20 may reach the imagers 60. Exemplary imagers 60 that may be used for this embodiment include wide VGA imagers with a resolution of 752×480 pixels. One preferred VGA imager is the model MT9V022 available from Aptina Imaging of Corvallis, Oreg. or San Jose, Calif.; however, any other suitable type of imager 60 of various resolutions may be employed.

The mirrors 130 not only facilitate capture of many different perspectives of an object 20, but also help to reduce the dimensions of a housing 82 needed to house all the imagers 60. For example, the image paths 62 from the imagers into the viewing volume 64 via the sets of mirrors 130 associated with the respective perspectives permits either or both of the lower and upper housing portions 84 and 86 to have at least one housing dimension that is smaller than a direct-perspective dimension for viewing the viewing volume from the same perspective directly.

In some embodiments, the imagers 60 may all be supported by or integrated with a common PCB 140 such as shown in FIG. 3. In some embodiments, such common PCB 140 may be located in the lower housing portion 84 or the upper housing portion 86; or, in cases where the lower and upper housing portions 84 and 86 form an integrated housing unit, the common PCB 140 may be located in the intersecting portion 88 of the housing 82.

In some embodiments, the imagers 60 may be located on opposing side of the common PCB 140. In some embodiments, the same number of imagers 60 is located on each opposing side of the PCB 140; however, other embodiments may employ different numbers of imagers 60 on the opposing sides of the PCB 140. In other embodiments, the imagers 60 may all be located on the same side of the PCB 140. In some embodiments, the common PCB 140 is a flexible circuit board with portions that can be selectively angled to orient some or all of the imagers 60 to facilitate arrangements of image paths 62 utilizing noncollinear axes for the image fields of the imagers 60.

The imagers 60 may be arranged in close proximity or in the same housing portion regardless of whether they are supported by a common PCB 140 to facilitate mounting and wiring in a manner that avoids occlusion of image paths 62. In some embodiments, multiple imagers 60 may be within an inch of each other. In some embodiments, the imagers 60 may be within about 1/10 of an inch apart. In some embodiments, the imagers 60 may be supported on separate PCBs 140 or may be grouped onto 2-6 PCBs 140 in any combination. The 2-6 PCBs 140 may be located in the same housing portion or in placed in different housing portions in any suitable combination. For example, the upper perspective imagers 60 may be supported on one PCB 140 located in the upper housing portion 86 and the lower perspective imagers 60 are supported on a second PCB 140 located in the lower housing portion 84, and, in some embodiments, these two PCBs 140 may be located in the opposite housing portions.

Multiple sets of mirrors 130 could be used to construct a monoptic (single window) optical code reader capable of viewing multiple perspectives through a single viewing window 94 or 104. Furthermore, the optical code reader 80 need not have six views or perspectives of an object 20 passing through the view volume. Additional views and corresponding imagers 60 could be added. Alternatively, fewer views could be captured and the number of imagers 60 could be decreased to reduce costs.

B. Single Horizontal Imager Split into Three Perspectives and Separate Unsplit Vertical Imager This subsection describes, by way of example, details of one type of embodiment of an imager-based optical code reader 150. FIGS. 4A-4D are respective side, isometric, front, and top views of an optical code reader 150 capable of capturing multiple views of an object 20 (not shown) from different perspectives. For convenience, the optical code reader 150 will be described to a large extent using similar reference numerals to those used to describe FIG. 3 even though the dimensions of the housing 82, viewing windows, and/or transparent plates may be different; the perspectives, orientations, and/or sizes of the mirrors 130 may be different; the image paths 62 may have different angles; and/or the positioning, orientation, and/or dimensions of other components may be different. For example, the upper housing portion 86 of optical code reader 150 may have a rectangular profile from a top view while the embodiment shown in FIG. 3 may have a trapezoidal profile from the top view.

With reference to FIGS. 4A-4D, the optical code reader 150 includes two imagers 60$a$ and 60$def$ that capture one view and three views respectively. FIG. 4E is a side view of a first set of mirrors 130$a$ (mirrors 130$a_1$, 130$a_2$ and 130$a_3$) reflecting an upper perspective of the view volume 64$a$ along the image path 62$a$ to the imager 60$a$ of the optical code reader 150, showing the image path 62$a$ and the view volume 64$a$ with shading lines. With reference to FIG. 4E, an image of the object 20 (not shown in FIG. 4E) in the view volume 64$a$, captured from the upper perspective and propagated horizontally through the upper transparent plate 106 along the image path segment 62$a_1$, is reflected downward by the primary mirror 130$a_1$ along the image path segment 62$a_2$ to the secondary mirror 130$a_2$ which reflects the image horizontally toward the checker side along the image path segment 62$a_3$ to a tertiary mirror 130$a_3$ which reflects the image downward along an image path segment 62$a_3$ to the imager 60$a$, which may be supported on the PCB 140 located in the lower housing portion 84 of the housing 82.

The perspective associated with the image path 62a in FIG. 4E may be oriented to view downwardly in similar fashion to the perspective associated with the image path 62a in FIGS. 3A-3K, or the perspective associated with the image path 62a may be oriented to view more horizontally, such as depicted in FIG. 4E.

FIG. 4F is a map of an image field 156 of a split-view or multi-region imager 60*def* divided into three regions to capture separate views, and FIG. 4G shows an alternative division of the image field 156 into three alternative regions to capture the separate views, to demonstrate that the left and right views need not be symmetrical. In general, the sizes of the different regions can be set by the designer subject to constraints such as possible mirror placement and form factors for the reader 150.

Figure 4A:
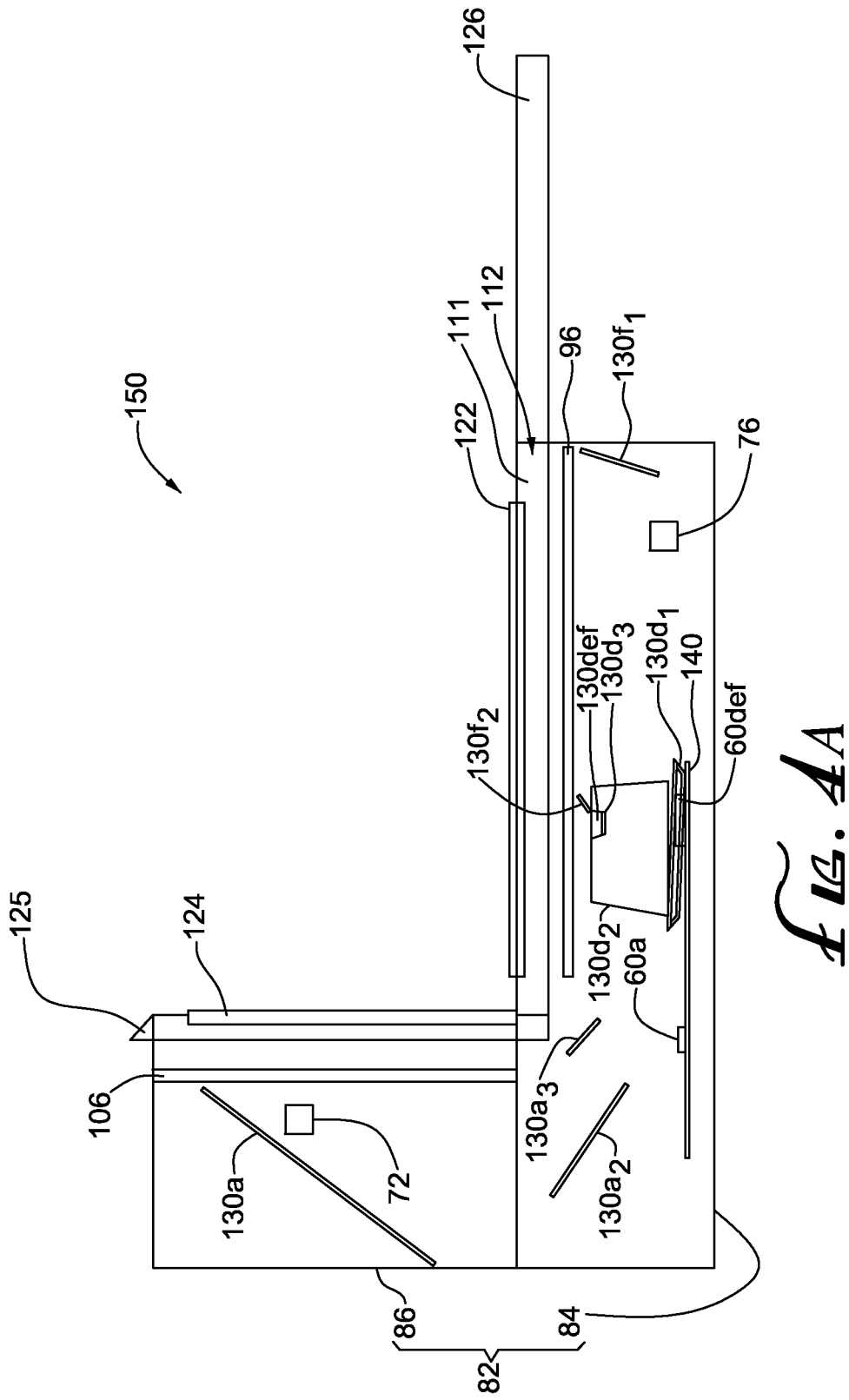
Figure 4B:
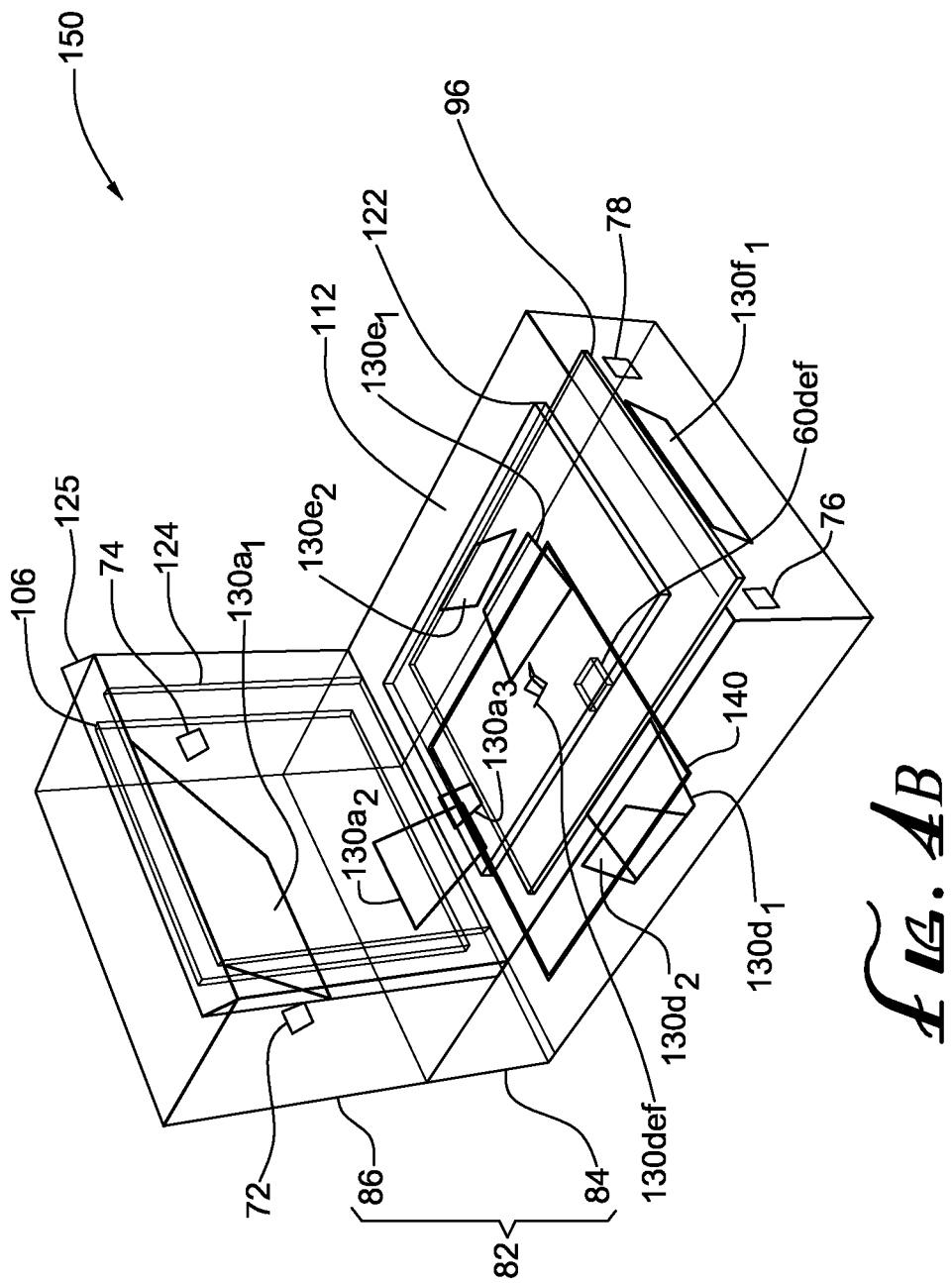
Figure 4H:
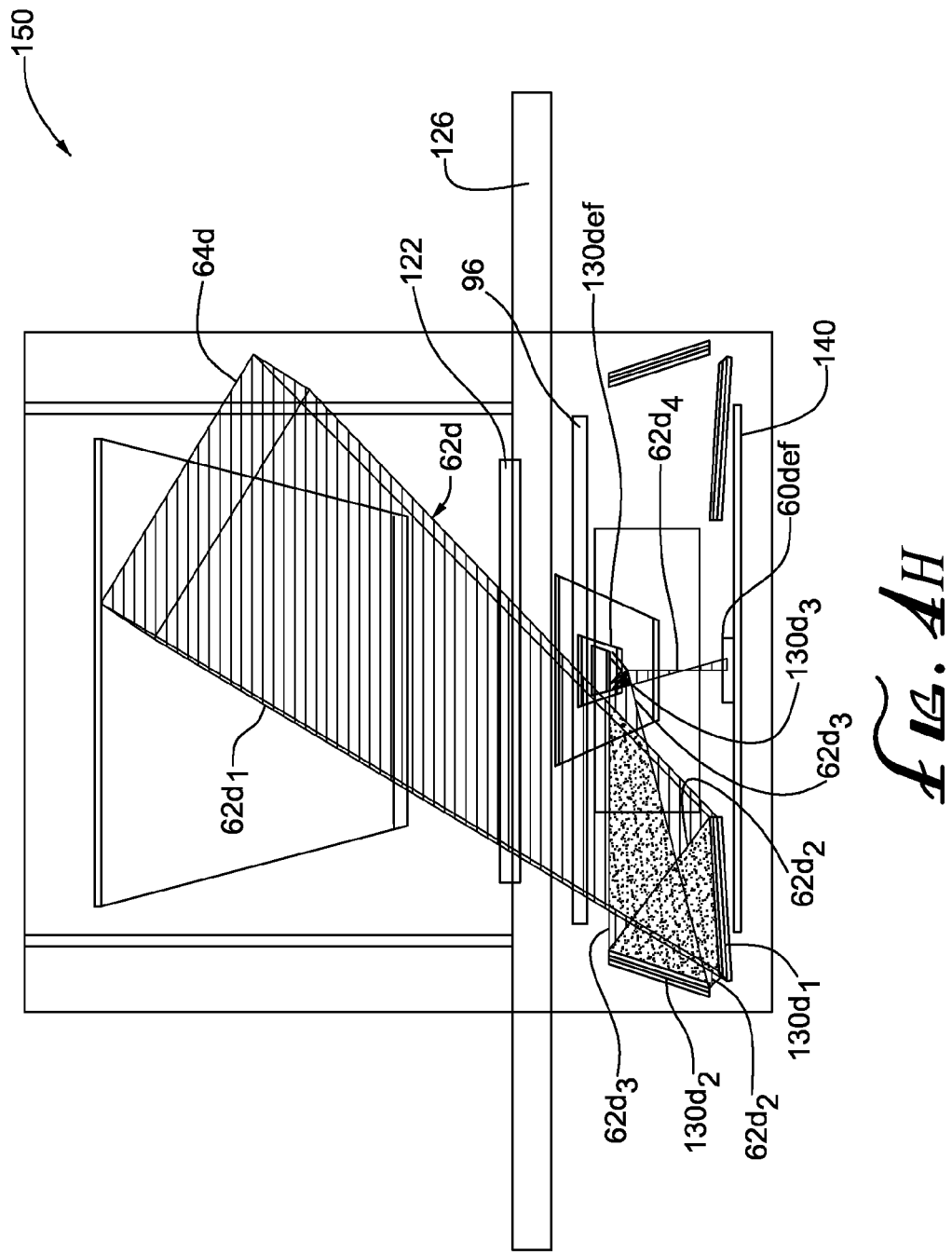
FIG. 4H is a front view of mirrors reflecting a left lower perspective of a view volume along an image path of the optical code reader of FIGS. 4A-4D, showing the image path and view volume with shading lines.

FIG. 4H is a front view of a second set of mirrors 130*d* (mirrors $130d_1$, $130d_2$ and $130d_3$) reflecting a left lower perspective of a view volume 64*d* along an image path 62*d* to an imager 60*d* of the optical code reader 150. With reference to FIG. 4H, an image of the object 20 in the view volume 64*d*, captured from the left lower perspective and propagated through the lower transparent plate 96 along the image path segment $62d_1$, is reflected upward and outward away from the center of the reader 150 by the primary mirror $130d_1$ along the image path segment $62d_2$ to the secondary mirror $130d_2$ which reflects the image sideward toward the center of the reader 150 along the image path segment $62d_3$ to a tertiary mirror $130d_3$ on a split mirror 130*def* which reflects the image downward along an image path segment $62d_3$ to the imager 60*def* that may be supported on the PCB 140 located in the lower housing portion 84 of the housing 82. The image path segments $62d_1$, $62d_2$ and $62d_3$ overlap spatially in a volume between the mirrors $130d_1$ and $130d_2$. The perspective associated with the image path 62*d* in FIG. 4 may be oriented similarly to or differently from the perspective associated with the image path 62*d* in FIG. 3.

The mirrors $130d_1$ and $130d_2$ may be separated as shown, or they may be abutting, or they may be integrated into a single split mirror or other monolithic mirror structure, with or without nonreflective regions in proximity to their intersection. The mirrors $130d_1$ and $130d_2$ lie in respective planes that intersect one another at an acute angle.

FIG. 4I is a front view of a third set of mirrors 130*e* (mirrors $130e_1$, $130e_2$ and $130e_3$) reflecting a right lower perspective of the view volume 64*e* along the image path 62*e* to the imager 60*def* of the optical code reader 150. With reference to FIG. 4I, an image of the object 20 in the view volume 64*e*, captured from the right lower perspective and propagated through the lower transparent plate 96 along the image path segment $62e_1$, is reflected upward and outward away from the center of the reader 150 by the primary mirror $130e_1$ along the image path segment $62e_2$ to the secondary mirror $130e_2$ which reflects the image sideward toward the center of the reader 150 along the image path segment $62e_3$ to a tertiary mirror $130e_3$ on the split mirror 130*def* which reflects the image downward along an image path segment $62e_3$ to the imager 60*def*, which may be supported on the PCB 140. The image path segments $62e_1$, $62e_2$ and $62e_3$ overlap spatially in a volume between the mirrors $130e_1$ and $130e_2$.

The mirrors $130e_1$ and $130e_2$ may be separated as shown, or they may be abutting, or they may be integrated into a single split mirror or other monolithic mirror structure, with or without nonreflective regions in proximity to their intersection.

The perspective associated with the image path 62*e* in FIG. 4 may be oriented similarly to or differently from the perspective associated with the image path 62*e* in FIG. 3. In addition, the image path 62*e* may be arranged so that it is bilaterally symmetrical with the image path 62*d*. However, in some embodiments, the image path 62*e* may be arranged to be asymmetrical with the image path 62*d*.

FIG. 4J is a side view of a fourth set of mirrors 130*f* (mirrors $130f_1$ and $130f_2$) reflecting a back lower perspective of a view volume 64*f* along an image path 62*f* to an imager 60*def* of the optical code reader 150. With reference to FIG. 4J, an image of the object 20 in the view volume 64*f*, captured from the back lower perspective and propagated generally downward and horizontally through the lower transparent plate 96 along an image path segment $62f_1$, is reflected generally horizontally away from the checker side by a primary mirror $130f_1$ along an image path segment $62f_2$ to a secondary mirror $130f_2$, which reflects the image generally downward along an image path segment $62f_3$ to the imager 60*def*. The perspective associated with the image path 62*f* in FIG. 4 may be oriented similarly to or differently from the perspective associated with the image path 62*f* in FIG. 3.

Figure 4K:
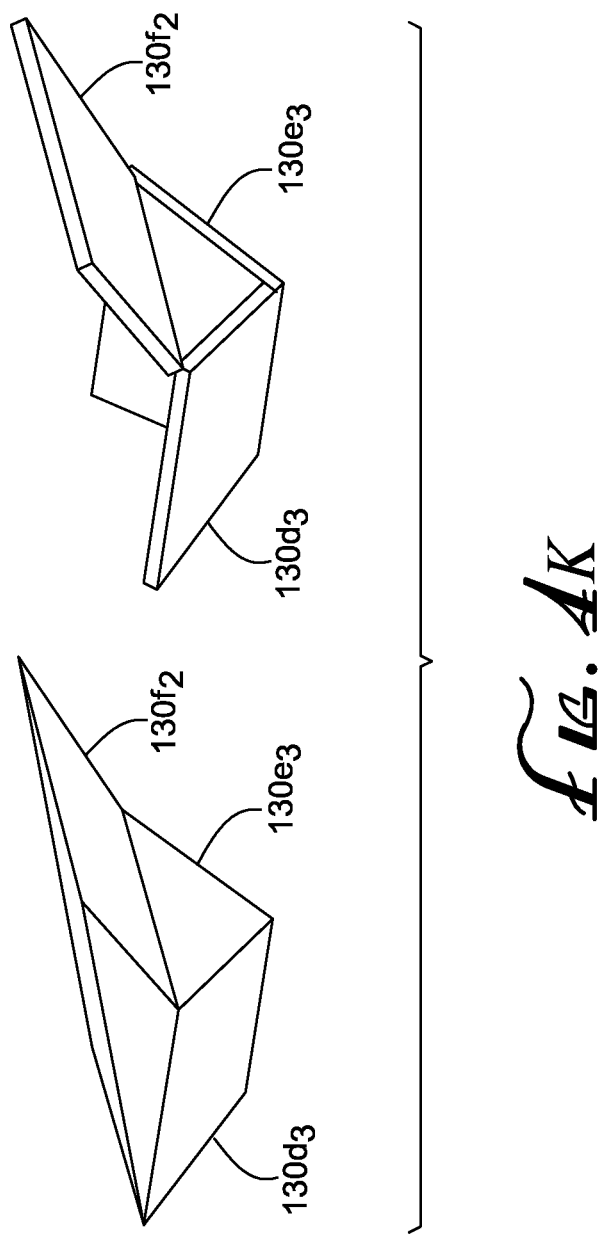
FIG. 4K is an isometric view of a compound mirror structure used with the horizontal imager in the optical code reader of FIGS. 4A-4D.

FIG. 4K is an isometric view of different embodiments of the mirror 130*def* used with the horizontal imager in the optical code reader of FIGS. 4A-4D. The mirror 130*def* is preferably an integrated, monolithic, or single-piece split mirror or compound mirror that includes mirror components $130d_3$, $130e_3$, and $130f_2$ of the respective image paths 62*d*, 62*e*, and 62*f*. The mirror components $130d_3$, $130e_3$, and $130f_2$ of the split mirror 130*def* may be arranged at different angles with respect to the horizontal or vertical planes (and with respect to each other) to accommodate the orientations of the different image paths 62*d*, 62*e*, and 62*f*. The mirror components $130d_3$, $130e_3$, and $130f_2$ may employ any of the variations used for any of the mirrors 130 as previously described. The mirror 130*def* may be formed by molding, bending, and/or welding a single monolithic piece or substrate, such as a metal or plastic, and then applying reflective coatings. Any desired nonreflective regions could be covered in advance by masking or subsequently covered by a nonreflective coating. Alternatively, the mirror 130*def* may be assembled from separate mirrored components. In some embodiments, the mirror components $130d_3$, $130e_3$, and $130f_2$ may have nonreflective regions in proximity to their intersections. In some embodiments, some image processing advantages may be gained by not capturing images reflected from near the intersection of the mirror components $130d_3$, $130e_3$, and $130f_2$ of the split mirror 130*def*. In some alternative embodiments, the mirror components $130d_3$, $130e_3$, and $130f_2$ may be separated into two or three separate mirrors. In some embodiments, the mirror components $130d_3$, $130e_3$, and $130f_2$ direct the respective image paths 62 to separate imagers 60 that may be closely spaced.

With reference to FIG. 4F or 4G, the image field 156 of the imager 60*def* may be split into three image field regions, such as a left region 162, a right region 164, and a back region 166, that may be adapted to capture images from the corresponding left lower perspective, right lower perspective, and back lower perspective, respectively. Thus, the mirror component $130d_3$ reflects the image along the image path $62d_4$ onto the left region 162 of the image field 156 of the imager 130*def*; the mirror component $130e_3$ reflects the image along the image path $62e_4$ onto the right region 164 of the image field 156 of the imager 130*def*; and the mirror component $130f_2$ reflects the image along the image path $62f_3$ onto the back region 166 of the image field 156 of the imager 130*def*. Exemplary imagers 60 that may be used for this embodiment include wide VGA imagers (CMOS or CCD) with a resolution of 752×480 pixels for the imager 60*a* and megapixel imagers with a resolution of 1280×1024 pixels for the imager 60*def*. One preferred megapixel imager is the model EV76C560 1.3 MP CMOS image sensor available from e2V of Essex, England and Saint-Egrève, France. One preferred VGA imager is the model MT9V022 available from Aptina Imaging of Corvallis, Oreg. or San Jose, Calif. These imagers may be applicable to the data reader of any of the embodiments herein, however, any other suitable type of imager 60 of various resolutions may be employed.

The image field 156 need not be square or rectangular and may, for example, be circular or have a profile of any suitable geometric shape. Similarly, the image field regions need not be square or rectangular and may, for example, have one or more curved edges. The image field regions may have the same or different sizes. For example, all three regions 162, 164, and 166 may have the same areas and perhaps even the same dimensions. In some embodiments, the left region 162 and right region 164 have the same areas dimensions, and the back region 166 has different dimensions (with the same area or different area) such as shown in FIG. 4F. In some embodiments, all three regions 162, 164, and 166 may have the different areas and different dimensions such as shown, by way of example and not limitation, in FIG. 4G.

The image captured by the image field 156 may be processed as a single image; preferably however, the image captured by each image field region is processed independently. The images from the different perspectives of the object 20 may reach the image field regions with the object being in the same orientation or in different orientations. Furthermore, the same enantiomorphic image of the object 20 from the different perspectives of the object 20 may reach the different image field regions or different enantiomorphic images of the object 20 may reach the different image fields. The different image field regions may have the same photosensitivities or be receptive to different intensities or wavelengths of light.

FIG. 4L is an isometric view of multiple image paths 62 and respective multiple perspective view volumes 64 that form a cumulative view volume 64g of the optical code reader 150, showing the image paths 62 and view volumes 64 without shading lines.

As with the previous embodiments and figures, the same or different filters, lenses, or other optical components may be optionally placed in some or all of the image paths 62. In some embodiments, the image reflected by each mirror component can be captured by the entire image field 156 when pulsed lighting and/or different wavelengths are used to separate the images obtained by the different perspectives. Depending on the layout of the reader, the environment, or the store/checkout stand arrangement, ambient lighting may be sufficient to provide adequate performance. In some embodiments, additional light sources may be added. For example, referring to FIGS. 4A-4B, light sources may comprise any suitable light source such as a row or array of LEDs (light emitting diodes) 72 and 74 mounted in/on the upper housing section 86 and a row/array of LEDs 76 and 78 mounted in/on the lower housing section pointed into the view volume 64 and positioned to illuminate an object 20 with respect to one or more perspectives. The LEDs 72-78 may be disposed on the housing structure or may be mounted internally behind windows 106, 96. The arrays 72-78 are shown only diagrammatically. The LEDs 72-74 are positioned behind window 106 and proximate to and on opposite lateral sides of mirror 130$a_1$. LEDs 76-78 are positioned below window 96 and proximate to and on opposite lateral sides of mirror 130$f_1$. Though two LED arrays are shown in each housing section, fewer or more arrays may be employed. In some embodiments, different wavelengths of light are directed to illuminate different regions of an object for different perspectives. In some embodiments, the one or more of the light sources may be operated in a pulsed mode, the pulsing synchronized with the imager frame rate. In one example, the imagers may be selected with a frame rate of 30 Hz and one or more of the light sources used to illuminate the read region are pulsed at 60 Hz. Examples of light source pulsing is described in U.S. Pat. No. 7,234,641, the disclosure of which is hereby incorporated by reference.

In an alternative embodiment, the upper perspective and the back lower perspective may be reflected to a common imager, and the left and right perspectives may be reflected to a common imager. These common imagers may have split imaging fields divided equally. These imagers 60 may be located where the imagers 60a and 60def are located or they may be located differently with additional mirrors as warranted. These imagers may be located in the same housing portion or different housing portions, and they may share a common PCB 140 or be supported by different PCBs 140. The mirrors 130 used for reflecting images onto these imagers may be split mirrors or independent mirrors.

C. Single Horizontal and Vertical Imagers, Each with Three-Way Split of Perspectives This subsection describes, by way of example, details of one type of embodiment of an imager-based optical code reader 180. FIGS. 5A-5D are respective side, isometric, front, and top views of an optical code reader 180 capable of capturing multiple views of the object 20 (not shown in FIG. 4; see FIG. 1) from different perspectives. For convenience, the optical code reader 180 will be described to a large extent using similar reference numerals to those used to describe FIGS. 3 and 4 even though the dimensions of the housing 82, viewing windows, and/or transparent plates may be different; the perspectives, orientations, and/or sizes of the mirrors 130 may be different; the image paths 62 may have different angles; and/or the positioning, orientation, and/or dimensions of other components may be different.

Figure 5C:
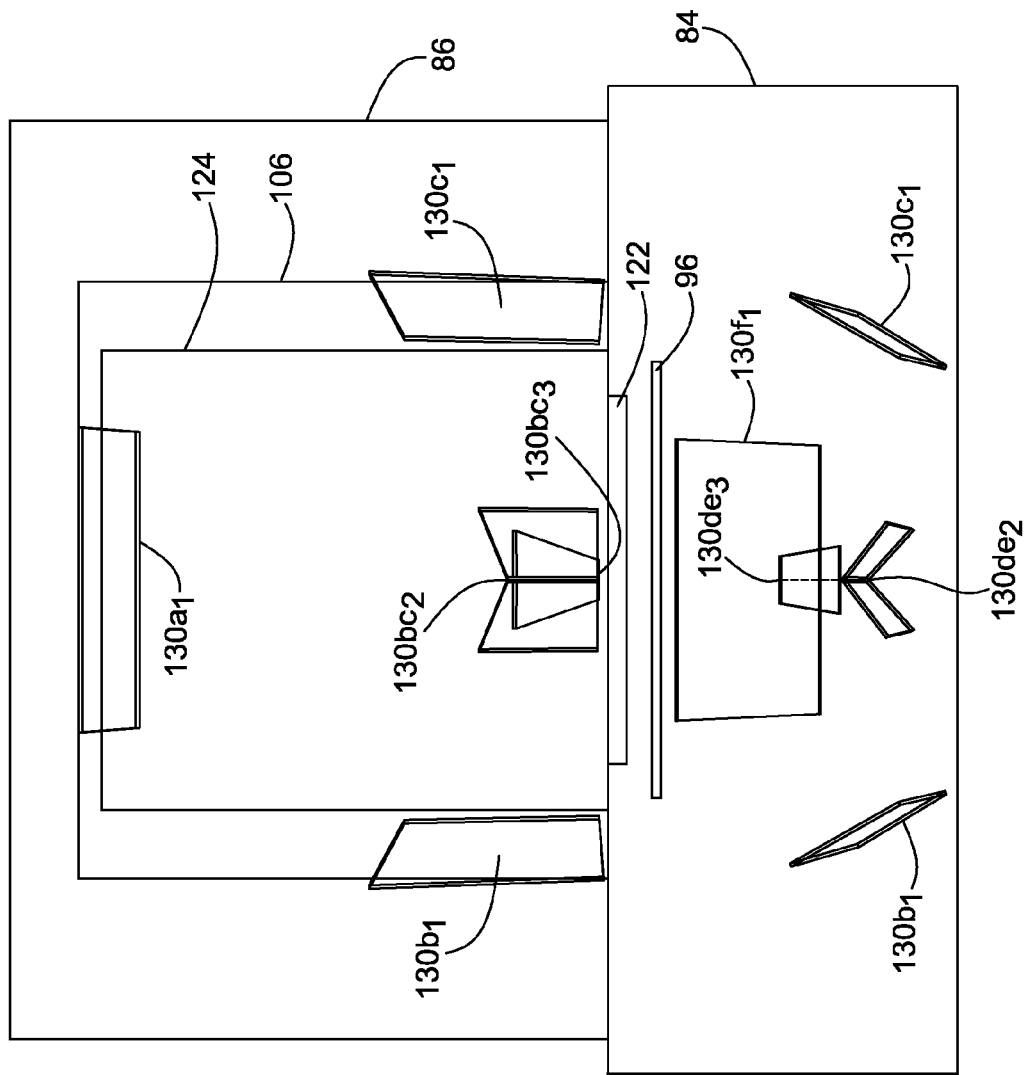
Figure 5D:
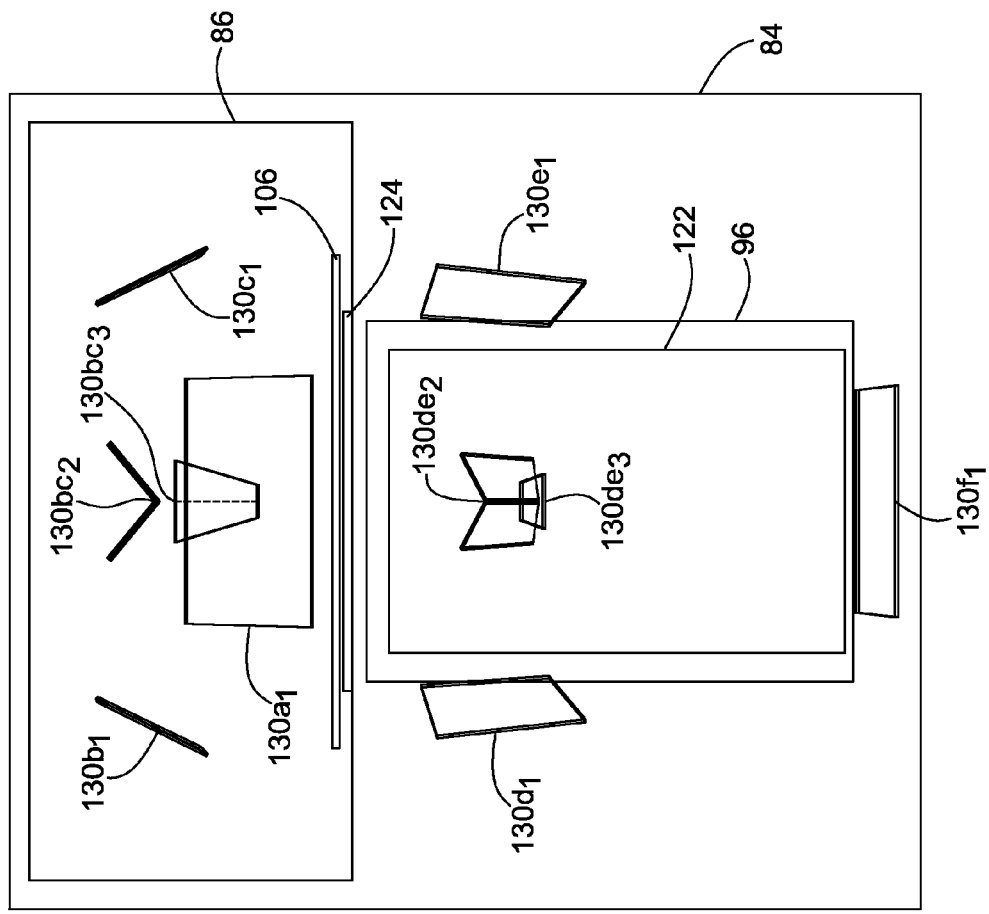
Figure 5F:
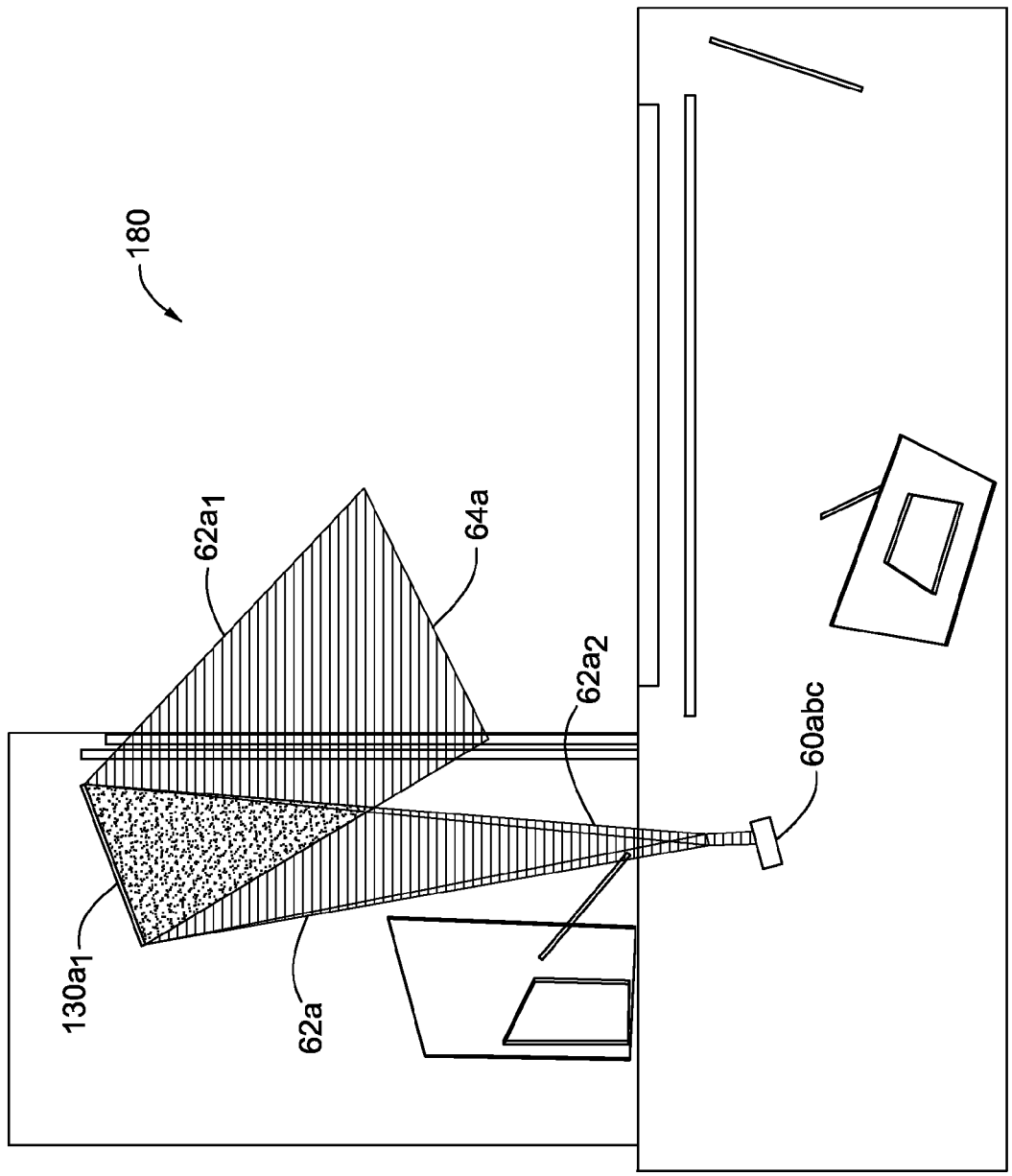
FIG. 5F is a side view of a mirror reflecting a top upper perspective of a view volume along an image path to an imager of the optical code reader of FIGS. 5A-5D, showing the image path and view volume with shading lines.
Figure 5G:
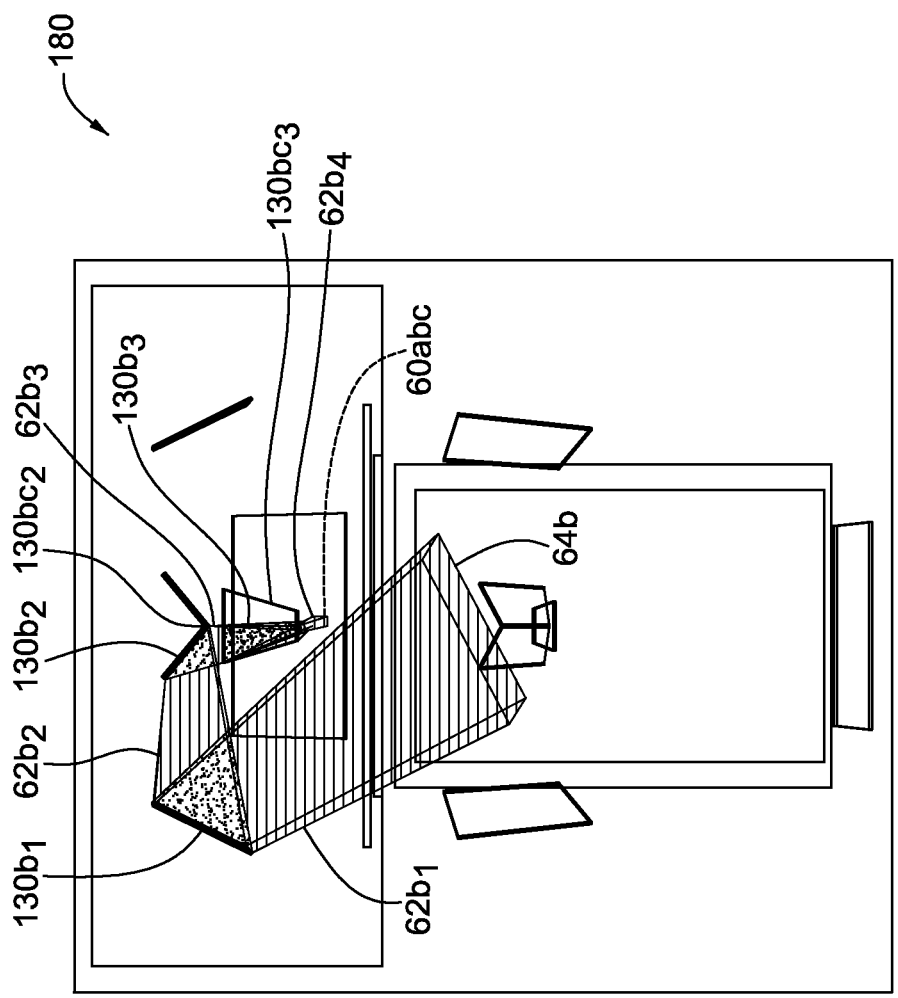
FIG. 5G is a top view of mirrors reflecting a left upper perspective of a view volume along an image path to an imager of the optical code reader of FIGS. 5A-5D, showing the image path and view volume with shading lines.
Figure 5H:
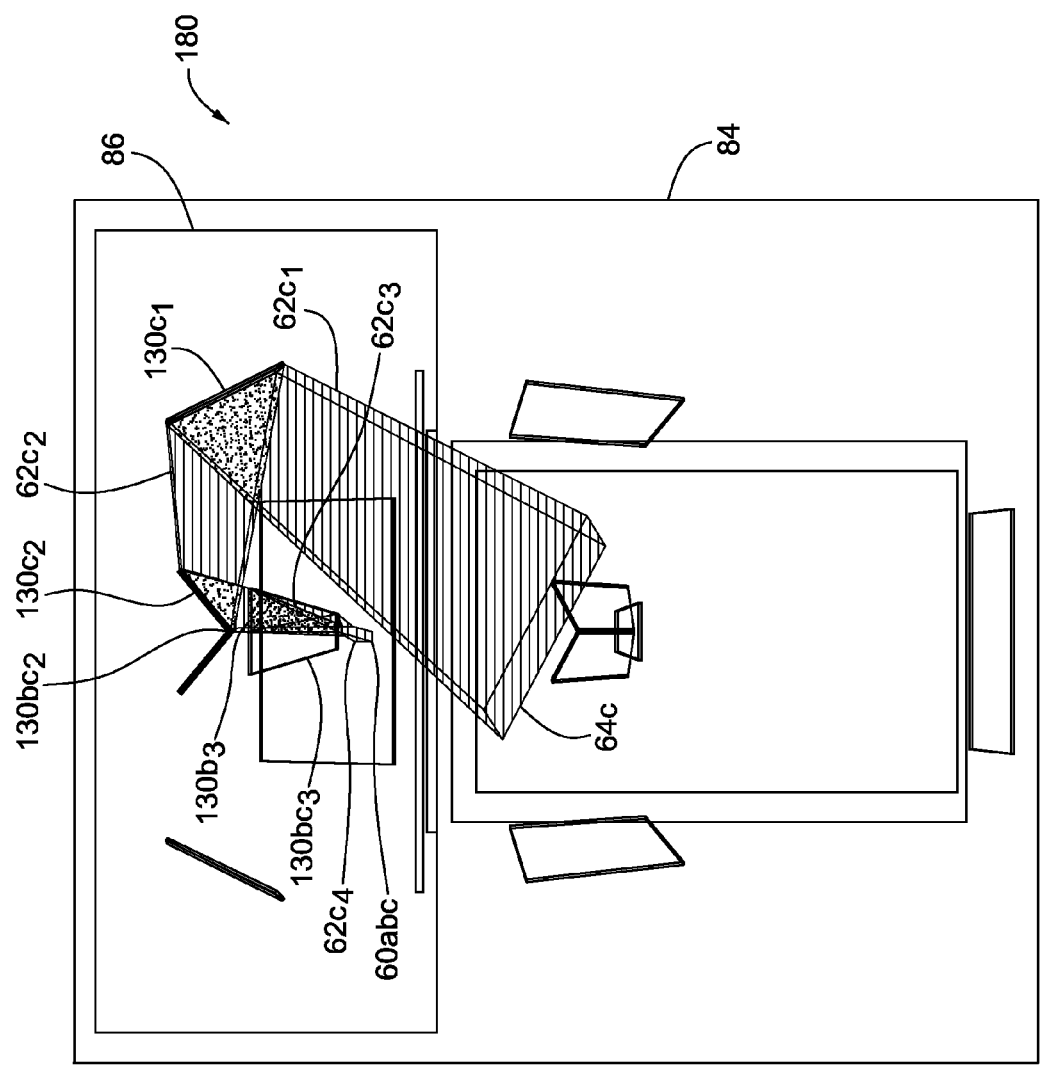
FIG. 5H is a top view of mirrors reflecting a right upper perspective of a view volume along an image path to an imager of the optical code reader of FIGS. 5A-5D, showing the image path and view volume with shading lines.

The optical code reader 180 has only two imagers 60abc and 60def that each capture three views. The imager 60abc captures three views through the upper transparent plate 106 in the vertical housing portion 86. Those three views are from upper top, upper left and upper right perspectives, as described in greater detail below. The imager 60def captures three views through the lower viewing window 96 in the horizontal housing portion 84. Those three views are from lower left, lower right and back perspectives, as described in greater detail below FIG. 5E is a map of an image field 186 of split-view or multi-region imager divided into three regions to capture separate views at the imager 60abc. With reference to FIGS. 5F-5H (described in greater detail below), the image field 186 of the imager 60abc may be split into three image field regions, such as a left region 192, a right region 194, and a top region 196, that may be adapted to capture images from the corresponding left upper perspective, right upper perspective, and top upper perspective, respectively. Thus, the mirror component 130$b_2$ reflects the image along the image path segment 62$b_3$ onto the left region 192 of the image field 186 of the imager 60abc; the mirror component 130$c_2$ reflects the image along the image path segment 62$c_3$ onto the right region 164 of the image field 156 of the imager 60abc; and the mirror component 130$a_1$ reflects the image along the image path segment 62$a_2$ onto the top region 196 of the image field 186 of the imager 60abc. One or more of image field variations previously discussed with respect to the image field 156 of FIG. 4 may optionally employed in any combination with respect to the image field 186 except where such combinations are mutually exclusive.

FIG. 5F illustrates a first set of mirrors 130a (mirror $130a_1$) reflecting a top upper perspective of the view volume 64a along the image path 62a to the imager 60abc of the optical code reader 180. With reference to FIG. 5F, an image of the object 20 in the view volume 64a, captured from the top upper perspective and propagated generally upward and horizontally through the upper transparent plate 106 along the image path segment $62a_1$, is reflected downward by the primary mirror $130a_1$ along the image path segment $62a_1$ to the imager 60abc, which may be supported on the PCB 140 (not shown) located in the lower housing portion 84 of the housing 82. The image path segments $62a_1$ and $62a_2$ have respective lengthwise axes that intersect one another at an acute angle.

FIG. 5G is a top view of a second set of mirrors 130b (mirrors $130b_1$, $130b_2$ and $130b_3$) reflecting a left upper perspective of the view volume 64b along the image path 62b to the imager 60abc of the optical code reader 180. With reference to FIG. 5G, an image of the object 20 in the view volume 64b, captured from the left upper perspective and propagated through the upper transparent plate 106 along the image path segment $62b_1$, is reflected sideward toward the center of the reader 180 by the primary mirror $130b_1$ along the image path segment $62b_2$ to a secondary mirror $130b_2$ in the mirror structure $130bc_2$ which reflects the image along the image path segment $62b_3$ to a tertiary mirror $130b_3$ in the split mirror $130bc_3$ which reflects the image downward along the image path segment $62b_4$ to the imager 60abc. The image path segments $62b_1$ and $62b_2$ have respective lengthwise axes that intersect one another at an acute angle.

FIG. 5H is a top view of a third set of mirrors 130c (mirrors $130c_1$, $130c_2$ and $130c_3$) reflecting a right upper perspective of the view volume 64c along the image path 62c to the imager 60abc of the optical code reader 180. With reference to FIG. 5H, an image of the object 20 in the view volume 64c, captured from the right upper perspective and propagated through the upper transparent plate 106 along the image path segment $62c_1$, is reflected sideward toward the center of the reader 180 by the primary mirror $130c_1$ along the image path segment $62c_2$ to a secondary mirror $130c_2$ in the mirror structure $130bc_2$ which reflects the image along the image path segment $62c_3$ to a tertiary mirror $130c_3$ in the split mirror $130bc_3$ which reflects the image downward along the image path segment $62c_4$ to the imager 60abc. The image path segments $62c_1$ and $62c_2$ have respective lengthwise axes that intersect one another at an acute angle.

The mirror structure $130bc_2$ is preferably a split or compound mirror that includes mirror components or surfaces $130b_2$ and $130c_2$ of the respective image paths 62b and 62c, and the mirror $130bc_3$ is preferably a single planar mirror surface that has two sections $130b_3$ and $130c_3$ in the respective image paths 62b and 62c. The mirror components $130b_2$ and $130c_2$ and $130b_3$ and $130c_3$ of the respective split mirrors $130bc_2$ and $130bc_2$ may be arranged at different angles with respect to the horizontal or vertical planes (and with respect to each other) to accommodate the orientations of the different image paths 62b and 62c. The compound mirror structure $130bc_2$ and its mirror components $130b_2$ and $130c_2$ may employ any of the variations discussed with respect to any of the other compound mirror structures and parts thereof described herein. In some embodiments, the mirror components $130b_2$ and $130c_2$ may have nonreflective regions in proximity to their intersections. FIG. 5I illustrates an example embodiment of the compound mirror structures $130bc_2$.

Figure 5J:
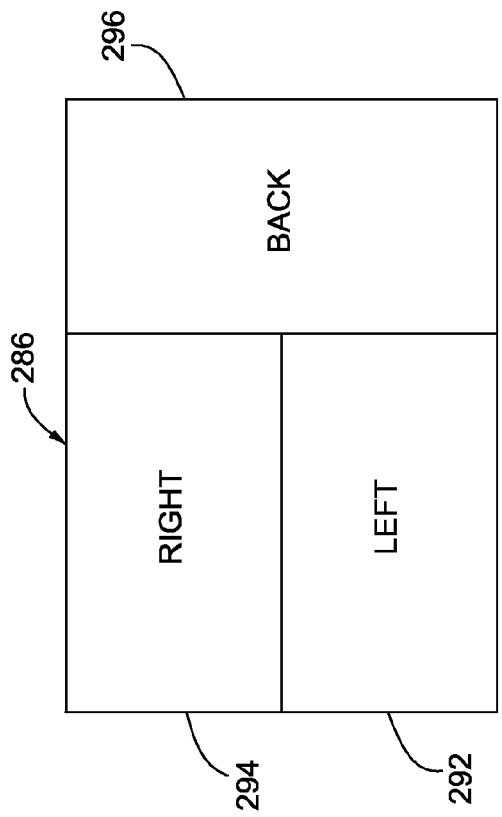
FIG. 5J is a map of an image field of the horizontal imager in the optical code reader of FIGS. 5A-5D, divided into three regions to capture separate views.
Figure 5I:
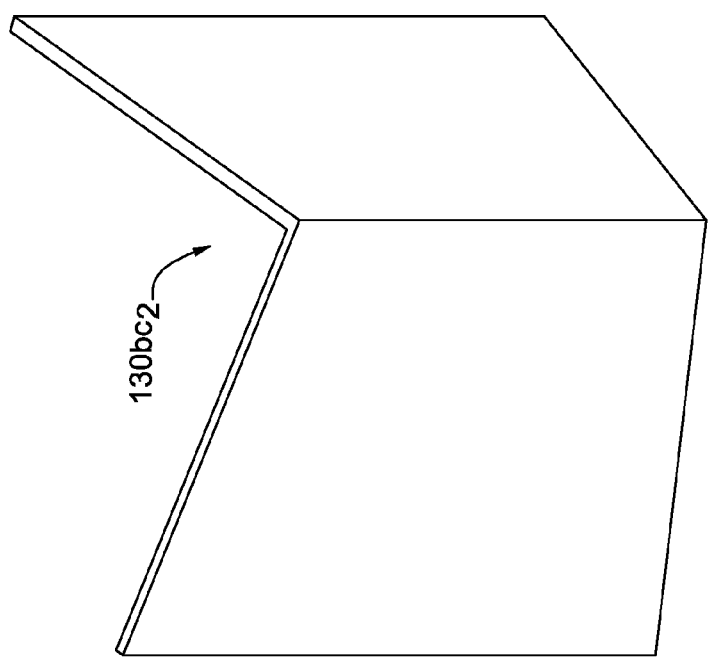
FIG. 5I is an isometric view of a compound mirror structure used with the vertical imager in the optical code reader of FIGS. 5A-5D.

FIG. 5J is a map of an image field 286 of an split-view or multi-region imager divided into three regions to capture separate views at the imager 60def. With reference to FIGS. 5K-5M (described in greater detail below), the image field 286 of the imager 60def may be split into three image field regions, such as a left region 292, a right region 294, and a back region 296, that may be adapted to capture images from the corresponding left lower perspective, right lower perspective, and back perspective, respectively. Thus, the mirror component $130d_3$ reflects the image along the image path segment $62d_4$ onto the left region 292 of the image field 286 of the imager 60def; the mirror component $130e_2$ reflects the image along the image path segment $62e_4$ onto the right region 294 of the image field 256 of the imager 60def; and the mirror component $130f_1$ reflects the image along the image path $62f_2$ onto the back region 296 of the image field 286 of the imager 60def. One or more of image field variations previously discussed with respect to the image field 156 of FIG. 4 may optionally employed in any combination with respect to the image field 286 except where such combinations are mutually exclusive.

FIG. 5K is a front view of a fourth set of mirrors 130d (mirrors $130d_1$, $130d_2$ and $130d_3$) reflecting a left lower perspective of the view volume 64d along the image path 62d to an imager 60def of the optical code reader 180. With reference to FIG. 5K, an image of the object 20 in the view volume 64d, captured from the left lower perspective and propagated through the lower transparent plate 96 along the image path segment $62d_1$, is reflected sideward toward the center of the imager 180 by the primary mirror $130d_1$ along an image path segment $62d_2$ to a secondary mirror $130d_2$ in a mirror structure $130de_2$ which reflects the image along an image path segment $62d_3$ to a tertiary mirror $130d_3$ in a mirror structure $130de_3$ which reflects the image along an image path segment $62d_4$ to the imager 60def, which may be supported on a PCB 140 (not shown). The imager 60def may be supported on a different PCB 140 than the one that may be used to support the imager 60abc. The image path segments $62d_1$ and $62d_2$ have respective lengthwise axes that intersect one another at an acute angle.

FIG. 5L is a front view of a fifth set of mirrors 130e (mirrors $130e_1$, $130e_2$ and $130e_3$) reflecting a right lower perspective of the view volume 64e along an image path 62e to the imager 60def of the optical code reader 180. With reference to FIG. 5L, an image of the object 20 in the view volume 64e, captured from the right lower perspective and propagated through the lower transparent plate 96 along an image path segment $62e_1$, is reflected sideward toward the center of the imager 180 by a primary mirror $130e_1$ along an image path segment $62e_2$ to the secondary mirror $130e_2$ in the mirror structure $130de_2$ which reflects the image along an image path segment $62e_3$ to the tertiary mirror $130e3$ in a mirror structure $130de_3$ which reflects the image along an image path segment $62e_4$ to the imager 60def. The image path segments $62e_1$ and $62e_2$ have respective lengthwise axes that intersect one another at an acute angle.

FIG. 5M is a side view of sixth set of mirrors 130f (mirror $130f_1$) reflecting a back lower perspective of a view volume 64f along an image path 62f to the imager 60def of the optical code reader 180. With reference to FIG. 5M, an image of the object 20 in the view volume 64f, captured from the back lower perspective and propagated through the lower transparent plate 96 along an image path segment $62f_1$, is reflected horizontally away from the checker side by a primary mirror $130f_1$ along an image path segment $62f_2$ to the imager 60def. The perspective associated with the image path 62f in FIG. 5 may be oriented similarly to or differently from the perspective associated with the image path 62f in FIGS. 3 and 4. In an alternative embodiment, one or two additional mirrors 130f may be positioned along the image path 62f to facilitate alignment with the imager 60def. The image path segments 62$f_1$ and 62$f_2$ have respective lengthwise axes that intersect one another at an acute angle The mirror structure 130$de_2$ is preferably a compound or split mirror that includes mirror surfaces or components 130$d_2$ and 130$e_2$ of the respective image paths 62d and 62e, and the mirror 130$de_3$ is preferably a single planar mirror that includes mirror components or sections 130$d_3$ and 130$e_3$ in the respective image paths 62d and 62e. The mirror components 130$d_2$ and 130$e_2$ and 130$d_3$ and 130$e_3$ of the respective split mirrors 130$de_2$ and 130$de_2$ may be arranged at different angles with respect to the horizontal or vertical planes (and with respect to each other) to accommodate the orientations of the different image paths 62d and 62e. The compound mirror structures 130$de_2$ and its components 130$d_2$ and 130$e_2$ may employ any of the variations discussed with respect to any of the other compound mirror structures and parts thereof described herein. In some embodiments, the mirror components 130$d_2$ and 130$e_2$ may have nonreflective regions in proximity to their intersections. FIG. 5N illustrates an example embodiment of the compound mirror structures 130$de_2$.

With reference to FIGS. 4 and 5, the image paths 62d, 62e, and 62f may reflect the images of the object 20 onto a split field imager 156, such as described in connection with FIG. 4. Exemplary imagers 60 that may be used for these FIG. 5 embodiments include megapixel imagers with a resolution of 1280×1024 pixels for the imagers 60abc and 60def. One preferred megapixel imager is the model EV76C560 1.3 MP CMOS image sensor available from e2V of Essex, England and Saint-Egrève, France. However, any other suitable type of imager 60 of various resolutions may be employed.

FIG. 5O is an isometric view of multiple image paths 62 and respective multiple perspective view volumes 64 that form a cumulative view volume 64g of the optical code reader 180. An advantage of this embodiment is that two imagers 60 can capture six views from different perspectives. The image paths 62 can be alternatively arranged so that the imagers 60abc and 60def can be located in different housing portions or so that they can be supported by the same PCB 140. As with the previous embodiments and figures, any previously discussed variations or combinations thereof that are not mutually exclusive may be employed.

D. Single Imager Split for One Vertical and Multiple Horizontal Views

This subsection describes, by way of example, details of one type of embodiment of an imager-based optical code reader 210. FIGS. 6A-6D are respective side, isometric, front, and top views of an optical code reader 210 capable of capturing multiple views of an object 20 (not shown) from different perspectives. For convenience, the optical code reader 210 will be described to a large extent using similar reference numerals to those used to describe FIGS. 3-5 even though the dimensions of the housing 82, viewing windows, and/or transparent plates may be different; the perspectives, orientations, and/or sizes of the mirrors 130 may be different; the image paths 62 may have different angles; and/or the positioning, orientation, and/or dimensions of other components may be different.

With reference to FIGS. 6A-6D, the optical code reader 210 has only one imager 60ade that capture three views, including at least one view from the upper perspective and one view from the lower perspective.

Figure 6B:
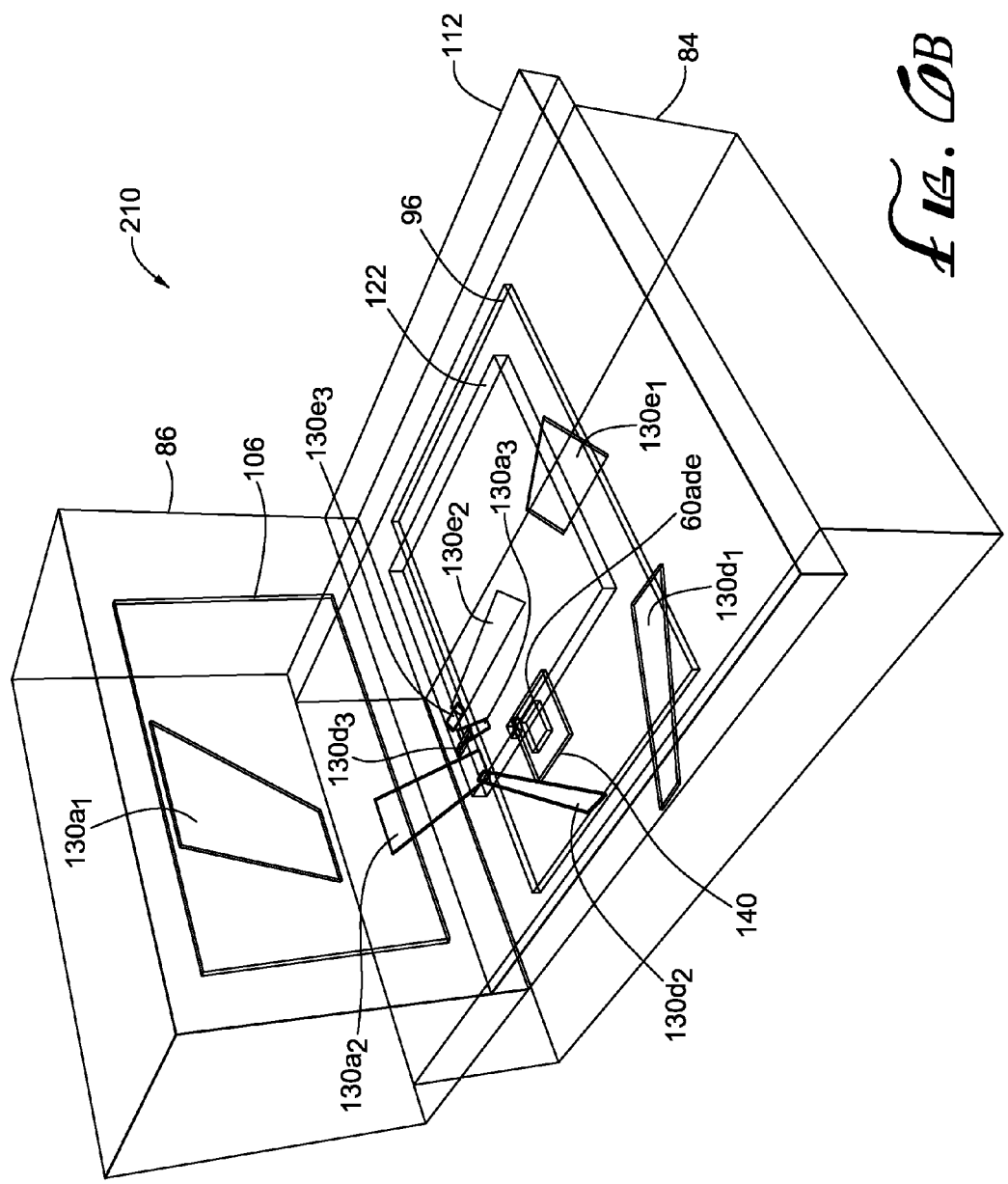
Figure 6D:
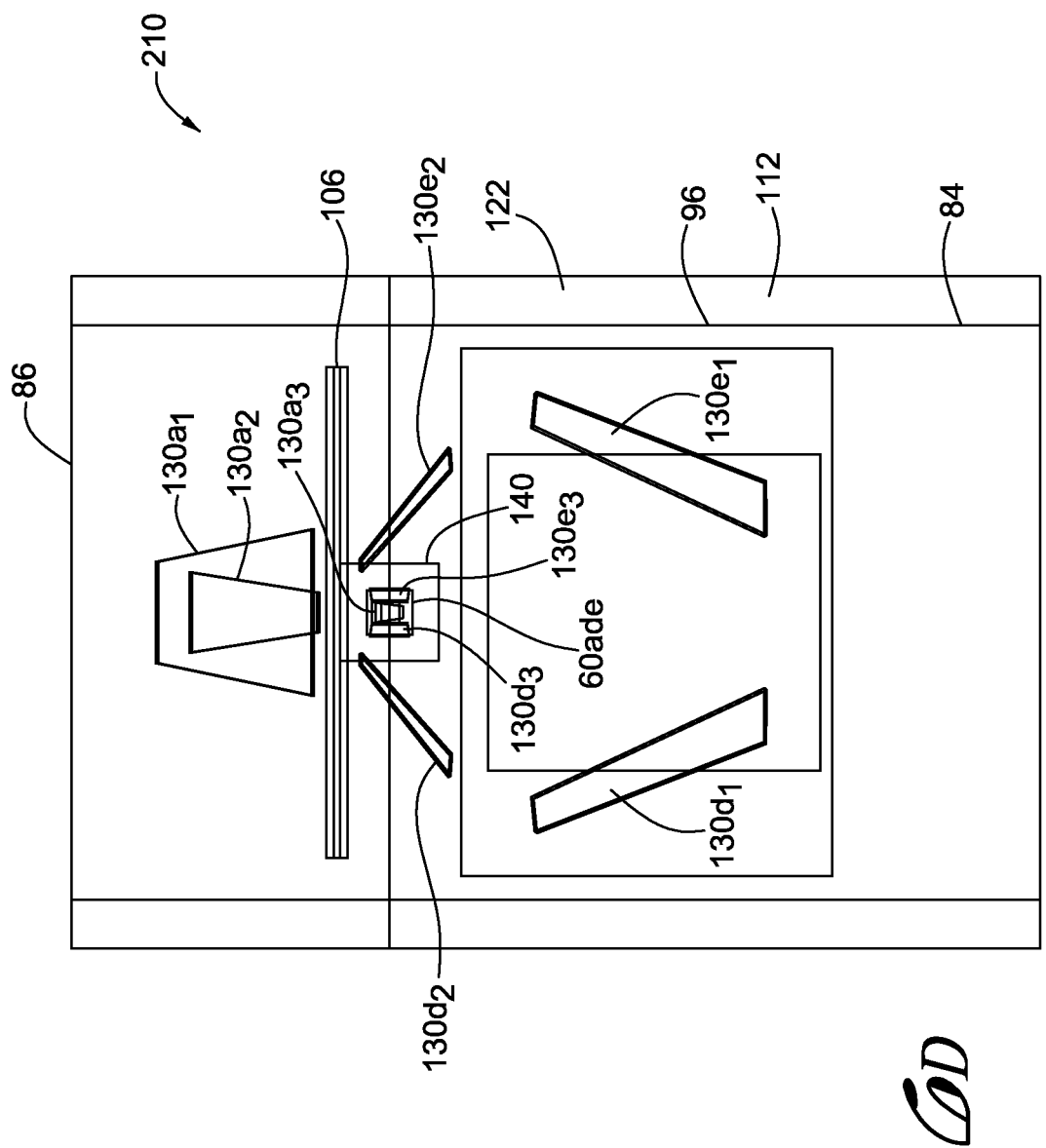
Figure 6L:
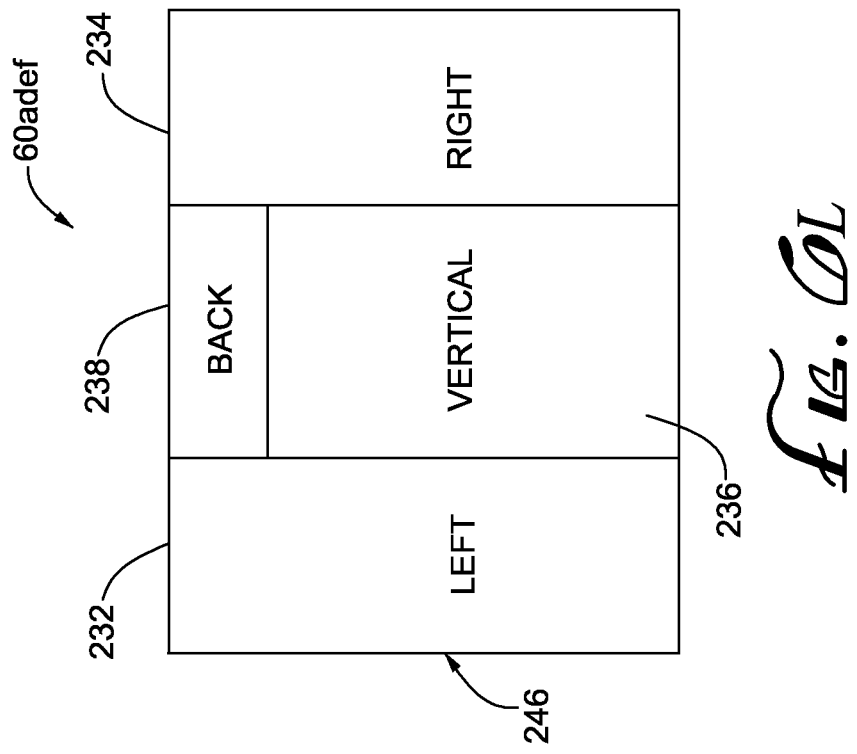
FIG. 6L is a map of an image field of the imager of FIG. 6K, divided into four regions to capture separate views.
Figure 6E:
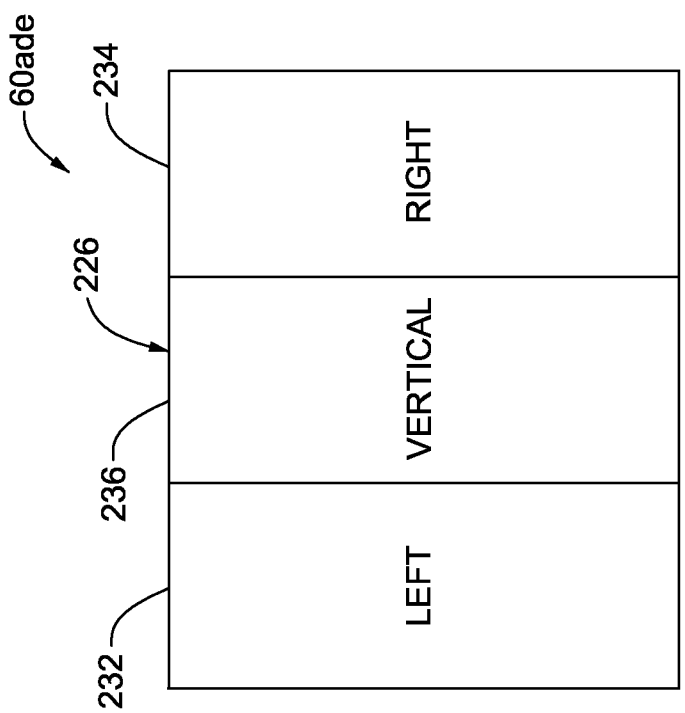
FIG. 6E is a map of an image field of the imager in the optical code reader of FIGS. 6A-6D, divided into three regions to capture separate views.

FIG. 6E is a map of an image field 226 of the split-view or multi-region imager 60ade divided into three image field regions such as a left region 232, a right region 234, and a vertical region 236, that may be adapted to capture images from the corresponding left lower perspective, right lower perspective, and vertical perspective, respectively. Thus, with reference to the following FIGS. 6F-6I (described in greater detail in subsequent paragraphs), the mirror 130$d_3$ reflects the image along the image path segment 62$d_4$ onto the left region 232; the mirror 130$e_3$ reflects the image along the image path segment 62$e_4$ onto the right region 234; and the mirror 130$a_3$ reflects the image along the image path segment 62$a_4$ onto the vertical region 236. One or more of image field variations previously discussed with respect to the image fields 156 or 186 may optionally employed in any combination with respect to the image field 226 except where such combinations are mutually exclusive.

Figure 6F:
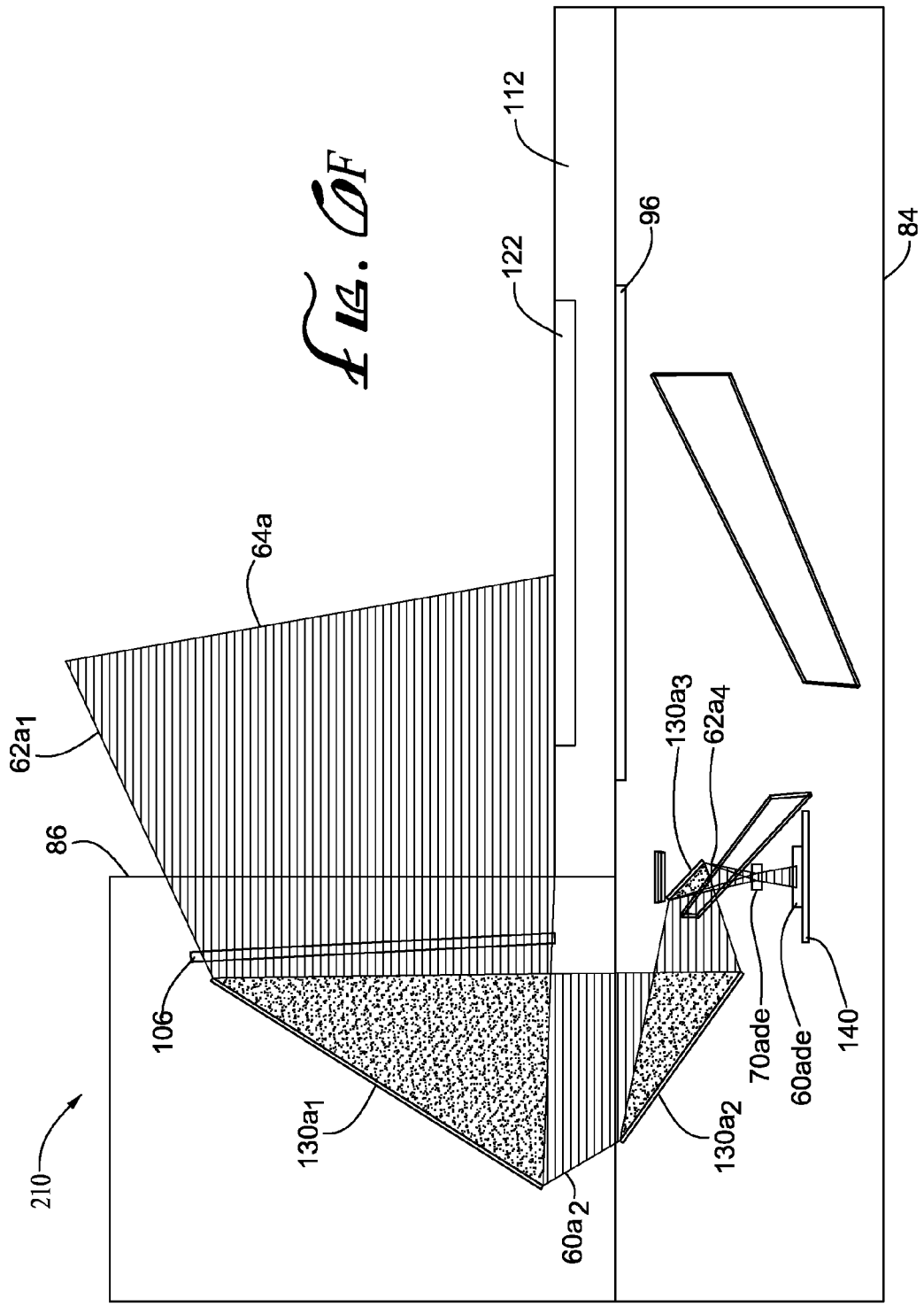
FIG. 6F is a side view of a mirror reflecting an upper perspective of a view volume along an image path to an imager of the optical code reader of FIGS. 6A-6D, showing the image path and view volume with shading lines.
Figure 61:
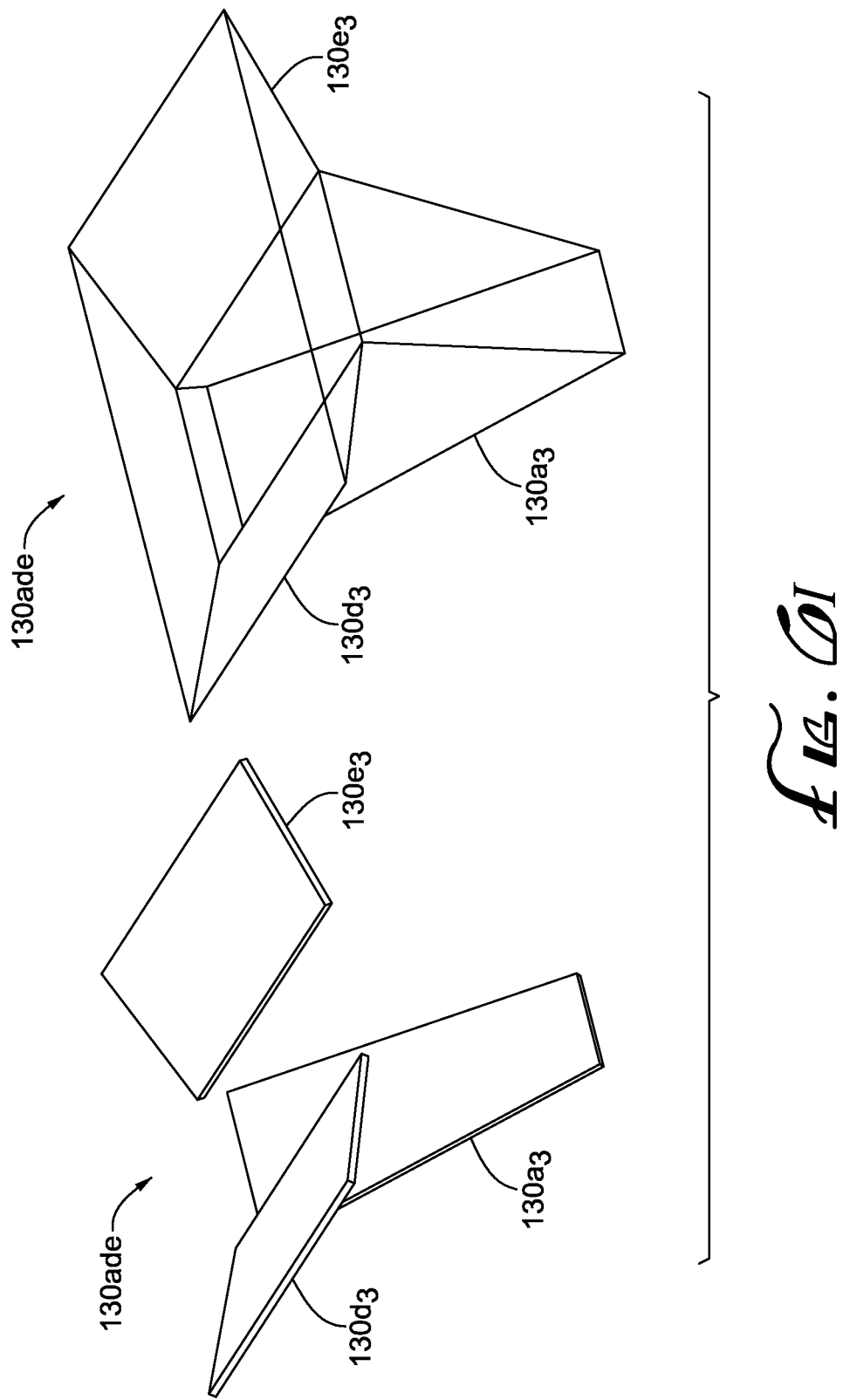

FIG. 6F is a side view of a first set of minors 130a (mirrors 130$a_1$, 130$a_2$ and 130$a_3$) reflecting an upper perspective of the view volume 64a along the image path 62a to the imager 60ade of the optical code reader 210. With reference to FIG. 6F, an image of the object 20 (not shown in FIG. 6) in the view volume 64a, captured generally horizontally from the upper perspective and propagated through the upper transparent plate 106 along the image path segment 62$a_1$, is reflected downward by the primary mirror 130$a_1$ along the image path segment 62$a_2$ to a secondary mirror 130$a_2$ which reflects the image horizontally toward the checker side along an image path segment 62$a_3$ to a tertiary mirror 130$a_3$ which reflects the image downward along an image path segment 62$a_4$ through a lens 70ade to the imager 60ade, which may be supported on the PCB 140 located in the lower housing portion 84 of the housing 82.

FIG. 6G is a front view of a second set of mirrors 130d (mirrors 130$d_1$, 130$d_2$ and 130$d_3$) reflecting a left lower perspective of the view volume 64d along the image path 62d to the imager 60ade of the optical code reader 210. With reference to FIG. 6G, an image of the object 20 in the view volume 64d, captured from the left lower perspective and propagated through the lower transparent plate 96 along the image path segment 62$d_1$, is reflected by the primary mirror 130$d_1$ along an image path segment 62$d_2$ to a secondary mirror 130$d_2$ which reflects the image along an image path segment 62$d_3$ to a tertiary mirror 130$d_3$ which reflects the image along an image path segment 62$d_4$ through the lens 70ade to the imager 60ade.

FIG. 6H is a front view of a third set of mirrors 130e (mirrors 130$e_1$, 130$e_2$ and 130$e_3$) reflecting a right lower perspective of the view volume 64e along an image path 62e to the imager 60ade of the optical code reader 210. With reference to FIG. 6H, an image of the object 20 in the view volume 64e, captured from the right lower perspective and propagated through the lower transparent plate 96 along an image path segment 62$e_1$, is reflected by a primary mirror 130$e_1$ along an image path segment 62$e_2$ to a secondary mirror 130$e_2$ which reflects the image along an image path segment 62$e_3$ to a tertiary mirror 130$e_3$ which reflects the image along an image path segment 62$e_4$ through the lens 70ade to the imager 60ade.

FIG. 6I is an isometric view of a compound mirror structure 130ade used in the optical code reader of FIGS. 6A-6D. The compound mirror structure 130ade comprises three reflective surfaces 130$a_3$, 130$d_3$ and 130$e_3$, which are generally on the bottom sides of the three surfaces shown on the left. The compound mirror structure 130ade may be a solid or hollow molded piece, such as shown on the right, with mirrors attached or reflective coatings applied to the desired surfaces. The other surfaces may be nonreflective, such as by painting or coating or virtue of the material used to construct the core piece. The compound mirror structure 130*ade* may be made by any other suitable process. In some embodiments, the mirror components may have nonreflective regions in proximity to their intersections.

FIG. 6J is an isometric view of multiple image paths 62 and respective multiple perspective view volumes 64 that form a cumulative view volume 64*g* of the optical code reader 210. An advantage of these embodiments is that one imager 60 can capture either three or four views, with at least one view from the upper perspective and at least one view from the lower perspective. As with the previous embodiments and figures, any previously discussed variations or combinations thereof that are not mutually exclusive may be employed.

The preceding FIGS. 6A-6J depict an embodiment of the optical code reader 210 that does not facilitate the capture of an image from the back side of an object 20. However, some embodiments of the optical code reader 210 can be adapted to capture back side images where the imager 60*ade* is split into four image field regions and is thus labeled imager 60*adef*, as in FIG. 6K, which is an isometric view of one example of an alternative embodiment of the optical code reader 210 modified to capture a back side image on the imager 60*adef* via mirrors 130*f*, which comprise individual mirrors 130$f_1$ and 130$f_2$ in this example embodiment.

FIG. 6L is a diagram of an image field 246 of the split-view or multi-region imager 60*adef* divided into four image field regions to capture separate views. The image field 246 may be in many respects similar to the image field 226; however, a portion of the image field region 238 of the image field 226 is employed to capture the back lower perspective. Thus, the mirror 130$f_2$ reflects the image along the image path 62$f_3$ onto a back region 238 of the image field 246 of the imager 60*adef*. One or more of image field variations previously discussed with respect to the image fields 156, 186, or 286 may optionally employed in any combination with respect to the image field 246 except where such combinations are mutually exclusive. Exemplary imagers 60 that may be used for these embodiments include megapixel imagers with a resolution of 1280×1024 pixels for the imager 60*ade* or the imager 60*adef*. One preferred megapixel imager is the model EV76C560 1.3 MP CMOS image sensor available from e2V of Essex, England and Saint-Egrève, France. However, any other suitable type of imager 60 of various resolutions may be employed.

FIG. 6M is a side view of an optional fourth set of mirrors 130*f* (minors 130$f_1$ and 130$f_2$) reflecting a back lower perspective of a view volume 64*f* along an image path 62*f* to imager 60*adef* of the optical code reader 210. An image of the object 20 in the view volume 64*f*, captured from the back lower perspective and propagated through the lower transparent plate 96 along an image path segment 62$f_1$, is reflected by a primary mirror 130$f_1$ generally horizontally away from the checker side along an image path segment 62$f_2$ to a secondary mirror 130$f_2$ which reflects the image generally downward along an image path segment 62$f_3$ through the lens (not shown) to the imager 60*adef*. The perspective associated with the image path 62*f* in FIG. 6 may be oriented similarly to or differently from the perspective associated with the image path 62*f* in FIGS. 3-5.

Figure 6K:
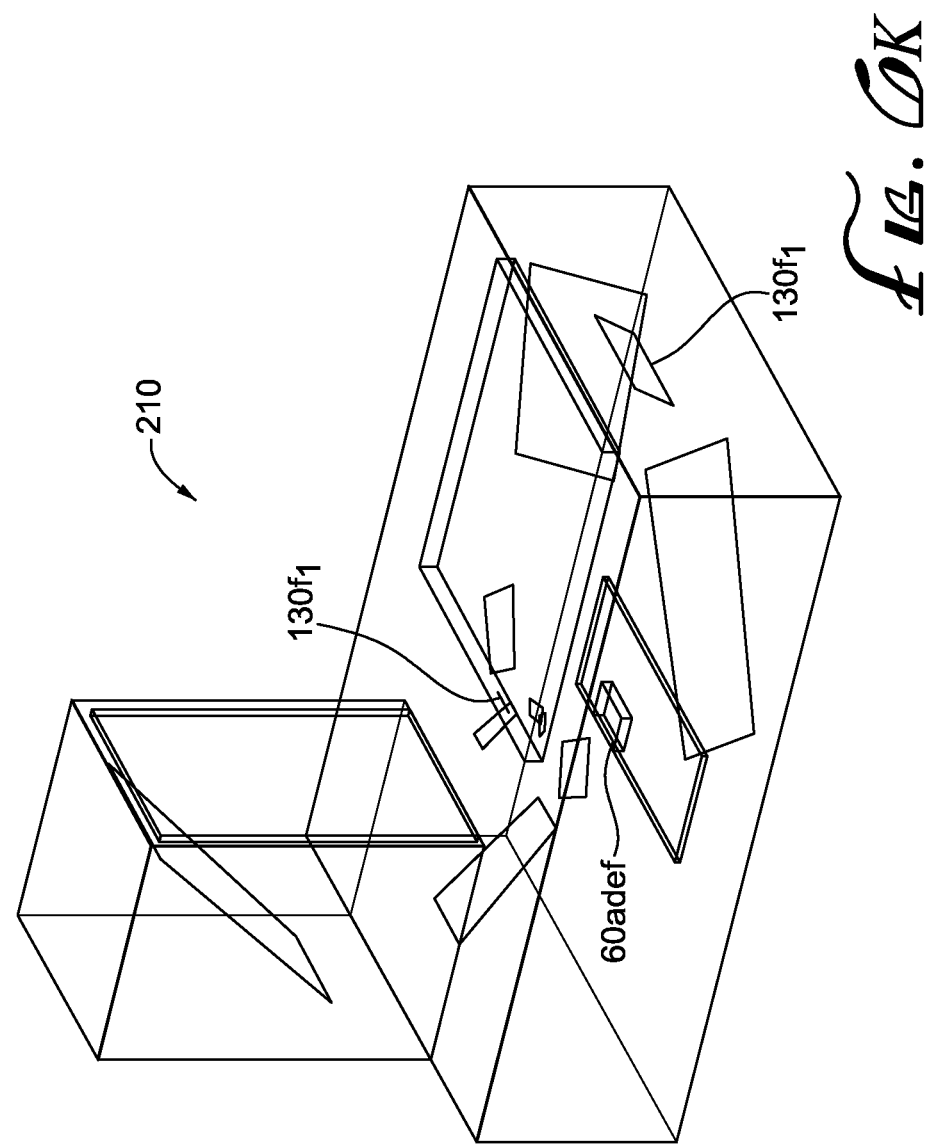
FIG. 6K is an isometric view of an optical code reader capable of capturing views from different perspectives, according to an alternative embodiments.
Figure 60M:
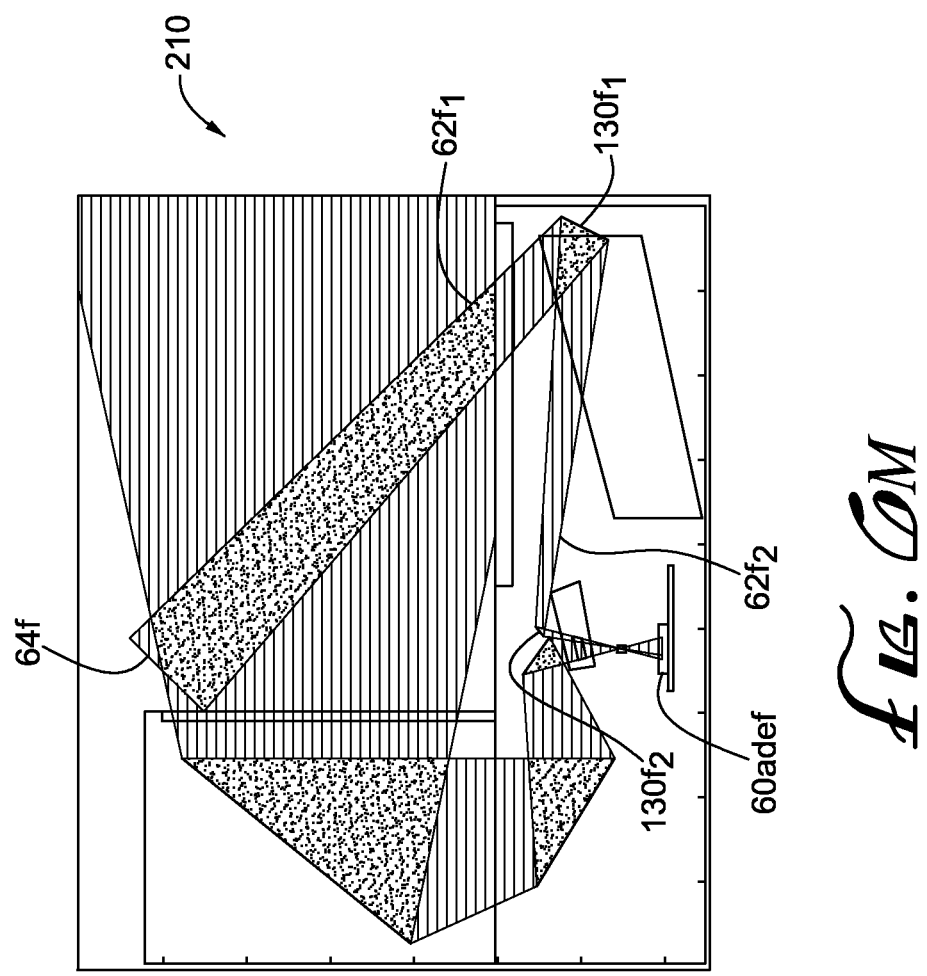
Figure 6N:
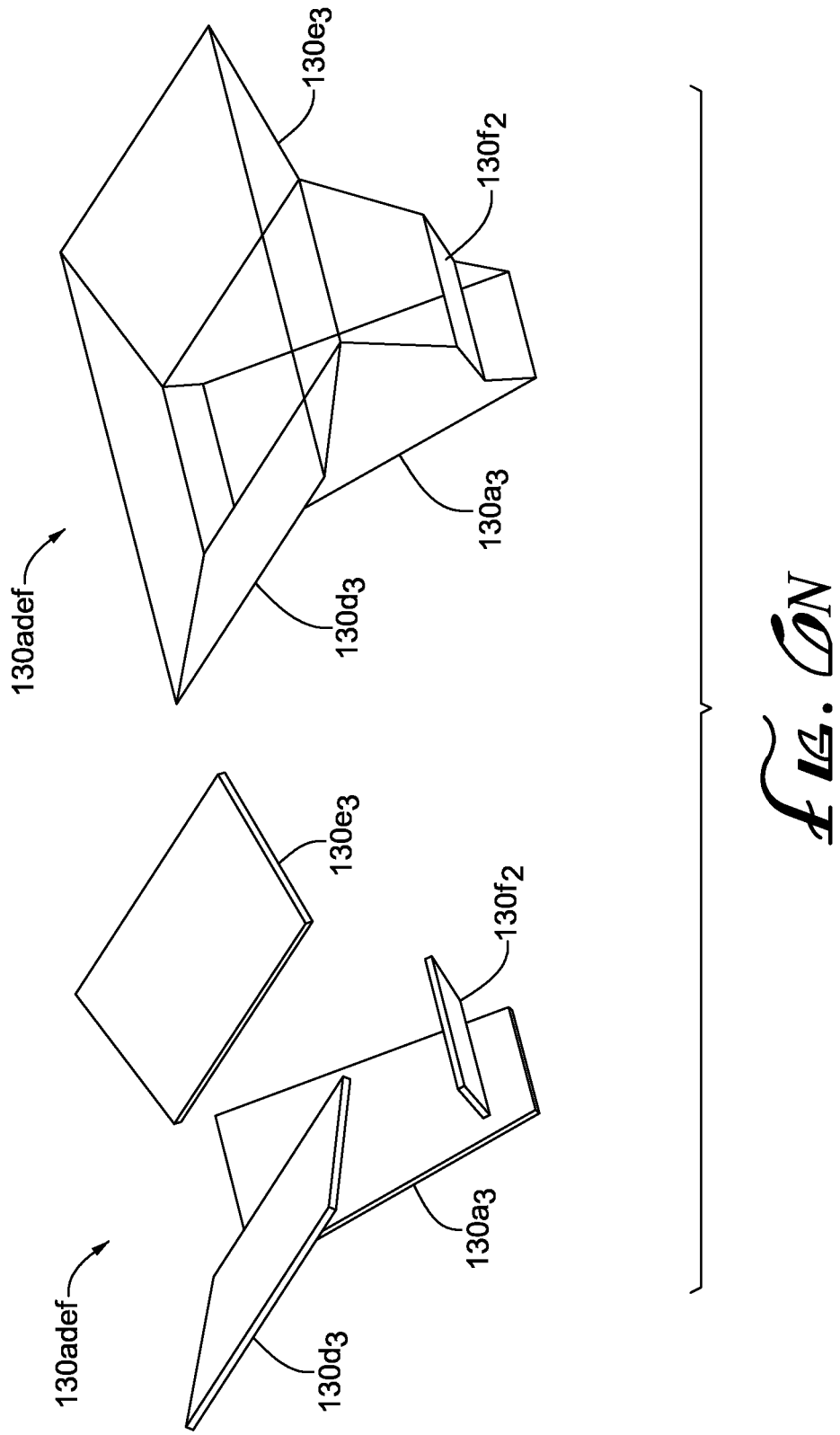
FIG. 6N is an isometric view of a compound mirror structure in the optical code reader of FIG. 6K.

FIG. 6N is an isometric view of a compound mirror structure 130*adef* in the optical code reader of FIG. 6K. The compound mirror structure 130*adef* comprises four reflective surfaces 130$a_3$, 130$d_3$, 130$e_3$ and 130$f_2$. The compound minor structure 130*adef* may be a solid or hollow molded piece, such as shown on the right, with mirrors attached or reflective coatings applied to the desired surfaces. The other surfaces may be nonreflective, such as by painting or coating or virtue of the material used to construct the core piece. In some embodiments, the minor components may have nonreflective regions in proximity to their intersections. The compound mirror structure 130*adef* may be made by any other suitable process.

The optics arrangements described above may contain additional optical components such as filters, lenses, or other optical components may be optionally placed in some or all of the image paths 62. The mirror components may include optical components such as surface treatments designed to filter or pass certain light wavelengths. In some embodiments, the image reflected by each minor component can be captured by the entire image field or view volume 64 when pulsed lighting and/or different wavelengths are used to separate the images obtained by the different perspectives. One or more lenses may be positioned within one or more of the image paths 62. The mirrors 130 preferably have planar reflecting surfaces. In some embodiments, however, one or more curved mirrors or focusing mirrors could be employed in one or more of the imaging paths 62 provided that appropriate lenses or image manipulating software is employed. In some embodiments, one or more of the mirrors 130 may be a dichroic mirror to provide for selective reflection of images under different wavelengths.

The mirrors 130 may have quadrilateral profiles or outlines, but may have other shapes, such as other polygons. In some preferred embodiments, one or more of the mirrors 130 have trapezoidal profiles. In some alternative embodiments, one or more of the mirrors 130 may have a circular or oval profile. The mirrors 130 may have dimensions sufficient for their respective locations to propagate an image large enough to occupy an entire image field of an imager 60. The minors 130 may also be positioned and have dimensions sufficiently small so that the mirrors do not occlude images being propagated along any of the other image paths 62.

The mirrors 130 may be appropriately spaced to account for the depth of field of the respective imagers 60. The imagers 60 may have different depths of field, and the image paths 62 may have different lengths, different segment lengths, and different numbers of mirrors 130. In some embodiments, the numbers of mirrors 130 in any image path 62 is selected to provide the fewest number of mirrors 130 in a housing of given dimensions. The image paths 62 may also or alternatively be modified to introduce additional mirrors 130 to select whether an actual image or whether a reverse image (enantiomorphic image) of the object will be received by any given imager 60. Moreover, the same enantiomorphic image of the object 20 from the different perspectives of the object 20 may reach the imagers 60 or different enantiomorphic images of the object 20 may reach the imagers 60. Exemplary imagers 60 that may be used include wide VGA imagers with a resolution of 752×480 pixels. One preferred VGA imager is the model MT9V022 available from Aptina Imaging of Corvallis, Oreg. or San Jose, Calif.; however, any other suitable type of imager 60 of various resolutions may be employed.

The mirrors 130 not only facilitate to capture many different perspectives of an object 20, but also help to reduce the dimensions of a housing 82 needed to house all the imagers 60. For example, the image paths 62 from the imagers into the view volume 64 via the sets of mirrors 130 associated with the respective perspectives permits either or both of the lower and upper housing portions 84 and 86 to have at least one housing dimension that is smaller than a direct-perspective dimension for viewing the view volume from the same perspective directly.

III. METHODS AND/OR MODES OF OPERATION

A. Virtual Scan Line Processing

A fixed virtual scan line pattern (omnidirectional pattern in FIG. 7A) can be used to decode images such as used in the Magellan-1000i model scanner made by Datalogic Scanning, Inc. of Eugene, Oreg. In some embodiments, an alternative technique based on a vision library may be used with one or more of the imagers 60. In general, any image processing technique for decoding an optical code in an image can be employed with the readers described herein.

B. Adaptive Virtual Scan Line Processing

Figure 7A:
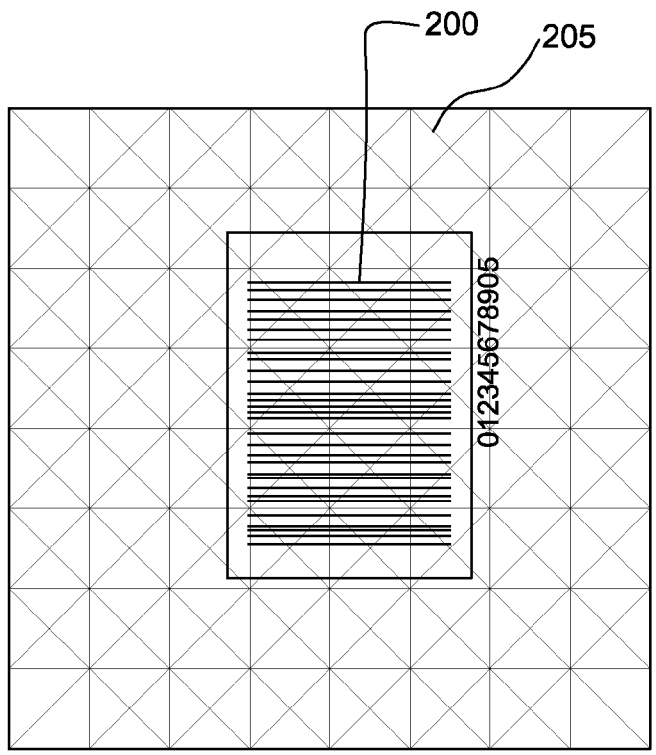
FIG. 7A is an illustration of an omnidirectional virtual scan line pattern over a one-dimensional optical code.

In order to reduce the amount of memory and processing required to decode linear and stacked barcodes, an adaptive virtual scan line processing method may be used. The left picture of FIG. 7A shows an image of a linear barcode. The scan lines traverse or overlie linear subsets of the 2-D image, of various angles and offsets. These "virtual scan lines" can be processed as a set of linear signals in a fashion conceptually similar to a flying spot laser scanner. The image can be deblurred with a one-dimensional filter kernel instead of a full 2-D kernel, reducing the processing requirements significantly.

The rotationally symmetric nature of the lens blurring function allows the linear deblurring process to occur without needing any pixels outside the virtual scan line boundaries. The virtual scan line is assumed to be crossing roughly orthogonal to the bars. The bars will absorb the blur spot modulation in the non-scanning axis, yielding a line spread function in the scanning axis. The resulting line spread function is identical regardless of virtual scan line orientation. However, because the pixel spacing varies depending on rotation (a 45 degree virtual scan line has a pixel spacing that is 1.4× larger than a horizontal or vertical scan line) the scaling of the deblurring equalizer needs to change with respect to angle.

Figure 7B:
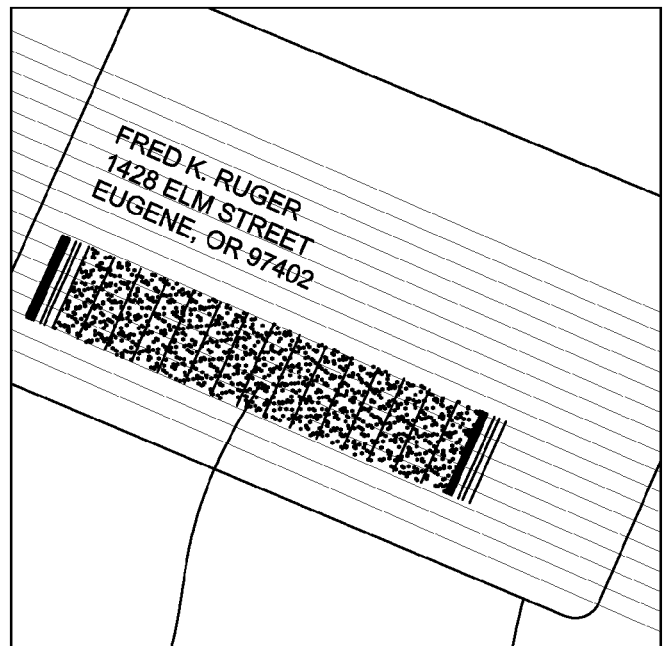
FIG. 7B is an illustration of a unidirectional virtual scan line pattern over a two-dimensional optical code.

If a stacked barcode symbology (such as RSS or PDF-417, as shown in FIG. 7B) is imaged, the device can start with an omnidirectional virtual scan line pattern and then determine which scan lines were best aligned to the barcode. The pattern can then be adapted to more closely align with the orientation and position of the barcode to enable efficient decoding. Thus the device can read highly truncated barcodes and stacked barcodes with a low amount of processing compared to a reader that processes the entire image in every frame.

C. Stitching

Partial portions of an optical code (from multiple perspectives) may be combined to form a complete optical code by a process known as stitching. The concept of stitching may be described herein only by way of example to a UPCA label, one of the most common types in the grocery world. The UPCA label has "guard bars" on the left and right side of the label and a center guard pattern in the middle. Each side has 6 digits encoded. It is possible to discern whether you are decoding the left or the right half. It is possible to decode the left half and the right half separately and then combine (stitch) the decoded results to create the complete label. It is also possible to stitch one side of the label from two pieces. In order to reduce errors, it is best that these partial scans include some overlap region. Suppose we denote the end guard patterns as G and the center guard pattern as C and we are encoding the UPCA label 012345678905, we could write this as G012345C678905G.

Stitching left and right halves would entail reading G012345C and C678905G and putting that together to get the full label. Stitching a left half with a 2-digit overlap might entail reading G0123 and 2345C to make G012345C. An example virtual scan line decoding system outputs pieces of labels that may be as short as a guard pattern and 4 digits. Using stitching rules, full labels can assembled from pieces decoded from subsequent images from the same camera or pieces decoded from images of multiple cameras. Further details of stitching and virtual line scan methods are described in U.S. Pat. Nos. 5,493,108 and 5,446,271, the disclosures of which are herein incorporated by reference in their entireties.

D. Progressive Imaging

Some of the following techniques for optical code reading may be employed in some of the embodiments. In some embodiments, a data reader includes an image sensor that is progressively exposed to capture an image on a rolling basis. This type of imager is also known as a rolling shutter imager. The image sensor is used with a processor to detect and quantify ambient light intensity. Based on the intensity of the ambient light, the processor controls integration times for the rows of photodiodes of a CMOS imager. The processor also coordinates when a light source is pulsed based on the intensity of the ambient light and the integration times for the photodiode rows.

Depending on the amount of ambient light and the integration times, the light source may be pulsed one or more times per frame to create stop-motion images of a moving target where the stop-motion images are suitable for processing to decode data represented by the moving target. Under bright ambient light conditions, for example, the processor may cause the rows to sequentially integrate with a relatively short integration time and without pulsing the light source, which creates a slanted image of a moving target. Under medium light conditions, for example, the rows may integrate sequentially and with an integration time similar to the integration time for bright ambient light, and the processor pulses the light source several times per frame to create a stop-motion image of a moving target with multiple shifts between portions of the image. The image portions created when the light pulses may overlie a blurrier, slanted image of the moving target. Under low light conditions, for example, the processor may cause the rows to sequentially integrate with a relatively long integration time and may pulse the light source once when all the rows are integrating during the same time period. The single pulse of light creates a stop-motion image of a moving target that may overlie a blurrier, slanted image of the moving target.

In some embodiments, a data imager contains multiple CMOS imagers and has multiple light sources. Different CMOS imagers "see" different light sources, in other words, the light from different light sources is detected by different CMOS imagers. Relatively synchronized images may be captured by the multiple CMOS imagers without synchronizing the CMOS imagers when the CMOS imagers operate at a relatively similar frame rate. For example, one CMOS imager is used as a master so that all of the light sources are pulsed when a number of rows of the master CMOS imager are integrating. In other embodiments, it is beneficial to have all CMOS imagers synchronized with each other and with the pulsed illumination sources. All illumination sources could be set to pulse at the same time, providing illumination for all imagers. Alternatively, one or more imagers may receive pulsed illumination from a subset of the illumination sources. This may reduce the effects of specular reflection.

Another embodiment pulses a light source more than once per frame. Preferably, the light source is pulsed while a number of rows are integrating, and the number of integrating rows is less than the total number of rows in the CMOS imager. The result of dividing the total number of rows in the CMOS imager by the number of integrating rows is an integer in some embodiments. Alternatively, in other embodiments, the result of dividing the total number of rows in the CMOS imager by the number of integrating rows is not an integer. When the result of dividing the total number of rows in the CMOS imager by the number of integrating rows is an integer, image frames may be divided into the same sections for each frame. On the other hand, when the result of dividing the total number of rows in the CMOS imager by the number of integrating rows is not an integer, successive image frames may be divided into different sections.

Other embodiments can use a mechanical shutter in place of a rolling shutter to capture stop-motion images of a moving target. A mechanical shutter may include a flexible member attached to a shutter that blocks light from impinging a CMOS imager or other suitable image sensor. The shutter may be attached to a bobbin that has an electrically conductive material wound around a spool portion of the bobbin, where the spool portion faces away from the shutter. The spool portion of the bobbin may be proximate one or more permanent magnets. When an electric current runs through the electrically conductive material wound around the spool, a magnetic field is created and interacts with the magnetic field from the one or more permanent magnets to move the shutter to a position that allows light to impinge a CMOS imager or other suitable image sensor.

IV. CONCLUSION

The terms and descriptions used above are set forth by way of illustration only and are not meant as limitations. Those skilled in the art will recognize that many variations can be made to the details of the above-described embodiments without departing from the underlying principles of the invention. For example, split mirrors 130 and/or sets of multiple fold mirrors 130 can be employed in alternative embodiments of the optical code reader that obtains views from only one of the upper or lower perspective. As another example, although described primarily with respect to a checker-assisted data reader, the readers and methods described herein may be employed in a self-checkout system or an automatic reader, such as a tunnel scanner employing multiple housing portions that obtain multiple perspectives through multiple viewing windows. The subject matter disclosed in any sentence or paragraph herein can be combined with the subject matter of one or more of any other sentences or paragraphs herein as long as such combinations are not mutually exclusive or inoperable.

The invention claimed is:

1. A method for reading optical codes on objects as they pass through a viewing volume bounded on two generally transverse sides by respective first and second viewing surfaces, by use of a number of imagers wherein the optical codes appear at different ones of arbitrary locations and angular orientations of a variety of possible locations and angular orientations with respect to the viewing surfaces, the method comprising:
   directing a plurality of views from the viewing volume onto different imager portions of the number of imagers, wherein the plurality of views includes at least first and second views, wherein the first view is reflected off at least one fixed mirror and the second view is reflected off at least one fixed mirror, wherein each of the plurality of views passes through one of the first and second viewing surfaces, wherein at least one of the plurality of views passes through the first viewing surface, wherein at least one of the plurality of views passes through the second viewing surface, wherein the number of views is at least three, wherein at least one of the views is reflected off a plurality of fixed mirrors including at least a first mirror and a second mirror, wherein the number of views is greater than the number of imagers, wherein at least one imager has first and second imager portions that employ at least some different pixel imaging elements such that the first imager portion obtains the first view and the second imager portion obtains the second view, wherein the first and second views are bilaterally symmetrical, and wherein the first and second views are operable to capture the optical codes at significantly different ones of the arbitrary locations and the angular orientations of the variety of the possible locations and angular orientations of the optical codes in the viewing volume;
   forming at least one image for each of the optical codes with the number of imagers; and
   processing each of the optical codes based on the at least one respective image.

2. A method according to claim 1, wherein the number of imagers is greater than one.

3. A method according to claim 1, wherein the at least one of the number of imagers forms images from multiple views simultaneously.

4. A method according to claim 3, wherein the number of imagers is two, wherein a first imager has three distinct views, each passing through the first viewing surface, and wherein a second imager has at least one view, which passes through the second viewing surface.

5. A method according to claim 3, wherein the number of imagers is two, wherein a first imager has three distinct fields of view, each passing through the first viewing surface, and wherein a second imager has three distinct fields of view, each passing through the second viewing surface.

6. A method according to claim 3, wherein the directing step comprises:
   directing the first view from the viewing volume onto a first portion of a split-view imager via reflection off a first surface on a compound mirror structure; and
   directing the second view from the viewing volume onto a second portion of a split-view imager via reflection off a second surface on the compound mirror structure.

7. A method according to claim 6, wherein the compound mirror structure is a monolithic piece.

8. A method according to claim 1, wherein the number of imagers is one.

9. A method according to claim 8, wherein the imager has three distinct views, two of which pass through the first viewing surface and one of which passes through the second viewing surface.

10. A method according to claim 8, wherein the imager has four distinct views, three of which pass through the first viewing surface and one of which passes through the second viewing surface.

11. A method according to claim 1, wherein the directing step comprises:
   directing at least one of the plurality of views from the viewing volume along a perspective through a viewing surface onto an imager via a tortuous path reflecting off at least one mirror, thereby causing the imager to be closer to the viewing surface than if a straight path having the same perspective were utilized.

12. A method according to claim 1, wherein the processing step is performed by equipment located entirely behind one of the viewing surfaces.

13. A method according to claim 1, wherein the optical codes are one-dimensional optical codes.

14. A method according to claim 13, wherein the processing step comprises:
   stitching together a first portion of at least one of the optical codes in an image formed by the first imager portion and a second portion of the at least one optical code in an image formed by the second imager portion.

15. A method according to claim 1, wherein the processing step comprises:
   processing pixels of the at least one image along a virtual scan line across the image.

16. A method according to claim 15, wherein the virtual scan line is a member of a set of omnidirectional virtual scan lines.

17. A method according to claim 16, further comprising:
   switching from use of the set of omnidirectional virtual scan lines to a set of more closely spaced unidirectional virtual scan lines.

18. A method according to claim 1, further comprising:
   illuminating objects in the viewing volume.

19. A method according to claim 18, wherein illuminating objects in the viewing volume comprises:
   illuminating a portion of the viewing volume seen in the first view at approximately the same time when the at least one imager is exposed to form a first image from the first view; and
   illuminating a portion of the viewing volume seen in the second view at approximately the same time when the at least one imager is exposed to form a second image from the second view.

20. A method according to claim 1, further comprising:
   focusing a total field of view for each imager through a respective lens for each such imager.

21. A method according to claim 1, wherein the plurality of views are capable of cumulatively viewing at least four sides of a six-sided polyhedron positioned within the viewing volume.

22. A method according to claim 21, wherein the plurality of views are capable of cumulatively viewing at least five sides of the six-sided polyhedron.

23. A method according to claim 1, wherein the number of imagers is two and the number of views is at least four.

24. A method according to claim 1, wherein the number of imagers is two and the number of views is six.

25. A method according to claim 1, wherein the number of imagers is at least one and the number of views is at least three.

26. A method according to claim 1, wherein the number of imagers is at least one and the number of views is at least four.

27. A method according to claim 1, wherein at least two of the number of imagers are mounted on opposite sides of a common circuit board.

28. A method according to claim 1, wherein any mirror positioned in an image path along more than one of the views is a fixed mirror.

29. A method according to claim 1, wherein the first and second imager portions are spatially nonoverlapping.

30. A method according to claim 1, wherein the first and second views have opposing directions.

31. A method according to claim 1, wherein the first and second views are oriented to capture opposing sides of the objects.

32. A method according to claim 1, wherein the first view is oriented to capture the leading side of the objects and the second view is oriented to capture the trailing side of the objects.

33. A method according to claim 1, wherein the first and second imager portions have different dimensions.

34. An optical code reader for forming images of optical codes on objects, the optical code reader comprising:
   a first viewing surface;
   a second viewing surface generally transverse to the first viewing surface, the first and second surfaces bounding a viewing volume in which the optical codes may be imaged, wherein the optical codes may appear at different ones of arbitrary locations and angular orientations of a variety of possible locations and angular orientations with respect to the viewing surfaces;
   a number of imagers positioned on an opposite side of one or more of the first and second viewing surfaces relative to the viewing volume, the number of imagers being oriented and configured to capture images of the objects, when each object is in the viewing volume, from at least three different views including at least first and second views, wherein the first view is reflected off at least one fixed mirror and the second view is reflected off at least one fixed mirror, wherein the number of imagers is one or more imagers, wherein each of the views passes through one of the first and second viewing surfaces, wherein at least one of the views passes through the first viewing surface, wherein at least one of the views passes through the second viewing surface, wherein the number of views is greater than the number of imagers, wherein at least one imager has first and second imager portions that employ at least some different pixel imaging elements such that the first imager portion is operable to obtain the first view and the second imager portion is operable to obtain the second view, wherein the first and second views are bilaterally symmetrical, and wherein the first and second views are operable to capture the optical codes at significantly different ones of the arbitrary locations and the angular orientations of the variety of the possible locations and angular orientations of the optical codes in the viewing volume; and
   a plurality of fixed mirrors including at least a first mirror and a second mirror positioned on an opposite side of one or more of the first and second viewing surfaces relative to the viewing volume, wherein at least one of the views is reflected off the plurality of fixed mirrors.

35. An optical code reader according to claim 34, wherein the number of imagers is two, wherein a first imager has three distinct views, each passing through the first viewing surface, and wherein a second imager has at least one view, which passes through the second viewing surface.

36. An optical code reader according to claim 34, wherein the number of imagers is two, wherein a first imager has three distinct fields of view, each passing through the first viewing surface, and wherein a second imager has three distinct fields of view, each passing through the second viewing surface.

37. An optical code reader according to claim 34, wherein one of the imagers is a split-view imager, and the first view from the viewing volume is directed onto the first portion of the split-view imager via reflection off a first surface on a compound mirror structure, and the second view from the viewing volume is directed onto the second portion of the split-view imager via reflection off a second surface on the compound mirror structure.

38. An optical code reader according to claim 37, wherein the compound mirror structure is a monolithic piece.

39. An optical code reader according to claim 34, wherein the number of imagers is at least one.

40. An optical code reader according to claim 34, wherein the at least one imager has three distinct views, two of which pass through the first viewing surface and one of which passes through the second viewing surface.

41. An optical code reader according to claim 39, wherein at least one of the imagers has four distinct views, three of which pass through the first viewing surface and one of which passes through the second viewing surface.

42. An optical code reader according to claim 41, wherein an optical path from of at least one of the views onto the at least one imager is via a tortuous path reflecting off at least one mirror, thereby causing the at least one imager to be closer to the viewing surface than if a straight path having the same perspective were utilized.

43. An optical code reader according to claim 34, further comprising:
   a housing positioned on an opposite side of one or more of the first and second viewing surfaces relative to the viewing volume, the housing containing the number of imagers.

44. An optical code reader according to claim 43, wherein the housing comprises first and second intersecting housing portions, wherein the first housing portion borders the first viewing surface and the second housing portion borders the second viewing surface, and wherein the number of imagers is contained within either the first housing portion or the second housing portion or in an intersection thereof.

45. An optical code reader according to claim 44, wherein one of the first and second housing portions is an upper side housing portion and the other is a lower housing portion, and the first and second housing portions form a generally L-shaped structure.

46. An optical code reader according to claim 34, further comprising:
   electronic circuitry connected to the number of imagers operable to decode the optical codes by processing the images of the objects.

47. An optical code reader according to claim 46, wherein the electronic circuitry is positioned entirely on an opposite side of one of the first and second viewing surfaces relative to the viewing volume.

48. An optical code reader according to claim 47, wherein the first viewing surface is a horizontal surface, and the second surface is a vertical surface, and the electronic circuitry is positioned entirely below the first viewing surface.

49. An optical code reader according to claim 34, further comprising:
   a focusing lens positioned in an optical path for each imager in the number of imagers, wherein there is one separate focusing lens for each such imager.

50. An optical code reader according to claim 34, wherein the plurality of views are capable of cumulatively viewing at least four sides of a six-sided polyhedron positioned within the viewing volume.

51. An optical code reader according to claim 50, wherein the plurality of views are capable of cumulatively viewing at least five sides of the six-sided polyhedron.

52. An optical code reader according to claim 34, wherein the first and second viewing surfaces are substantially orthogonal to one another.

53. An optical code reader according to claim 34, wherein the optical code reader is bioptic.

54. An optical code reader according to claim 34, wherein each of the views reflects off the same mirror no more than once.

55. An optical code reader according to claim 34, wherein the number of imagers is two and the number of views is four.

56. An optical code reader according to claim 34, wherein the number of imagers is two and the number of views is six.

57. An optical code reader according to claim 34, wherein the number of imagers is at least one and the number of views is at least three.

58. An optical code reader according to claim 34, wherein the number of imagers is at least one and the number of views is at least four.

59. An optical code reader according to claim 34, wherein the first and second views have opposing directions.

60. An optical code reader according to claim 34, wherein the first and second views are oriented to capture opposing sides of the objects.

61. An optical code reader according to claim 34, wherein the first view is oriented to capture the leading side of the objects and the second view is oriented to capture the trailing side of the objects.

62. An optical code reader according to claim 34, wherein the first and second imager portions have different dimensions.

63. A method for reading optical codes on objects as they pass through a viewing volume bounded on two generally transverse sides by respective first and second viewing surfaces, by use of a number of imagers wherein the optical codes appear at different ones of arbitrary locations and angular orientations of a variety of possible locations and angular orientations with respect to the viewing surfaces, the method comprising:
   directing a plurality of views from the viewing volume onto different imager portions of the number of imagers, wherein the plurality of views includes at least first and second views, wherein the first view is reflected off at least one fixed mirror and the second view is reflected off at least one fixed mirror, wherein each of the plurality of views passes through one of the first and second viewing surfaces, wherein at least one of the plurality of views passes through the first viewing surface, wherein at least one of the plurality of views passes through the second viewing surface, wherein the number of views is at least three, wherein at least one of the views is reflected off a plurality of fixed mirrors including at least a first mirror and a second mirror, wherein the number of views is greater than the number of imagers, wherein at least one imager has first and second imager portions that employ at least some different pixel imaging elements such that the first imager portion obtains the first view and the second imager portion obtains the second view, wherein the first and second views are oriented to capture opposing sides of the objects, and wherein the first and second views are operable to capture the optical codes at significantly different ones of the arbitrary locations and the angular orientations of the variety of the possible locations and angular orientations of the optical codes in the viewing volume;
   forming at least one image for each of the optical codes with the number of imagers; and processing each of the optical codes based on the at least one respective image.

\* \* \* \* \*

UNITED STATES PATENT AND TRADEMARK OFFICE
CERTIFICATE OF CORRECTION

| | | |
|---|---|---|
| PATENT NO. | : 8,678,287 B2 | Page 1 of 2 |
| APPLICATION NO. | : 12/646829 | |
| DATED | : March 25, 2014 | |
| INVENTOR(S) | : Bryan L. Olmstead | |

It is certified that error appears in the above-identified patent and that said Letters Patent is hereby corrected as shown below:

Specification

<u>Column 3</u>
Line 46, after "image path" insert --to an imager--.
Lines 53-54, change "image of an" to --imager of--.

<u>Column 5</u>
Line 51, change "embodiments" to --embodiment--.

<u>Column 6</u>
Line 45, change "620" to --62f)--.
Line 48, change "700" to --70f)--.

<u>Column 8</u>
Line 64, after "viewing" insert --surface--.

<u>Column 9</u>
Line 20, change "surface. The" to --surface, the--.

<u>Column 10</u>
Line 61, change "minor" to --mirror--.

<u>Column 12</u>
Line 27, after "be" delete "at".

<u>Column 14</u>
Line 11, before "placed" delete "in".

Signed and Sealed this
Twenty-third Day of February, 2016

Michelle K. Lee
*Director of the United States Patent and Trademark Office*

CERTIFICATE OF CORRECTION (continued)
U.S. Pat. No. 8,678,287 B2

Specification

Column 17
Line 17, after "areas" insert --or--.

Column 19
Line 1, after "may" insert --be--.

Column 20
Line 19, after "may" insert --be--.

Column 21
Line 6, change "angle" to --angle.--.

Column 22
Line 17, after "may" insert --be--.
Line 20, change "minors" to --mirrors--.

Column 23
Line 38, after "may" insert --be--.
Line 50, change "minors" to --mirrors--.

Column 24
Line 1, change "minor" to --mirror--.
Line 6, change "minor" to --mirror--.
Line 12, after "components" insert --that--.
Line 16, change "minor" to --mirror--.
Line 37, change "minors" to --mirrors--.

Column 26
Line 13, after "can" insert --be--.